(12) United States Patent
Fraser et al.

(10) Patent No.: US 12,552,691 B2
(45) Date of Patent: Feb. 17, 2026

(54) METHODS AND SYSTEMS FOR TREATING BIOLOGICAL CONTAMINANTS

(71) Applicant: Reverse Ionizer Systems, LLC, Bethesda, MD (US)

(72) Inventors: Desmond A. Fraser, Herndon, VA (US); Hossein Ghaffari Nik, Fairfax, VA (US); Richard B. McMurray, Fairfax, VA (US); Akrem Hassen Adem Aberra, Fairfax, VA (US); Shelley Marie Grandy, Ashburn, VA (US); Patrick J. Hughes, Reston, VA (US); David Anthony Davis, Herndon, VA (US); Maximo Mejia Cayetano, Chantilly, VA (US); Loraine Huchler, Exmore, VA (US); Albin Samuel Alex, Chester, VA (US)

( * ) Notice: Subject to any disclaimer, the term of this patent is extended or adjusted under 35 U.S.C. 154(b) by 0 days.

(21) Appl. No.: 18/964,828

(22) Filed: Dec. 2, 2024

(65) Prior Publication Data

US 2025/0100908 A1    Mar. 27, 2025

Related U.S. Application Data

(63) Continuation of application No. 17/674,727, filed on Feb. 17, 2022.

(60) Provisional application No. 63/248,453, filed on Sep. 25, 2021, provisional application No. 63/150,576, filed on Feb. 17, 2021.

(51) Int. Cl.
C02F 1/46       (2023.01)
C02F 1/467      (2023.01)
C02F 103/02     (2006.01)

(52) U.S. Cl.
CPC ......... C02F 1/4608 (2013.01); C02F 1/4674 (2013.01); *C02F 2103/023* (2013.01); *C02F 2201/46125* (2013.01); *C02F 2303/04* (2013.01); *C02F 2303/22* (2013.01)

(58) Field of Classification Search
None
See application file for complete search history.

(56) References Cited

U.S. PATENT DOCUMENTS

| | | | |
|---|---|---|---|
| 10,183,881 B1 * | 1/2019 | Fraser | C02F 9/00 |
| 2003/0188976 A1 * | 10/2003 | Culvey | D06F 35/003 |
| | | | 205/756 |
| 2021/0148622 A1 * | 5/2021 | Hsu | C02F 1/4672 |

FOREIGN PATENT DOCUMENTS

WO    WO-2006114414 A1 *  11/2006  ............... A61L 2/03

OTHER PUBLICATIONS

MT WO2006114414 (Year: 2006).*

* cited by examiner

*Primary Examiner* — Peter Keyworth
(74) *Attorney, Agent, or Firm* — Capitol Patent & Trademark Law Firm, PLLC

(57) ABSTRACT

Unwanted material in water, such as *Legionella* and scale, may be treated using a combination of technologies. Components of each technology may be controlled using a database, such as an Internet-of-things (IoT) database. An additional advantage of the treatment technologies is an increase in the efficiency of heat transfer components, such as cooling towers, and a related reduction in carbon footprint.

12 Claims, 40 Drawing Sheets

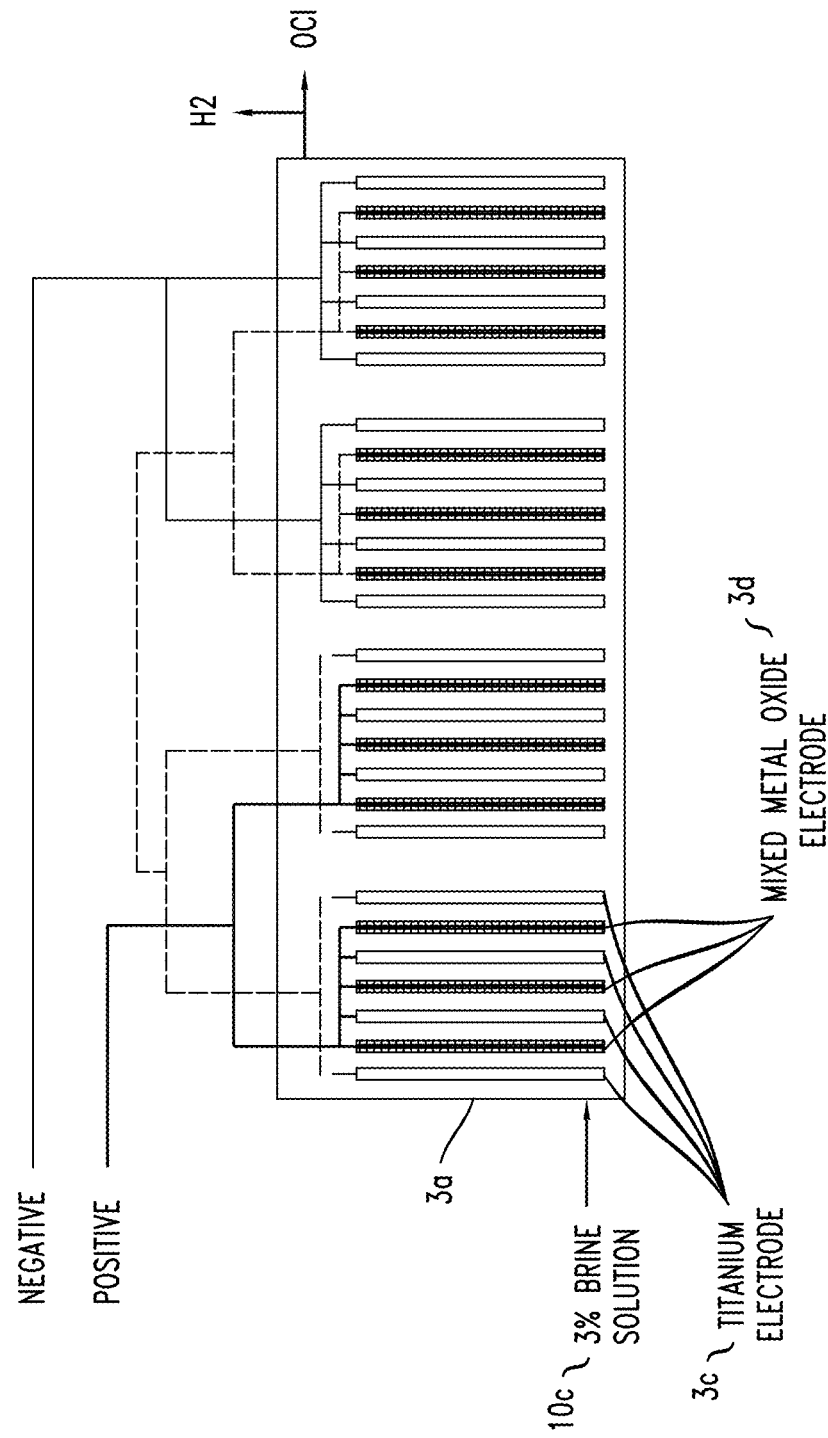

28 ELECTRODE SERIAL CONNECTION HYPOCHLORITE ELECTROLYTIC CELL

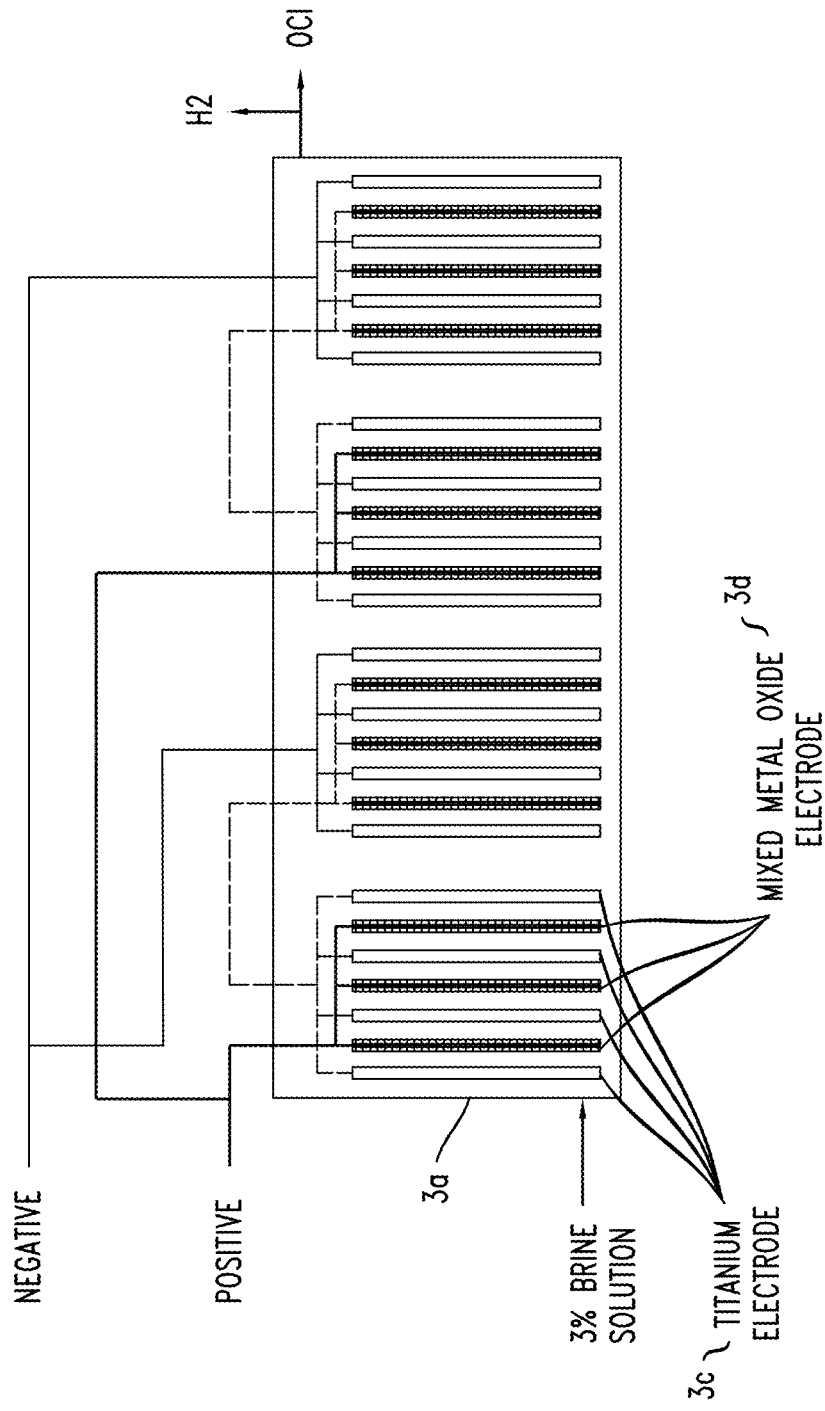

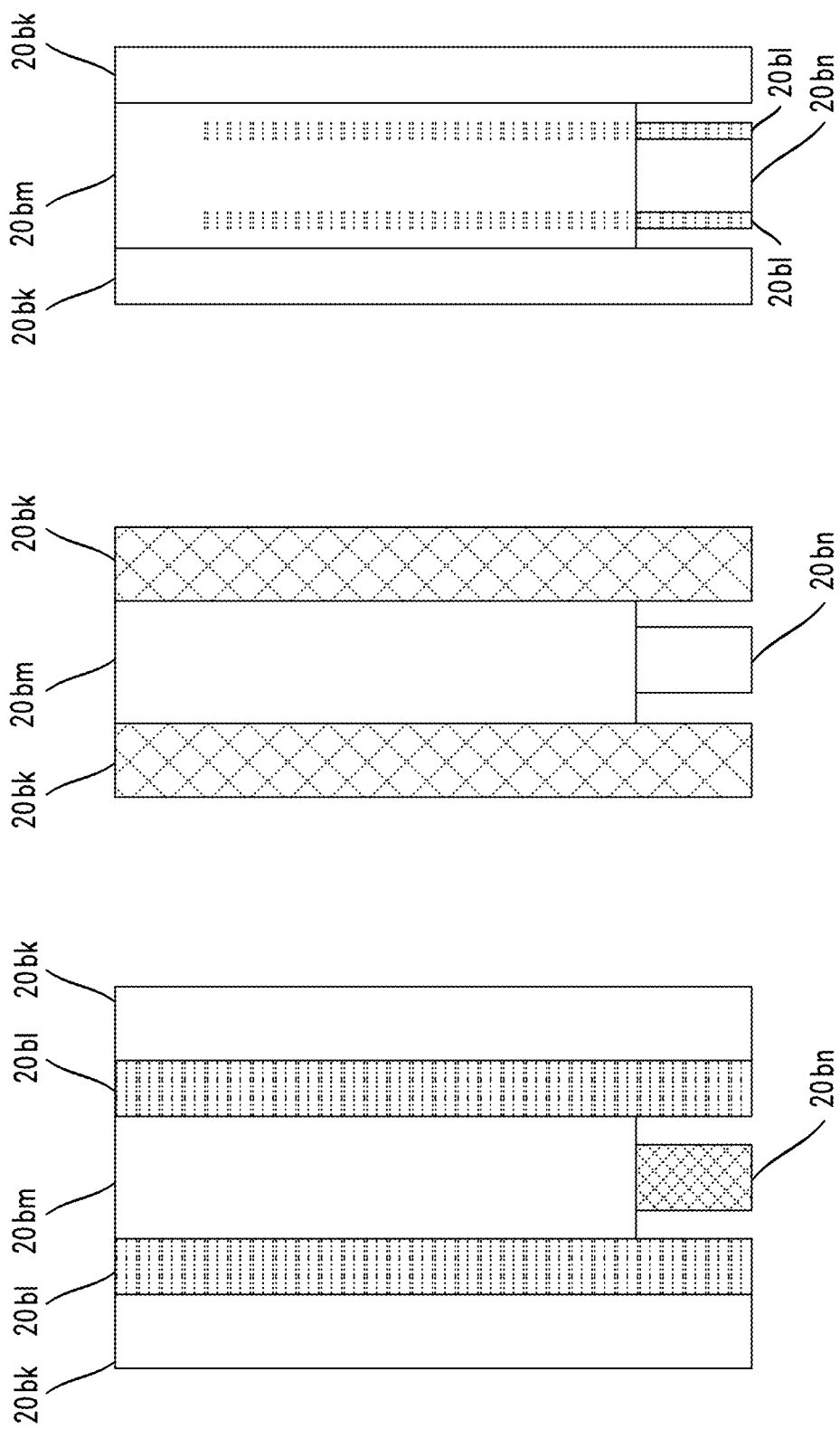

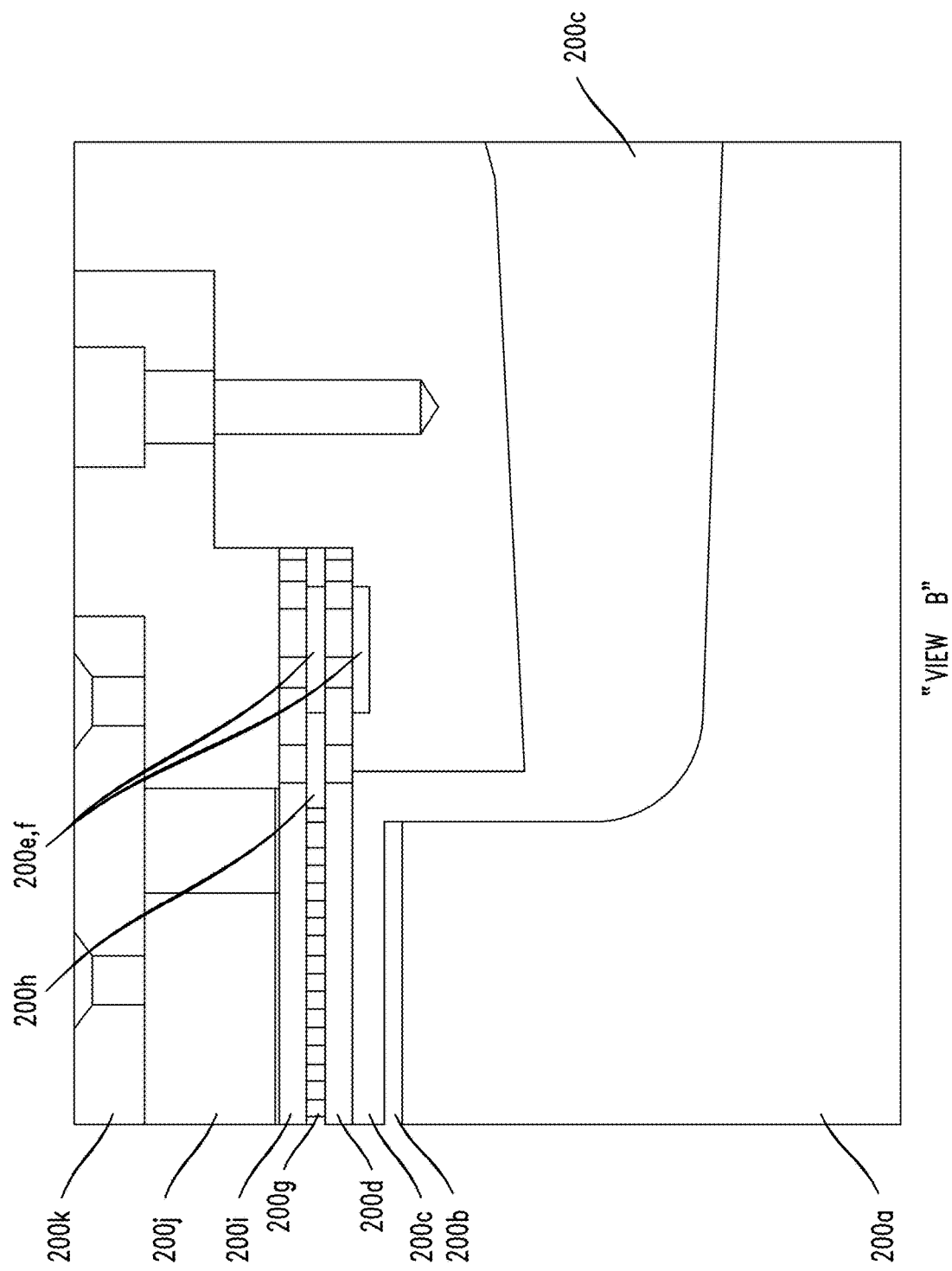

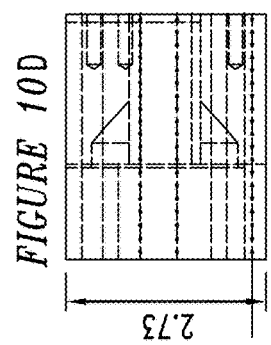
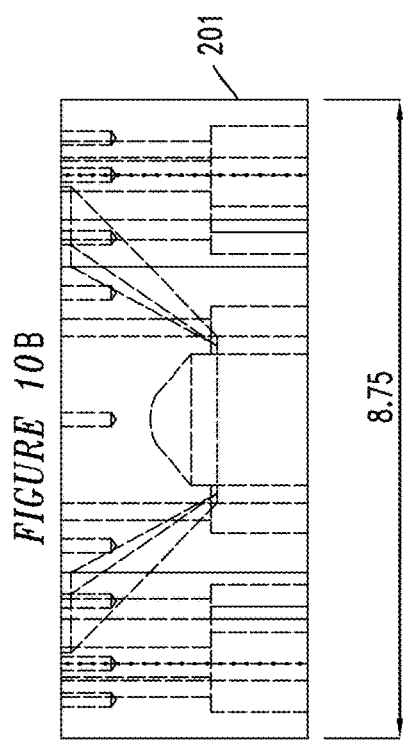
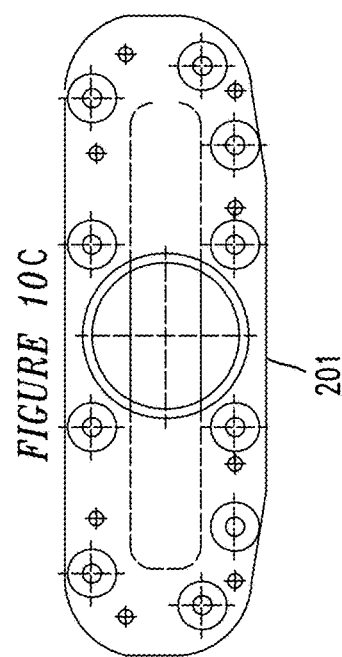
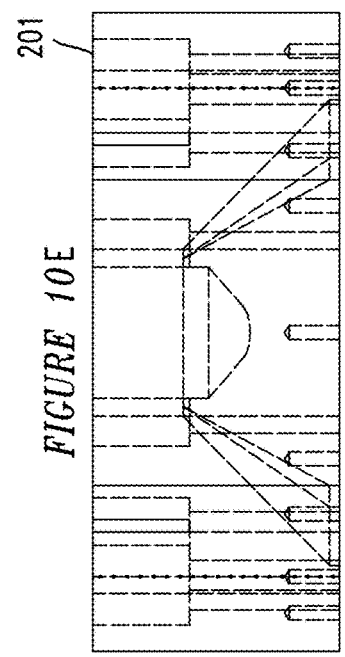

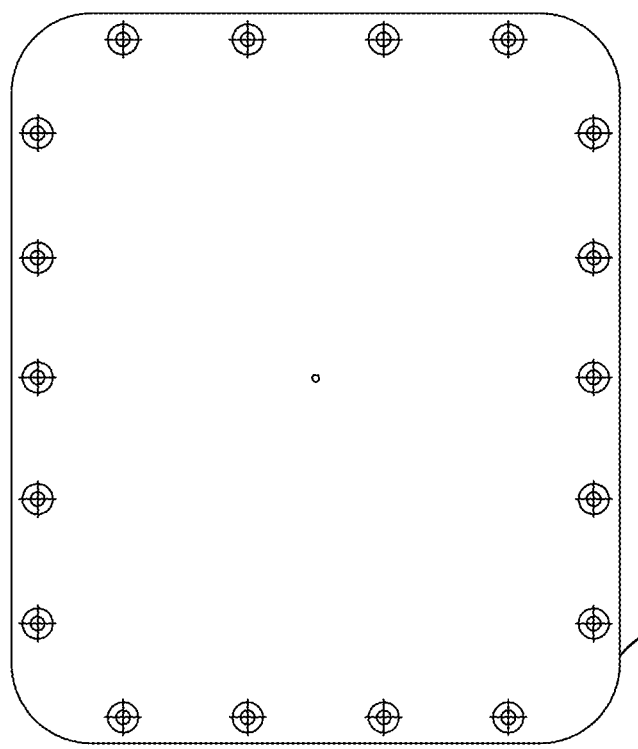
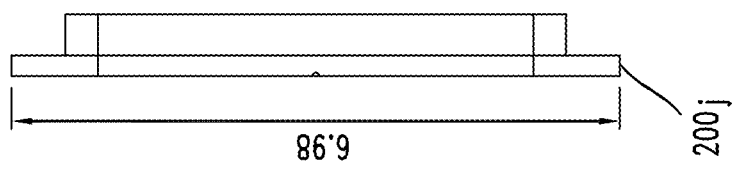
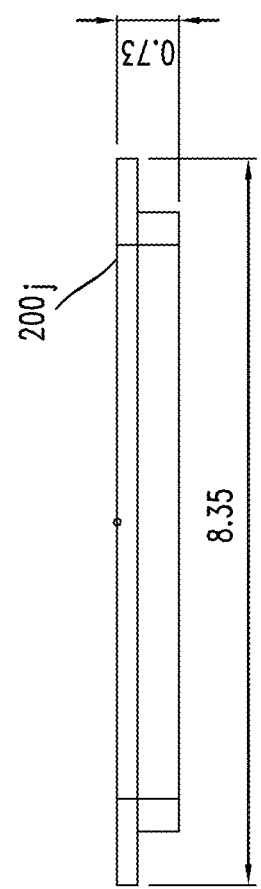
FIGURE 13A
FIGURE 13B
FIGURE 13C

200h

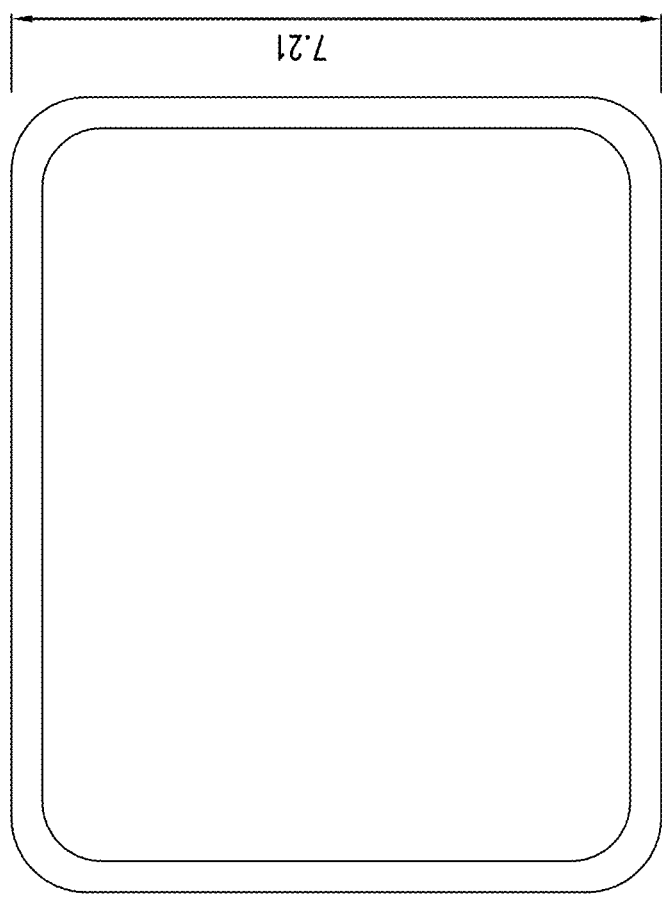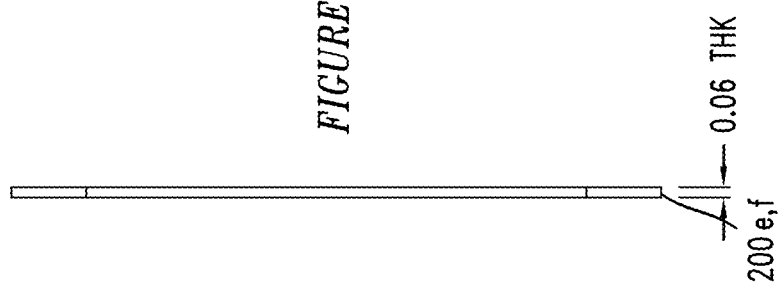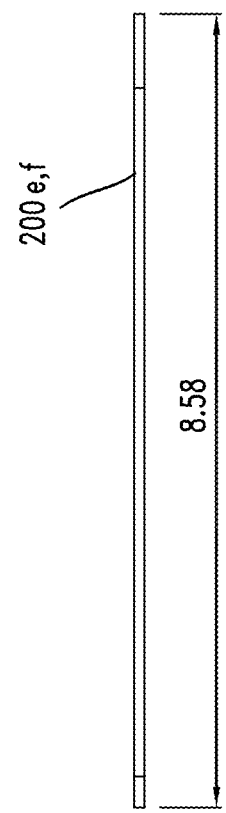
FIGURE 15A
FIGURE 15B
FIGURE 15C

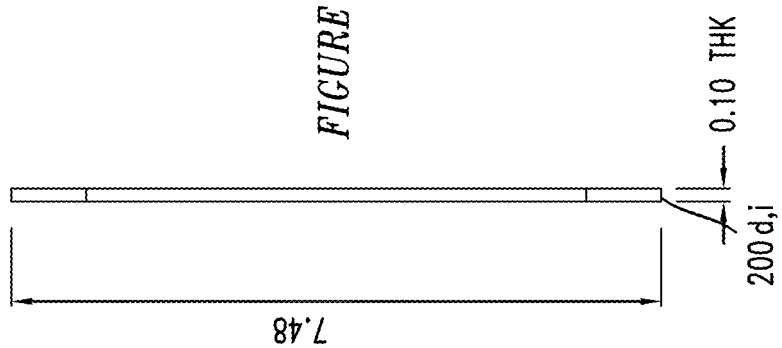
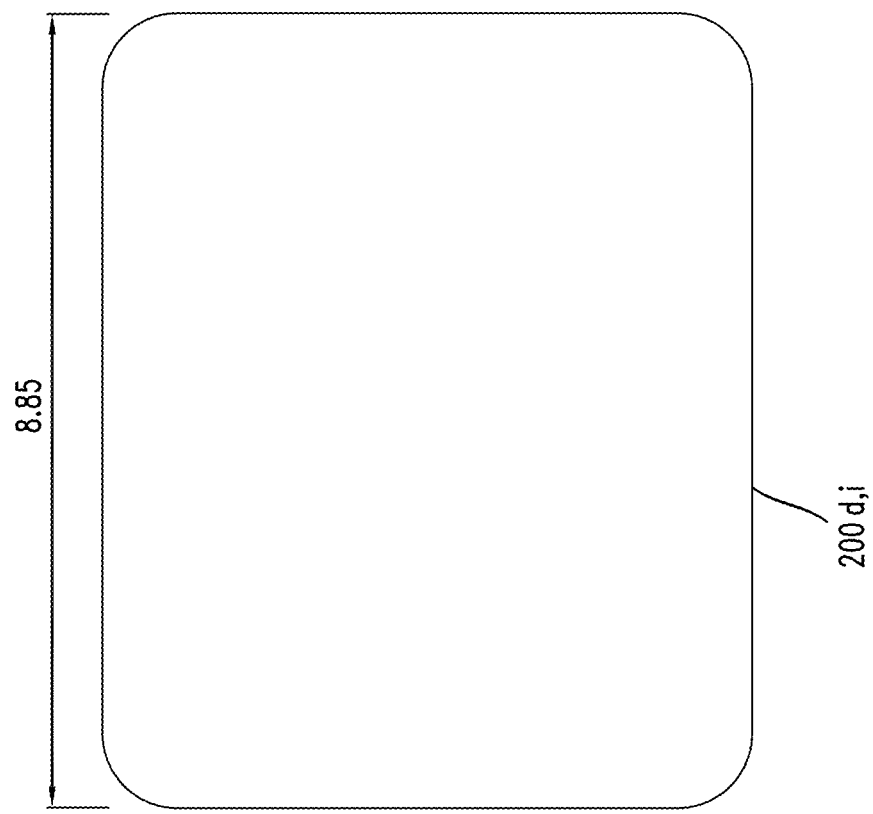
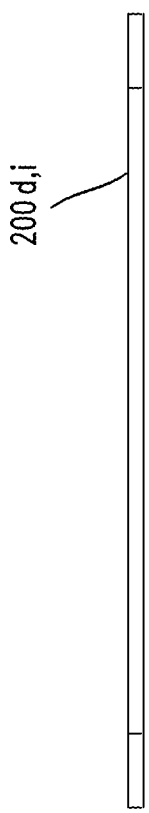

200k

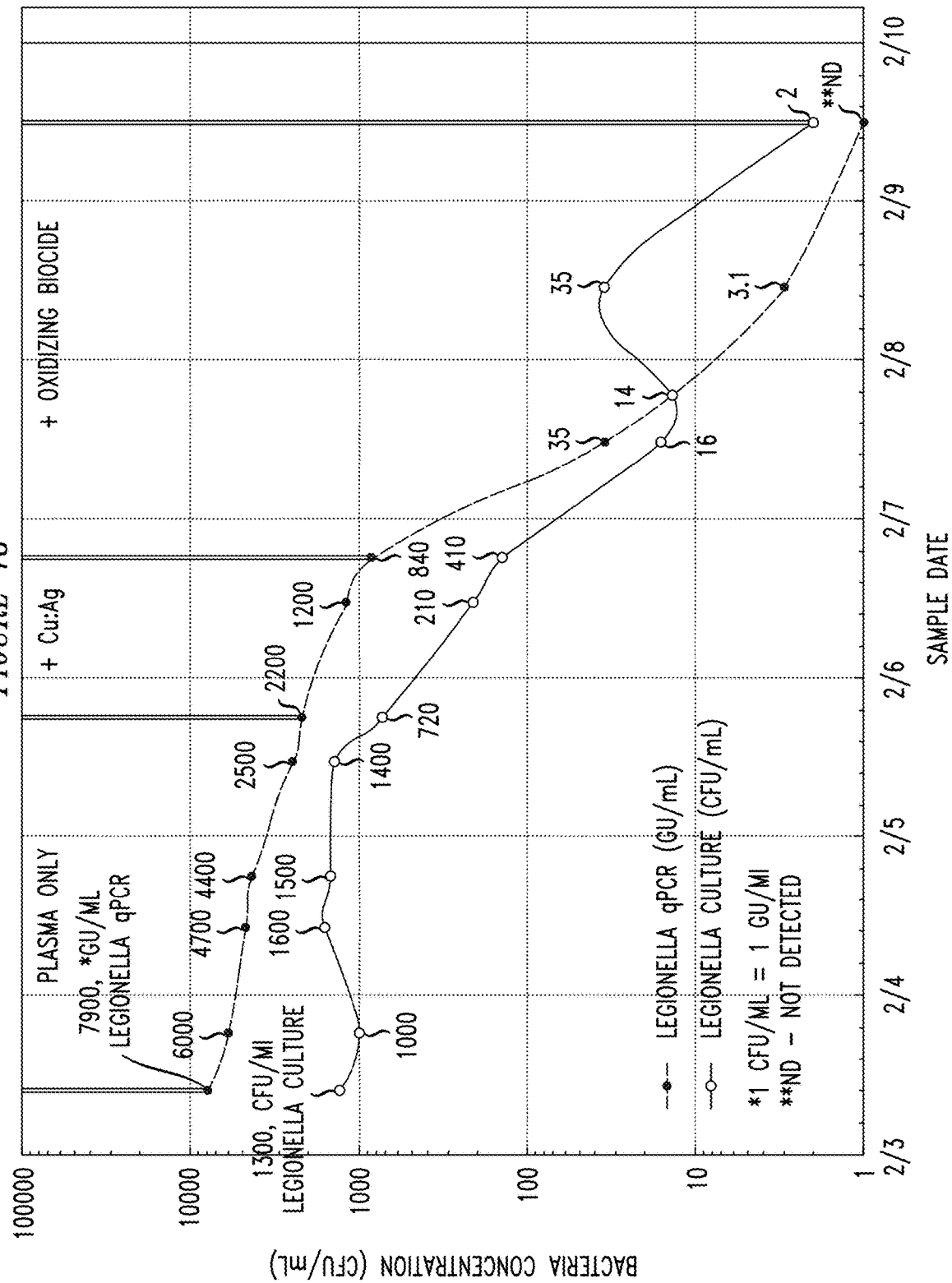

FIGURE 19D

EXPERIMENTAL
PLASMA DISINFECTION SYSTEM

| MAIN | GRAPHS/TRENDS | PLASMA | PUMP | EIC | IO/RELAYS | CONFIGURATIONS | SYSTEM LOGS |

OPERATIONS

REMOTE ACCESS: ON
RESET ALARM: OFF

AUTO SETPOINT

○ MIN FLOW  ○ MAX FLOW

○ CONSTANT HEAD  ○ CONSTANT PRESSURE  ○ CONSTANT FLOW

● CONSTANT SPEED
○ CONSTANT FREQUENCY
○ CONSTANT LEVEL
○ CONSTANT TEMPERATURE
○ CONSTANT DIFFERENTIAL PRESSURE

○ PROPORTIONAL PRESSURE
○ AUTO ADAPT
○ FLOW ADAPT
○ CLOSED LOOP SENSOR

SETPOINT (%)
0% 20% 40% 60% 80% 100%
△ 85 ▽

OPERATION MODE:
0: AUTO-CONTROL (SETPOINT CONTROL ACCORDING TO SELECTED CONTROL MODE)

CONTROL MODE:
3: CONSTANT HEAD

DRIVE STATE:
0. STOPPED

FLOW ESTIMATION STATE:
0. FLOW ESTIMATION WITHIN RANGE

| | | | STATUS LEDs |
|---|---|---|---|
| ACTUAL SETPOINT | PUMP FLOW | PIPE FLOW | OPERATION: ON |
| 30.31 % | 25.1 gpm | 20.9 gpm | ACCESS MODE: REMOTE |
| REF. PERFORMANCE | PUMP HEAD | | ROTATION: YES |
| 86.22 % | 20.14 ft | | SETPOINT INFLUENCE: NO |
| PUMP SPEED | | DIFF. PRESSURE | MAX FLOW LIMIT: OFF |
| 3737 rpm | | 0.6 bar | AT MAX POWER: NO |
| PUMP FREQUENCY | FLOW LIMIT | | AT MAX SPEED: NO |
| 124.2 Hz | 19.81 gpm | | AT MIN SPEED: NO |
| PUMP MOTOR CURRENT | PUMP INTERNAL | PUMP LIQUID LOW FLOW STOP: OFF |
| 0.6 A | 98.6 degF | 87.8 degF | FAULT: NO FAULT |
| PUMP DC VOLTAGE | | | WARNING: NO WARN. |
| 386 V | SETPOINT (%) | | FORCED TO LOCAL: NO |
| PUMP OPERATION TIME | DEFAULT | | COPY TO LOCAL: ON |
| 996 Hr | 85 | | RESET ALARM ACK: OFF |
| | | | DIRECTION: CCW |

(×) EXIT

EXPERIMENTAL
PLASMA DISINFECTION SYSTEM

| MAIN | GRAPHS/TRENDS | PLASMA | PUMP | EIC | IO/RELAYS | CONFIGURATIONS | SYSTEM LOGS |

RELAY OUTPUTS

| | | |
|---|---|---|
| RO1 INVERTER | ⌄ | ON |
| RO2 48V/EC1 | | OFF |
| RO3 AC FAN | ⌄ | ON |
| RO4 PUMP | ⌄ | ON |
| RO5 48V/EC2 | | OFF |
| RO6 | | OFF |
| RO7 | | OFF |
| RO8 XFRM FAN | ⌄ | ON |

DIGITAL INPUTS (PPS)

| DI 1 | OFF | 93 |
| DI 2 | ON | 0 |
| DI 3 | ON | 0 |
| DI 4 | OFF | 0 |
| DI 5 | OFF | 0 |
| DI 6 | OFF | 0 |
| DI 7 | OFF | 0 |
| DI 8 | OFF | 0 |

DIGITAL INPUTS

| AI 1 LEAK SENSOR | ON | 12195 mV |
| AI 2 | OFF | 0 mV |
| AI 3 | OFF | 0 µA |
| AI 4 | OFF | 0 µA |
| AI 5 pH METER | ON | 11610 µA |
| AI 6 PRESSURE SENSOR | ON | 11572 µA |
| AI 7 FLOW METER | ON | 9341 µA |
| AI 8 COND. METER | ON | 4578 µA |

TEMPERATURE INPUTS  c (mV or Ohm)

| TI 1 | ON | 30.8 | PT100 3-WIRE |
| TI 2 | ON | 30.5 | PT100 3-WIRE |
| TI 3 | OFF | 3276.7 | INPUT DISABLED |
| TI 4 | OFF | 3276.7 | INPUT DISABLED |
| TI 5 | OFF | 3276.7 | INPUT DISABLED |
| TI 6 | OFF | 3276.7 | INPUT DISABLED |

↕ OFFSET  Fdeg
◁ 1 ▷

POWER RESET  OFF    RESET ALARMS    BEEP

ⓧ EXIT

METHODS AND SYSTEMS FOR TREATING BIOLOGICAL CONTAMINANTS

RELATED APPLICATIONS

The present application is a continuation of U.S. patent application Ser. No. 17/674,727 filed Feb. 17, 2022 (the "'727 Application") which claims the benefit of priority from U.S. Provisional Patent Application No. 63/150,576 (the "'576 Application") filed Feb. 17, 2021 and U.S. Provisional Patent Application 63/248,453 (the "'453 Application") filed Sep. 25, 2021, and incorporates by reference herein the entireties of the disclosures of the '727, '576 and '453 applications as if set forth in full herein. The present application also incorporates by reference herein the entire disclosures of U.S. patent application Ser. No. 16/672,503 filed Nov. 3, 2019 (the "'503 Application") and U.S. application Ser. No. 15/926,965 (the "'965 Application) as if set forth herein in full.

INTRODUCTION

It is desirable to treat biological contaminants, such as *Legionella pneumophila*, ("*Legionella*" for short) in evaporative cooling water systems such as cooling towers used in industrial, commercial or residential applications (e.g., high-rise apartment buildings).

It is also desirable to inactivate biological contaminants and prevent the growth of bacteria in order to reduce biofilm (microbial cells)/scale buildup that may form from, or on, such bacteria which, in turn, produces extracellular biopolymer reduces heat exchanger efficiency, fouling, corrosion, and scale helps prevent piping systems from becoming clogged.

Yet further, it is desirable to provide for systems, devices and methods that combine different water treatment techniques to treat biological contaminants in water (e.g., cooling tower water, desalination plant water, oil field water).

Still further, it is desirable to reduce the footprint of a heat transfer system.

Additional methods, systems and devices and their features and advantages will become clear to those skilled in the art from the following detailed description and appended drawings.

BRIEF DESCRIPTION OF THE DRAWINGS

FIGS. 2A to 2D depict electrode configurations of an exemplary chemical disinfectant section according to embodiments.

FIG. 8 depicts additional, exemplary configurations of electrodes.

FIGS. 9A to 9E depicted views of an exemplary plasma cell.

FIGS. 10B to 10E depict exemplary dimensions and a configuration of an exemplary manifold.

FIGS. 13A to 13D depict exemplary dimensions and a configuration of an exemplary transparent window layer of an exemplary plasma cell.

FIGS. 15A to 15D depict exemplary dimensions and a configuration of an exemplary sealant layer or layers of an exemplary plasma cell.

FIGS. 16A to 16D depict exemplary dimensions of an exemplary dielectric layer or layers of an exemplary plasma cell.

FIG. 18 depicts an exemplary graph of experimental results.

FIGS. 19A to 19H depict illustrative displays generated by a graphical user interface (GUI) to monitor and control components of an exemplary plasma disinfectant section, among other things.

SUMMARY

Figure 1A:
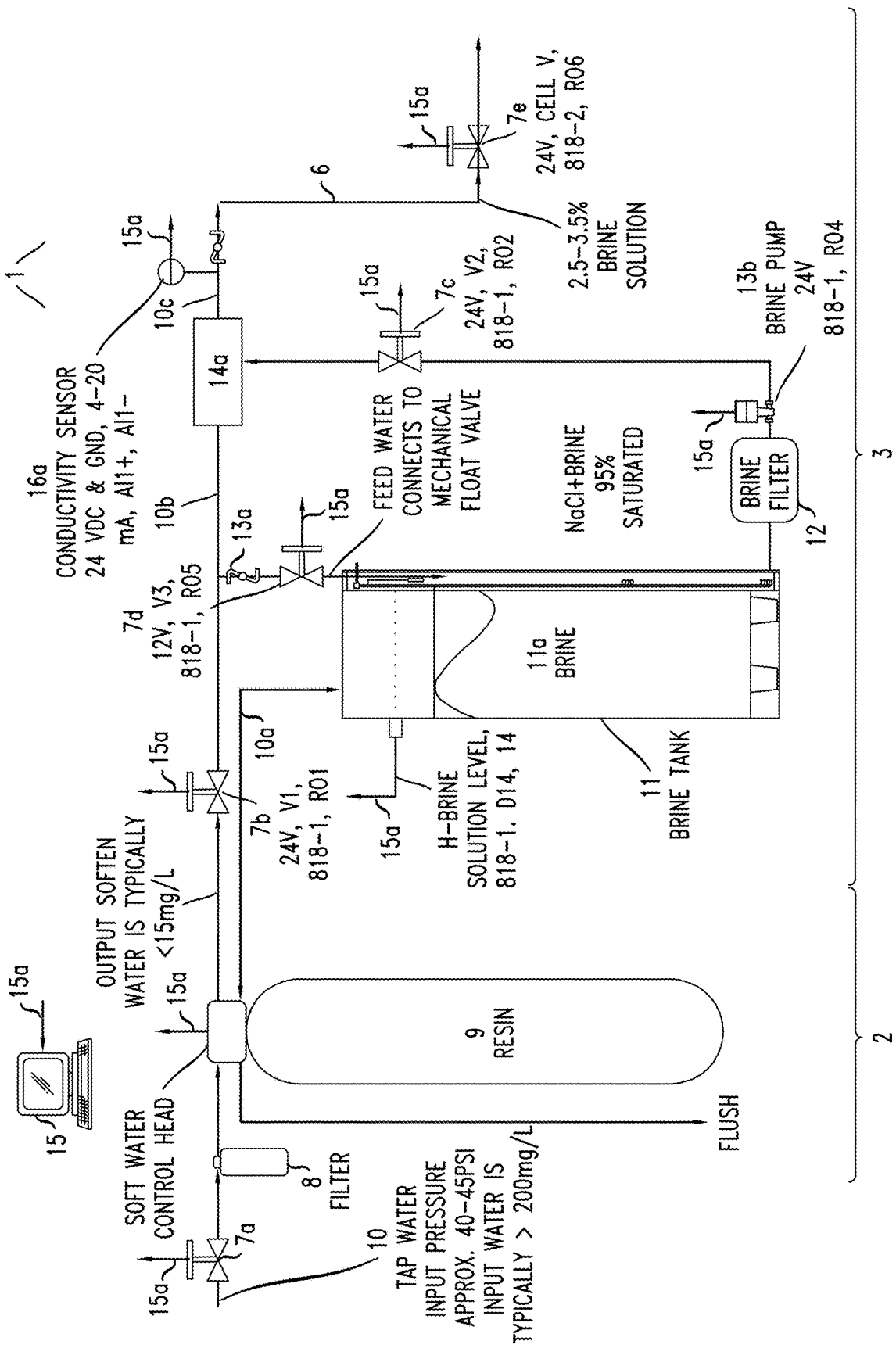
FIGS. 1A to 1C depict an exemplary system for treating biological contaminants, such as *Legionella*.

Methods, systems and devices for treating unwanted material, such as biological contaminants (e.g., *Legionella*), in a water mixture are described herein.

In one embodiment, an exemplary system for treating unwanted material in water (e.g., cooling tower water) may comprise: a plurality of components configured to generate a mixture of hypochlorous and hypobromous acids to control the presence and growth of the unwanted material in the water; a plasma energy generation subsection and a cell structure subsection operable to generate and apply plasma energy to the water to form reactive and molecular species in the water to treat the unwanted material, the cell structure comprising one or more plasma cells and an electrolytic, biocidal treatment chamber; and a control system for controlling the plurality of components, plasma energy generation subsection and cell structure subsection.

The unwanted material treated by such an exemplary system may be composed of at least biological contaminants (e.g., *Legionella pneumophila*) and/or scale. Each of the one or more plasma cells may comprise at least a main body layer, a negative electrode layer, a fluid channel where the water may flow, a first dielectric insulating layer, first and second sealant layers, a positive electrode layer, a second dielectric insulating layer and a protective spacer layer configured between the first and second insulating layers.

Further, each of the one or more plasma cells may comprise at least a transparent window layer. The main body layer and the protective spacer layer may be composed of a plastic, while the transparent window layer may be composed of an acrylic.

In another embodiment the exemplary system may further comprise a manifold connected to each of the one or more plasma cells and configured to allow the water to pass through into a fluid channel layer of a respective plasma cell, where such a manifold may comprise a main body composed of an acetal-based plastic, for example.

The exemplary system may also comprise isolation means for isolating the one or more plasma cells from changes in a flow rate of the water. One component of the isolation means may be a buffer tank.

Another exemplary system for treating unwanted material in water (e.g., cooling tower water) may comprise: a plasma energy generation subsection and a cell structure subsection operable to generate and apply plasma energy to the water to form reactive and molecular species in the water to treat the unwanted material, the cell structure comprising one or more plasma cells and an electrolytic, biocidal treatment chamber, where the unwanted material may comprise at least *Legionella pneumophila* or scale.

Each of the one or more plasma cells may comprise at least a first dielectric insulating layer, a second dielectric insulating layer and a protective spacer layer configured between the first and second insulating layers.

Such a system may also comprise a manifold connected to each of the one or more plasma cells, where the manifold is configured to allow the water to pass through into a fluid channel layer of a respective plasma cell. In an embodiment, the manifold may comprise a main body composed of an acetal-based plastic. The system may also comprise isolation means for isolating the one or more plasma cells from changes in a flow rate of the water. On example of an isolation means is a buffer tank.

In addition to inventive systems, the inventors provide inventive methods for treating unwanted material in water. One such method may comprise: generating a mixture of hypochlorous and hypobromous acids to control the presence and growth of the unwanted material in the water; generating and applying plasma energy to the water to form reactive and molecular species in the water to treat the unwanted material; generating and applying biocidal ions to the water; and a control system for controlling the plurality of components, plasma energy generation subsection and cell structure subsection.

Additional methods, systems and devices provided by the disclosure will become clear to those skilled in the art from the following detailed description and appended drawings.

DETAILED DESCRIPTION, INCLUDING EXAMPLES

Exemplary embodiments of systems, devices and related methods for treating biological contaminants are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

It should be understood that as used herein, the designations "first", "second", "third", etc., is purely to distinguish one component (e.g., app, device, subsystem, section, etc.,) or part of a method or process from another and does not indicate an importance, priority or status. In fact, the component or parts of a process could be re-designated (i.e., re-numbered) and it would not affect the scope of the present disclosure.

As used herein, the terms "embodiment" and "exemplary" refer to an inventive example of the present disclosure.

As used herein, the term "operable to" means "functions to".

As used herein the phrase "unwanted material" includes all types of material, in dissolved or undissolved form which degrades or otherwise detracts from a desired quality of water (e.g., cooling tower water). One non-limiting example of unwanted material includes, but is not limited to, biological contaminants (e.g., *Legionella*).

As used herein the phrases "treat", "treating," "treatment" and other tenses of the word treat mean the inactivation, mitigation, reduction, removal, minimization, dissolution and elimination of unwanted material (e.g., *Legionella*) and the prevention of such unwanted material unless the context indicates otherwise to one skilled in the art.

It should be understood that when the textual description or drawings herein describe a "processor", "microcontroller", "controller", "programmable logic controller (PLC)", or "computer" (collectively "controller") that such a device includes stored, specialized instructions for completing associated, described features and functions, such as computations or the generation of control signals, for example. Such instructions may be stored in onboard memory or in separate memory devices. Such instructions may comprise an application or APP (e.g., an application that is especially downloaded by a user to a mobile device) for completing one or more of the inventive functions or features described herein. Such instructions correspond to specialized functions and features stored in the controllers and test sets to treat harmful biological contaminants in water (e.g., cooling tower water) by controlling one or more inventive systems or devices/components used in such a treatment (e.g., valves, pumps, fans, sensors, dosing devices). Such instructions, and therefore functions and features, are executed by the controllers and/or test sets described herein at speeds that far exceed the speed of the human mind and, therefore, such features and functions could not be completed by the human mind in the time required to make the completion of such features and functions reasonable to those skilled in the art. Further, the inventors know of no existing prior art where the human mind has been used in place of the controllers or test sets to complete the features and functions described herein. It should be understood that an "APP" may include "content" (e.g., text, audio and video files), signaling and configuration files. For the sake of convenience and not limitation, the terms "APP" or "application" may be used herein to refer to any application, but use of such a term also includes a reference to any file or data.

In one embodiment, an APP to be downloaded onto a user device may also reside or be stored on one or more hardware devices, such as a server in whole and/or in part, the latter indicating that the APP may be distributed among, and by, several devices. An APP may be downloaded to a user device from an APP server (or servers) or have been otherwise provided and installed on such a server. A given user device may have a need for one or more of the APPs installed on a server. Accordingly, each of the embodiments described herein includes protocols, necessary hardware, software and firmware resident on a user device for transmitting and receiving an APP, content and/or content identification information relating to the APP from/to a server and vice-versa. Depending on the content to be transmitted, an APP may be installed directly on a user device or may be downloaded from a server by initiating a request to a server to receive a local copy of the APP. When a discussion herein describes the sending and reception of data (i.e., transmissions and receptions) from/to a user device to/from a platform, a web browser and/or APP may be used to complete such transmissions and receptions.

When the disclosure herein describes or illustrates a component or element of a system, device or method (e.g., valve, pump, sensor, fan, dosing device) connected to a controller it should be understood that such a connection may be by wired or wireless means and allows the controller and the component/element to exchange necessary data, signals and control signals in order to transform data in electrical signals to a form that can be processed by the controller/component/element and/or to control the component/element, for example.

It should be understood that the phrase "integrate" or "integrated" means one or more components may be constructed substantially as one unitary device where, generally speaking, the components are connected using short mechanical and/or electrical connections (e.g., piping, electrical wiring, connectors).

In one embodiment, a system comprising a device for applying plasma energy to water may be combined with an electrolytic ionization chamber to reduce unwanted material, such as *Legionella*, in cooling tower water. The chamber may be operable to convert metals with biocidal properties into each metal's respective ions, where the ions may be used to treat (i.e., inactivate) biological contaminants, such as *Legionella*.

Figure 1B:
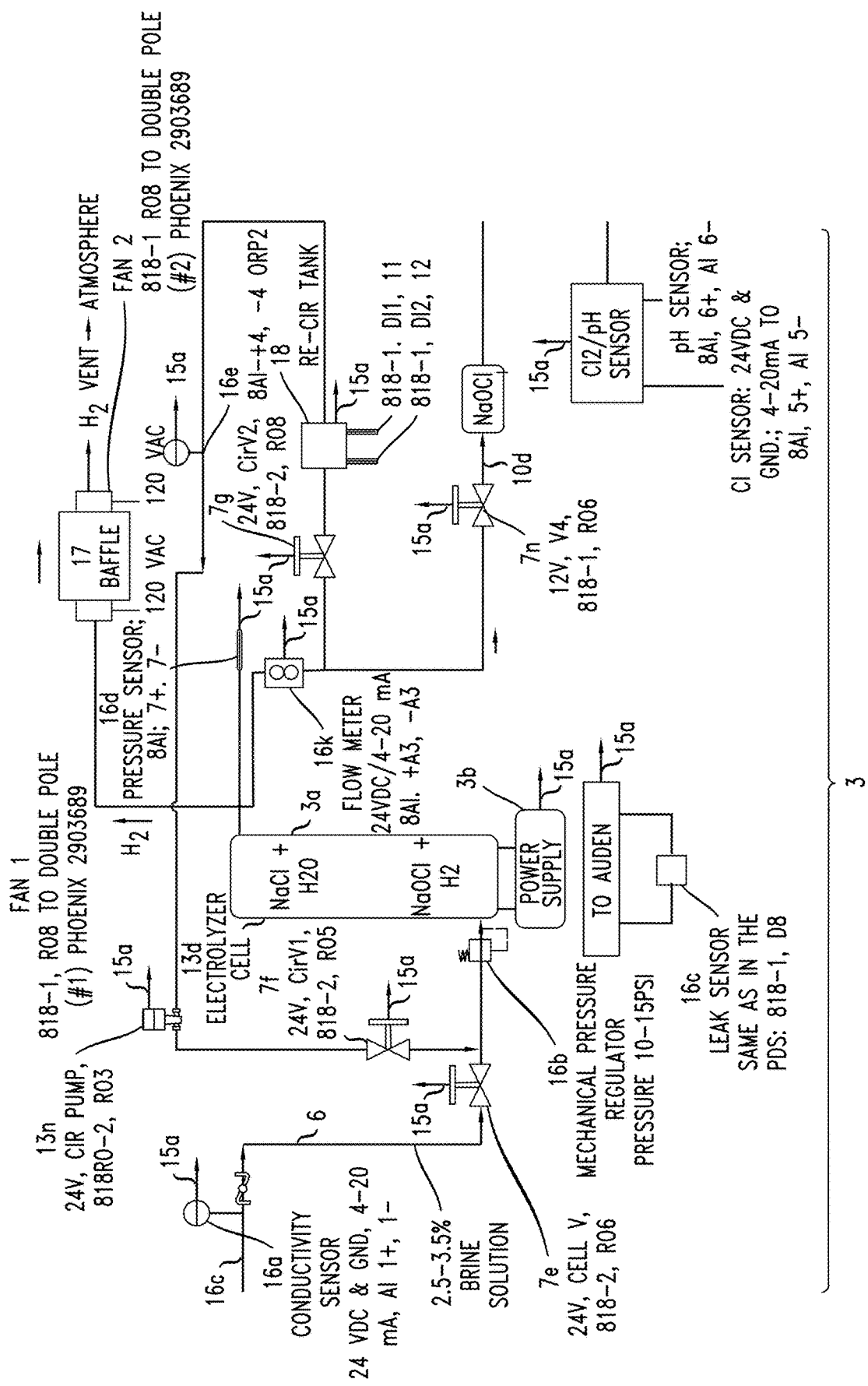
Figure 1C:
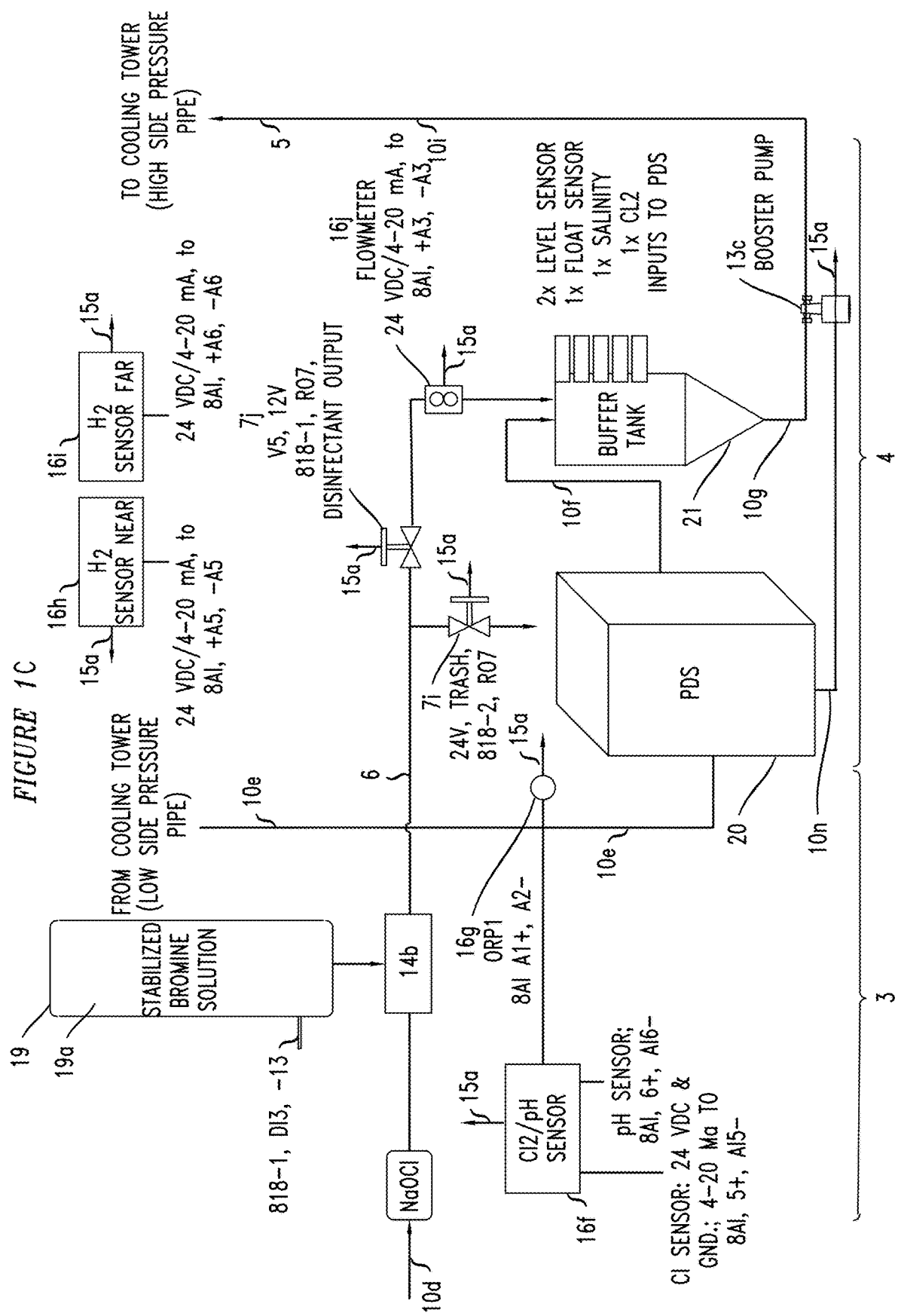

Referring now to FIGS. 1A to 1C there is depicted an exemplary system 1 for treating biological contaminants, such as *Legionella*, in industrial, commercial or residential cooling tower water, to name just a few types of water that may be treated by the system 1.

For purposes of simplifying the explanation that follows, the system 1 may be discussed in terms of a number of treatment sections: a water softener treatment section 2, an electrolysis disinfectant section 3, and a plasma and biocidal ion disinfectant treatment section 4 though it should be understood that one or more of these sections may be combined or integrated into fewer sections or, alternatively, expanded into additional sections.

In an embodiment, to reduce unwanted material (e.g., *Legionella*) in cooling tower water, among other types of liquids/water, the cooling tower water may be treated by a mixture of hypochlorous and hypobromous acids generated and output by sections 2, 3 and/or by passing the cooling tower water through section 4. More particularly, the water may be treated by sections 2, 3 and 4, or by sections 2, 3 or by section 4 depending on desired parameters (e.g., concentration of unwanted material, such as *Legionella*, required to be removed, reduced).

Components of sections 2, 3, and 4 (e.g., components configured to generate a mixture of hypochlorous and hypobromous acids in sections 2, 3, a plasma energy generation subsection and a cell structure subsection in section 4) may be controlled by a control system that may comprise one or more controllers 15, 15b, test set 21 and/or programmable logic controllers ("PLCs"; see PLCs 20cc in FIG. 3) along with sensors, valves, and dosing devices among other components of a control system. The controllers and/or PLCs can operate independently or in concert with one another by sending or receiving instructions to perform various treatment protocols as necessary. The controllers and PLCs may be IoT capable and compatible and may be able to upload system and treatment protocol parametric data to a "cloud" telecommunications network.

An exemplary control system may include one or more control valves 7a to 7n (where "n" indicates the last valve), one or more sensors and meters 16a to 16n (where "n" indicates a last sensor or meter), and one or more pumps 13a to 13n (where again "n" indicates a last pump) that may be controlled manually or by signals received, for example, from a controller 15 and/or test set 21 via a data bus 15a (e.g., which may be an IoT databus). The controller 15 and/or test set 21 may be connected to an IoT based network (see FIG. 3 and element 15b and wireless or wired link 15d), for example, where IoT compatible or convertible signals from sensors may be stored as measurement data in a local or remote data archive (e.g., a database).

As will be explained in more detail, the inventors describe three treatment mechanisms for treating unwanted material in water, including *Legionella*: (1) the application of plasma streamers, (2) the application of biocidal ions, and (3) the application of hypochlorous/hypobromous acids. Each treatment protocol can be activated/de-activated independently or in combination by a control system. For example, a control system (e.g., controller 15, 15b, test set 21 and/or PLCs 20cc, sensors, valves and dosing devices) may control components of the system 1 to (i) apply plasma streamers to the water while at the same time controlling other components to apply hypochlorous/hypobromous acids to the water, or (ii) apply plasma streamers and biocidal ions to the water or (iii) apply hypochlorous/hypobromous acids and biocidal ions to the water to treat unwanted material.

In embodiments, the determination as to whether to apply plasma streamers, hypochlorous/hypobromous acids and/or biocidal ions (referred to as "protocols") to treat water may depend on a number of factors, such as the temperature of the water or the type of unwanted material (e.g., biocontaminants) being treated. For example, if the control system detects that the water is cold, the control system may control components of system 1 so that all three treatment protocols are applied simultaneously. However, if the control system detects the water is warm then perhaps the control system may control components of the system 1 so that only two of the three protocols may be used.

Relatedly, one or more of the three protocols may be used depending on the type of unwanted material to be treated. For example, a control system may control components of the system 1 to only apply plasma steamers to target Gram-negative bacteria. Alternatively, a control system may control components of the system 1 to apply hypochlorous/hypobromus acids to target heterotrophic bacteria only. In sum, one or more of the three treatment protocols may be applied depending on the type of bio-contaminant sought to be treated.

In embodiment, a controller 15, 15b, test set 21 and/or PLC 20cc that is part of a control system may be programmed in advance to control components of system 1 to apply one or more of the treatment protocols.

In one embodiment, a controller 15, 15b, test set 21 and/or PLC 20cc that is part of an inventive control system may electronically store electronic signals that correspond to comma-delimited text-based files to control the components of sections 2, 3 and/or 4 to apply one or more of the three treatment protocols. In an embodiment, an inventive controller 15, 15b, test set 21 and/or PLC 20cc may be configured to store instructions in such files that control the duration, duty cycle, and dosage amounts that correspond to each treatment protocol.

In addition, an inventive controller 15, 15b, test set 21 and/or PLC 20cc that is part of control system may be configured with stored instructions to modify a treatment protocol (duration, duty cycle, dosage) depending on the feed requirement of the treatment protocol. Further, pH and ORP sensors and dosing devices that are a part of a control system may be communicatively connected to a controller 15, 15b, test set 21 and/or PLC 20cc to measure/detect and then regulate the amount of hypochlorous acid, hypobromous acid and biocidal ions that are applied to the water.

In an embodiment, a controller 15, 15b, test set 21 and/or PLC 20cc that are part of a control system may be configured to generate data and reports and store such data and reports in a cloud-based data archive (e.g., controller 15b may be a component in a cloud-based telecommunications network) to determine the performance of the system 1 and the quality of the water being treated.

To illustrate how each section treats a liquid such as cooling tower water, we begin with a discussion of sections 2, 3 followed by a discussion of section 4.

In an embodiment, a plurality of components in sections 2, 3 may be configured to generate a mixture of hypochlorous and hypobromous acids to control the presence and growth of unwanted material in the water (e.g., biological contaminants such as *Legionella*).

In one embodiment a source of water (e.g., so-called "hard" water) may be input at point 10 of section 2 shown in FIG. 1A. Thereafter, such water may flow via piping 6 or other conduits for transporting water or other fluids and gases (collectively "piping"), through valves 7a to 7n and pumps 13a to 13n into the water softener treatment section 2, then sequentially into the electrolysis disinfectant section 3. The treated water may exit sections 2, 3 where it may be mixed with cooling tower water (see point 10e) to treat unwanted material, such as *Legionella*.

In an embodiment, controller 15 and/or test set 21 may be operable to control the flow of water in piping 6 through sections 2, 3 (and section 4) by controlling, for example, valves 7a to 7n and pumps 13a to 13n, among other components.

In alternative embodiments the water may flow through sections 2, 3 in a different sequence if the sections are re-configured or re-arranged. Further, though not shown in FIGS. 1A to 1C, some or all of the water may be rec-cycled or re-circulated back to one of the sections 2, 3 for further treatment, if needed.

In an embodiment, the exemplary water softener treatment section 2 may include input piping 6 for transporting untreated water 10 (again, "hard" water from a public utility or well for example), a filtration system 8 for receiving the untreated water and filtering it to remove contaminants and a resin tank 9 with its associated control valves and timer for further treating the untreated water to remove unwanted material, such as calcium and other minerals in order to "soften" the water. Once the water has been softened, output piping 6 may transport a first portion of the softened water (e.g., water that contains unwanted material of less than 15 milligrams/liter) to components of exemplary section 3 via piping 6 to a tank 11 (see point 10a in FIG. 1A for example).

In embodiments, the tank 11 may be configured to receive the first portion of the softened water via piping 6 and may mix the softened water with a stored or supplied brine solution (e.g., 95% saturated with NaCl) to form and store mixture 11a. In an embodiment, an agitator (not shown in figures) may be operable to mix the softened water with the brine solution to remove calcium in the water through a chemical reaction that exchanges the mineral sodium in the brine solution with calcium in the first portion of the water.

In embodiments, it is believed that the substitution of sodium for calcium allows the mixture 11a to more effectively produce hypochlorite to treat water (e.g., reduce *Legionella* and reduce scale).

To monitor the level of the mixture 11a of water and brine solution, the tank 11 may include a mechanical or electro-mechanical float, for example (not labeled in FIG. 1A) that may or may not be connected to controller 15 and/or test set 21 (e.g., the float may be connected to a visual meter and/or to the controller 15 and/or test set 21).

In more detail, the brine solution may compose a minimum 3.5 kilograms (kgs) of sodium chloride (NaCl, or "salt") per kilogram of water, which is believed to be a concentration sufficient to allow for the chemical exchange of calcium for sodium in the water in order to generate mixed oxidants in the water. In an embodiment, calcium and other unwanted materials (e.g., minerals) may be present in the first portion of the softened water that is received in the tank 11. High levels of calcium in water may lead to clogging of electrolytic cells of the disinfectant treatment section 3 and in piping 6 due to the formation of unwanted material, such as scale, as well as a reduction in efficiency of heat exchangers (e.g., cooling towers 5) when scale forms on the surfaces, etc. Accordingly, section 3 may be operable to add (e.g., using valve 13a) the first portion of the softened water with the brine solution (e.g., a homogeneous mixture of sodium chloride and water) to form the mixture 11a in tank 11 in order to reduce the concentration of calcium in the first portion. For example, the concentration of calcium may be reduced from 200 milligrams per liter to 15 milligrams per liter in the water, to name one exemplary concentration reduction. The inventors believe that the reduction in scale and/or biofilm leads to an increase in the efficiency of heat transfer systems (heat exchangers, cooling towers) which in turn may reduce the carbon footprint of such systems.

Mineral compounds (salt, calcium, or magnesium, etc., dependent on the water source) may settle at the bottom of tank 11. Accordingly, in one embodiment, the tank 11 may include a valve (not shown) for removing the compounds during a backwashing process, for example.

In an embodiment, section 3 may include a heater (not shown) to heat the mixture 11a in the tank 11 in order to accelerate the dissolution of the salt in the water, along with agitation using, for example, an agitation motor and propeller (not shown in figures). Further, a salometer (not shown) connected to the controller 15 and/or test set 21 may be connected to the tank 11 in order to monitor the salt concentration in the mixture 11a to ensure appropriate, minimum salt concentrations are generated to enable the production of mixed oxidants.

In embodiments, the salt concentration of the brine solution may be increased depending on the needs of the specific application by, for example, adding more salt (e.g., manual addition of salt).

As shown in FIG. 1A, the mixture 11a may be output from the tank 11, pass through a brine filter 12 that may be operable to remove particulate (e.g., undissolved brine) and pass through to a pump 13b which functions to forcibly move and transport the mixture 11a through valve 7c to a first dosing device 14a (e.g. a DOSATRON® metering device).

Further, as also shown in FIG. 1A, a second portion of the softened water (e.g., flowing in piping at point 10b) may be transported by piping 6 to the dosing device 14a by operation of diverting valve 7b and pump 13a, for example. In an embodiment, the controller 15 and/or test set 21 may be operable to send electrical signals to the diverter valve 7b to open the valve 7b in order to allow the second portion of softened water to flow to the pump 13a which then may forcible move the second portion to the dosing device 14a via piping 6, for example.

In an embodiment, the first dosing device 14a may be operable to receive the second portion of the softened water and the saltwater mixture 11a output from the tank 11. Thereafter, the first dosing device 14a may be operable to variably output a revised mixture of the softened water and saltwater having a brine concentration between 2.5 to 3.5% of the total mixture, for example (at point 10c). In embodiments, it is believed that this concentration level of the brine solution promotes the formation of useful reactive and molecular species in the water that may be used to treat biological contaminants, such as Legionella. More particularly, it is believed that the mixture (e.g., the mixture at point 10c) may comprise a mixture of an electrolyte, such as sodium chloride, and water, for example. In an embodiment, exemplary hypochlorite, a chlorine oxo-anion, a chloride oxide and a monovalent inorganic anion may be formed and used to treat biological contaminants, such as Legionella.

In an alternative embodiment, the valves 7b, 7c and pumps 13a, 13b may be turned off (e.g., manually, or by receiving electrical signals from controller 15 and/or test set 21) to allow softened water to flow through to the tank 11 to clean the tank 11.

System 1 may further comprise one or more pressure regulators configured on the inputs to the first dosing device 14a to monitor and control the water pressure of the mixture 11a output from the tank 11 and the second portion of the softened water. In an embodiment, the pressure regulator(s) may be further configured to release pressures that exceed 15 PSI, for example. In one embodiment, the pressure regulators may be connected to the controller 15 and/or test set 21 via databus 15a to allow the controller 15 and/or test set 21 to receive pressure measurements from the regulators and to send electrical signals to the regulators to release pressure, for example. Alternatively, the pressure regulators may comprise electronics or electromechanical elements that enable it to release pressure without communicating with the controller 15 and/or test set 21.

Referring stills to FIG. 1A, a conductivity sensor 16a may be configured to measure the conductivity of the mixture output by the first dosing device 14a (e.g., at point 10c). As indicated previously, the first dosing device 14a may be operable to variably output a revised mixture of the softened water and salt water having a brine concentration between 2.5 to 3.5% of the total mixture, for example, based on the measured conductivity. In embodiments, the sensor 16a may be connected to the controller 15 and/or test set 21 via bus 15a (which may be an IoT databus) in order to send the controller 15 and/or test set 21 electrical signals representing conductivity measurements. Upon receiving the signals, the controller 15 and/or test set 21 may be operable to convert the signals to a conductivity level, compare the measured level to a stored level (e.g., a threshold between 2.5 and 3.5% concentration) to determine whether the measured level exceeds the stored level. In an embodiment, if the controller 15 and/or test set 21 determines that the measured level falls outside the stored levels (e.g., thresholds) the controller 15 and/or test set 21 may send instructions (i.e., electrical signals) to the first dosing device 14a via data bus 15a and/or test set 21 which the device 14a receives and uses to adjust the amount of mixture 11a and/or second portion of the softened water (from point 10b) that is added to the mixture output from the device 14a (at point 10c) in order to adjust the conductivity to a range within 2.5 to 3.5%, for example.

In one embodiment, the mixture containing the useful reactive and molecular species output from the first dosing device 14a may be sent from section 2 to section 3 via piping 6 in order to generate hypochlorite (i.e., hypochlorous acid) that may then be used to effectively treat Legionella and other biological contaminants (see FIGS. 1A and 1B).

In more detail, the mixture containing two to three percent brine solution (see point 10c) may be fed to components of section 3. In an embodiment, the components of section 3 may be configured to generate hypochlorite ions and output a mixture at point 10d at an exemplary rate of approximately 70 g/hr., for example.

To generate the hypochlorite ions, in an embodiment section 3 may comprise a chamber 3a (see FIG. 1B) that may be configured to receive the mixture from the first dosing device 14a and output a mixture to point 10d, for example. Chamber 3a may include one or more positively charged anodes and negatively charged cathodes (collectively "electrodes"; not shown in FIG. 1B but see elements 3c, 3d in FIGS. 2A to 2D) and a direct current (DC) power supply 3b. The power supply 3b may be operable to supply the electrodes with a variable amount of DC power. As the mixture received from the first dosing device 14a flows into and between each positive and negative electrodes in chamber 3a, the DC current generated by the supplied DC power may be applied to, and conducted through, the brine solution in the mixture. The so-applied DC current in turn functions to dissociates sodium chloride in the mixture into sodium (Na+) and chlorine (Cl—) ions to form hypochlorite ions output within the mixture that is output (e.g., point 10d) in accordance with the following chemical reactions:

Main Reactions:

Chlorine Generation at the Anode:

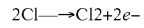

$$2Cl^- \rightarrow Cl_2 + 2e^-$$

Hydrogen evolution and hydroxide formation at the cathode:

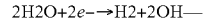

$$2H_2O + 2e^- \rightarrow H_2 + 2OH^-$$

Chlorine and hydroxide ions react to form hypochlorite:

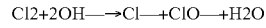

$$Cl_2 + 2OH^- \rightarrow Cl^- + ClO^- + H_2O$$

Production of overall hypochlorite mass balance:

In sum, each positive and negative set of electrodes may be operable to form a concentration of hypochlorite ions over a given period of time with a higher electrical current producing a higher concentration of hypochlorite that output from chamber 3a depending upon the magnitude of the DC current supplied to the electrodes by the power supply 3b and upon the flow rate of the mixture that is input into chamber 3a. The hypochlorite ions function to inactivate bacterial contaminants, such as *Legionella*, in the mixture that I spout put from chamber 3a according to one embodiment of the invention.

Referring now to FIGS. 2A to 2D there are depicted different configurations of the electrodes 3c, 3d within chamber 3a. In embodiments, depending on the configuration the voltage and current required for (and applied by) a plurality of positive and negative electrodes may vary.

In more detail, the electrodes may comprise anode or cathode plates. Sets of anode and cathode plates may be configured in parallel or series configurations to alter the voltage or current required during electrolysis.

Figure 2B:
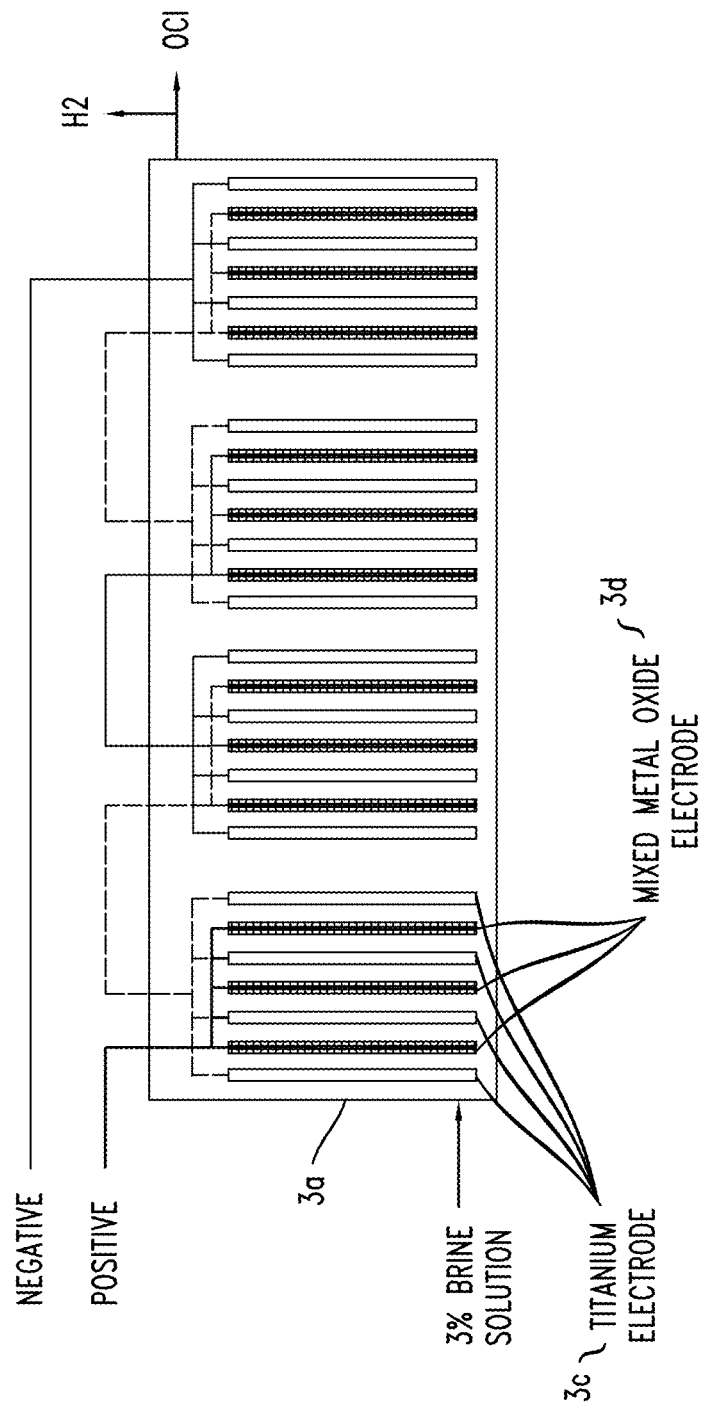
Figure 2D:
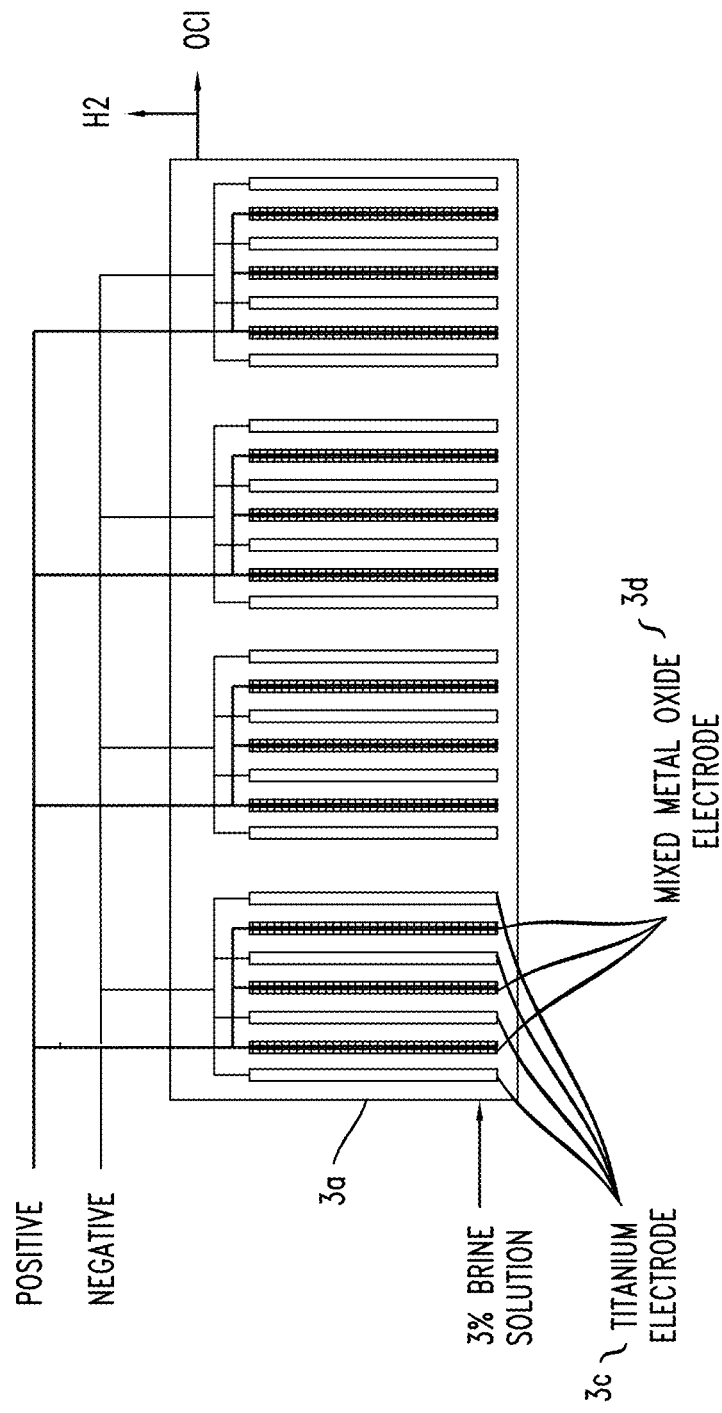

FIGS. 2A and 2D depict a plurality of negatively charged electrodes 3c and positively charged electrodes 3d configured in a parallel-serial or serial-parallel configuration (e.g., a first group of seven electrodes and a second group of seven electrodes may be connected in parallel as are a third group of seven electrodes and fourth group of seven electrodes, while, in addition the second and third groups of electrodes are also connected in series with the third and fourth group of electrodes), FIG. 2B depicts a plurality of negatively charged electrodes 3c and positively charged electrodes 3d configured in serial configuration, and FIG. 2C depicts a plurality of negatively charged electrodes 3c and positively charged electrodes 3d configured in a parallel configuration.

In the embodiments depicted in FIGS. 2A to 2D chamber 3a is shown comprising four groups of seven electrodes (28 in total; four negative electrodes 3c and three mixed metal oxide positive electrodes 3d per group), though it should be understood that this is merely exemplary. That is to say chamber 3a may comprise more or less than seven electrodes within a group of electrodes (e.g., 3, 5, 9, 11 electrodes, etc.,) and/or chamber 3a may comprise more or less groups of electrodes (1, 2, 3, 5, 6, groups etc.).

Regardless of configuration, each negative electrode 3c may comprise multiple, material layers and may be composed of a titanium mesh or similar material while each positive electrode 3d may comprise multiple, material layers and may be composed of a titanium mesh with a mixed metal oxide layer covering the titanium layer. In embodiments, an electrode composed of a mixed-metal oxide (e.g., ruthenium oxide, iridium oxide), or platinum oxide) is believed to conduct electricity and catalyze chlorine gas.

In an embodiment, one or more negative and positive electrodes may comprise an electrolysis "cell" where each cell may be enclosed in a steel baffle. The steel baffle may be configured to isolate its respective cell to protect the electrodes from the pressures from the build-up of gases (e.g., hydrogen gas) applied to each electrode.

Further, in one embodiment an epoxy resin may be applied to electrical connections of each electrode to protect the connections from the mixture to limit oxidation which degrades the ability of the electrodes to generate a sufficient voltage or current required for the generation of hypochlorite ions (i.e., electrolysis).

Still further, in an embodiment the exemplary, non-limiting dimensions of each electrode 3c, 3d may be six inches in height and 2 inches in width. In an embodiment, each negative electrode 3c may be spaced 2 millimeters away from each positive electrode, for example. Based on the spacing (e.g., 2 millimeters) between each set of electrodes 3c, 3d an exemplary voltage between such electrodes may be 0.625 volts (V) while an exemplary current generated in the mixture may be 3 amps (A) measured at the positive electrode 3d. Accordingly, an exemplary current density may be 38 milliamps (mA) per square centimeter ($cm^2$) for each positive electrode 3d (and similarly, for each negative electrode).

In embodiments, exemplary voltages, $V_{cell}$, and currents, $I_{cell}$, supplied by the DC power supply 3b to each configuration shown in FIGS. 2A to 2C may be as follows:

Electrodes connected electrically in series:

$$V_{cell} = 15V, I_{cell} = 18A$$

Electrodes connected electrically in parallel:

$$V_{cell} = 3.75V, I_{cell} = 72A$$

Some electrodes connected electrically in parallel, others connected in series:

$$V_{cell}, 7.5V, I_{cell} = 36A$$

Some electrodes connected electrically in series, others connected in parallel:

$$V_{cell} = 7.5V, I_{cell} = 36A$$

Referring back to FIG. 1B there is shown a recirculation tank 18. In an embodiment the tank 18 may be configured to store brine (e.g., water with a 1 to 2.5% salt concentration) that can be fed to chamber 3a as needed. In an embodiment, the brine solution may be re-circulated through the electrodes within chamber 3a to generate hypochlorite ions until all the chloride within the solution is used. The tank 18 may be configured with upper threshold and lower threshold level sensors (not shown in figures) that may be configured to detect the concentration or amount of chloride with the solution to enable electrolysis (i.e., generation of hypochlorite ions, among other things).

The generation of hypochlorite ions may generate hydrogen gas at the top of the recirculation tank 18. Accordingly, to protect the tank 18 and the electrodes 3c, 3d within connected chamber 3a from the pressures of such gas as the gas builds up, the gas needs to be released or removed from the tank 18. In an embodiment, an exhaust baffle 17 may be connected to the tank 18 to assist in the release or removal of such gases.

In embodiments, pressure sensor 16d may be configured to monitor the gas pressure within chamber 3a. In one embodiment, it is preferably to maintain a pressure that is below 14 to 15 PSI within chamber 3a.

To vent any required gas, the exhaust baffle 17 may comprise a manifold that is configured to allow the hydrogen gas (among other gases) to be mixed with ambient air to limit the concentration of hydrogen gas so that the gas that is thereafter released to the atmosphere has a reduced amount of hydrogen. In an embodiment, the concentration of hydrogen in the released gas is at a lower explosion limit level of less than 4% concentration in air that is safe.

As noted previously, the mixture that is output from the chamber 3a includes hypochlorite ions that function to treat (e.g., inactivate) bacterial contaminants, such as *Legionella*, in the mixture. Though favorable to treat *Legionella*, the inventors discovered that hypochlorite ions (i.e., hypochlorous acid) may lose its effectiveness at a pH greater than 7.5. Further, many cooling towers operate with water above a pH of 7.5 pH (e.g., upwards to a pH of 9.5). Accordingly, in an embodiment, the system 1 may include components for adding a stabilized bromine to hypochlorous ions which becomes hypobromous acid. By so doing, the system 1 may be able to maintain the pH of the treated up to a pH of 9.5 pH because hypobromous is effective as an oxidizer to kill *Legionella* at such a pH.

Accordingly, the inventors include components that monitor the concentration of sodium hypochlorite and adjust the level when necessary by, for example, adding stabilized bromine 19a stored in tank 19 to chlorine in the mixture that is output from chamber 3a as explained in further detail herein (see FIG. 1C).

In an embodiment, a pH sensor 16f may be configured to measure the pH of the mixture output from a second dosing device 14b to determine whether the concentration of hypochlorous or hypobromous acid exceeds a threshold. For example, a pH above 7.5 may be desirable because it indicates that the mixture is a hypobromous acid rather than a hypochlorous acid, which is more effective in killing biological contaminants at a pH greater than 7.5.

In an embodiment, electrical signals representing a pH may be generated by sensor 16f and sent to the controller 15, test set 21, for example, or, alternatively, to a metering device. When, and if, controller or test sets (or alternatively, the sensor 16f itself) determines that the pH of the mixture output from a second dosing device 14b falls below a pH of 7.8, for example, (indicating the concentration of hypochlorous acid is too high) then controller 15 and/or test set 21 may be operable to send electrical signals to components of section 3 to change the pH of the mixture.

For example, in one embodiment the controller 15 and/or test set 21 may send signals to the second metering device 14b to add stabilized bromine 19a into the mixture containing hypochlorite acid. In embodiments, the amount of stabilized bromine added to the mixture by the second metering device 14b may be an amount that is associated with a 1:to 0.17 ratio of chlorine to bromine. Said another way, for every 100% per volume of hypochlorite acid that flows through the pump, 17% per volume of stabilized bromine may be added to the mixture output from the second dosing device 14b to form hypobromous acid.

System 1 may further include an automatic feedback control system. For example, a first on-line oxidation-reduction potential (ORP) sensor 16g (see FIG. 1C) may detect the concentrations of bromine and chlorine in the mixture output from the second dosing device 14b and send an appropriate electrical signal to the controller 15 and/or test set 21 which in turn compares the concentrations to stored thresholds and, if necessary, generates and sends electrical signals representing instructions to the power supply 3b that powers each electrolyzer cell comprising a pair of positive and negative electrodes 3c, 3d in order increase the amount of hypochlorite to the mixture output from a second dosing device 14b in order to control the concentrations of sodium hypochlorite and hypobromous acid in the mixture that, in turn, controls the presence and growth of unwanted material (e.g., bacteria) while protecting components of the system 1 and cooling tower 5.

Still further, the on-line amperometric free-chlorine sensor 16f may be configured to monitor the free-halogen residual. In an embodiment, the amperometric sensor may be configured to measure the concentration of chlorine using an internal current sensor whose current is proportional to the concentration of chlorine and send the measurement (as an electrical signal or signals, i.e., data) to the controller 15 and/or test set 21 via databus 15a (e.g., RS 485 bus, IoT bus).

It should be understood that the generation of sodium hypochlorite and hypobromous acid described herein and shown in the figures is one generation method. Other components (e.g. a plurality of different or similar components) and methods may be used that fall within the scope of the present disclosure (e.g., fillable tanks full of sodium hypochlorite and hypobromous acid) provided such methods also control the presence and growth of unwanted material (e.g., bacteria) while protecting components of the system 1 and the cooling tower 5.

Having explained some of the features of components of sections 2 and 3 that may be used to treat cooling tower water, we now turn our attention to a discussion of some of the features of components of the plasma disinfectant treatment section 4 that also may be used to treat cooling tower water.

As is explained in more detail herein, the inventors believe that rotational and vibrational excitation, electron avalanche, dissociation, and ionization processes produced by the generation of plasma streamers by components of section 4 that are then applied to water (e.g., cooling tower make-up water) initiates chemical reactions that effectively treat unwanted material such as *Legionella*.

Referring now to FIG. 1C, in an embodiment exemplary section 4 may comprise a plasma disinfectant system (PDS) 20, booster pump 13c, buffer tank 21, one or more valves 7i, 7j and one or more sensors and meters 16j (e.g., flow meter) to name some of the components of section 4 though it should be understood that the buffer tank 21 is also connected to an output from section 3.

Figure 3:
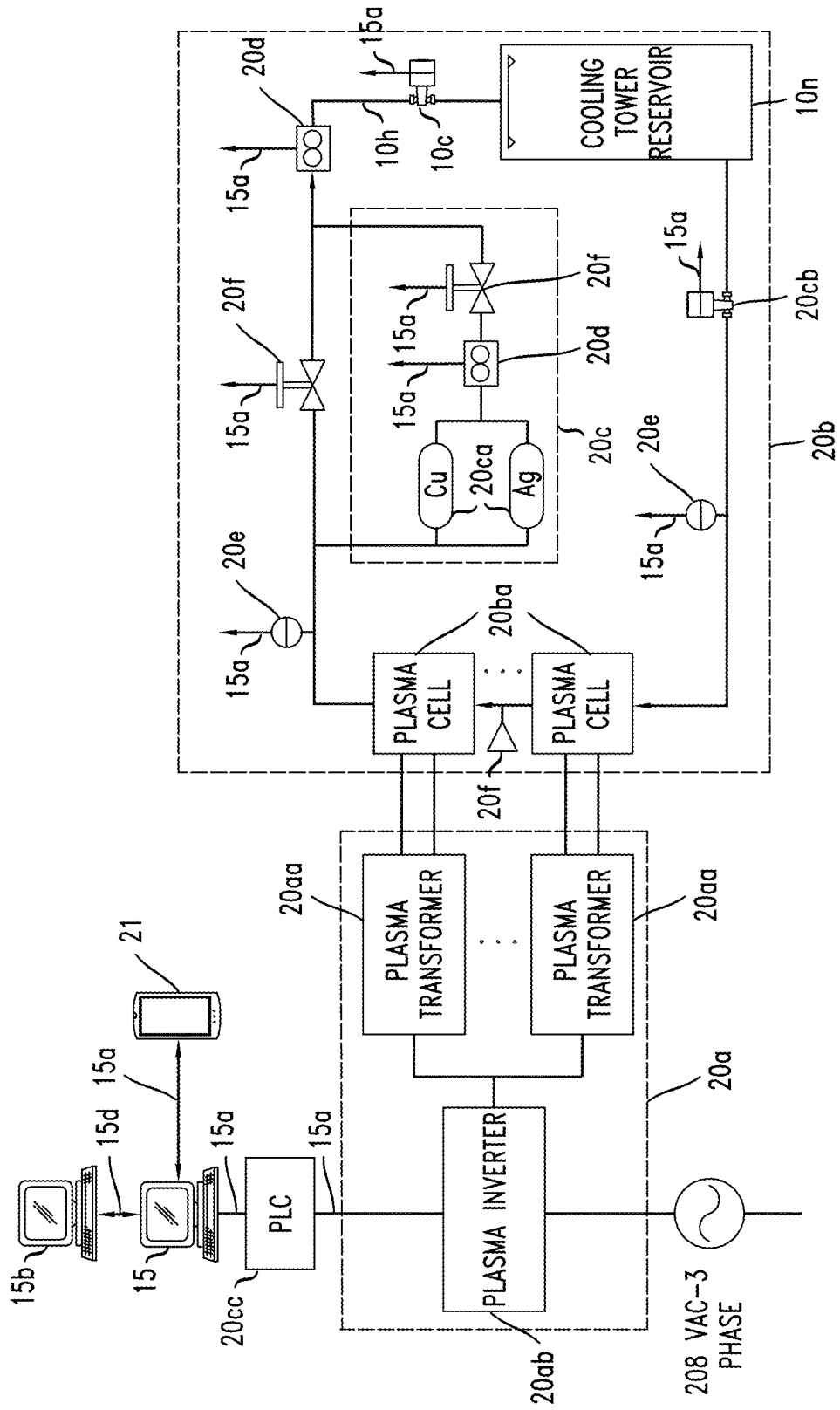
FIG. 3 depicts an enlarged version of an exemplary plasma disinfectant treatment section according to an embodiment.

Referring now to FIG. 3, there is depicted components of the exemplary plasma disinfectant treatment section 4 according to an embodiment. As shown the section 4 may comprise a plasma energy generation subsection 20a and a cell structure subsection 20b which together are operable to, among other things, generate and apply plasma energy to cooling tower water received from the cooling tower in order to form, among other things, reactive and molecular species in the water to treat unwanted material in the water (e.g., biological contaminants such as biofilm, *Legionella* and/or scale, biologically induced corrosion) as well as reduce the carbon footprint of the operation of the cooling tower 5. In embodiments, sections 20a and 20b generate and apply plasma energy in the form of full or partial discharges to control sessile and planktonic bacteria, including *Legionella* and heterotrophic aerobic bacteria (HAB), among other unwanted materials, as described in more detail herein.

As shown, subsection 20b may comprise one or more plasma cells 20ba and an electrolytic, biocidal treatment chamber 20c while subsection 20a may comprise one or more transformers 20aa and inverters 20ab. In an embodiment, each transformer 20aa may be connected to a separate cell 20ba and to an inverter 20ab. It should be noted that though only two cells 20ba are depicted in FIG. 3 this is merely exemplary and non-limiting. The number of cells may match the treatment parameters of a given application (e.g., 7 cells, 14 cells, 21 cells, etc.,) and may be configured within a single structure (e.g., enclosure).

Figure 4:
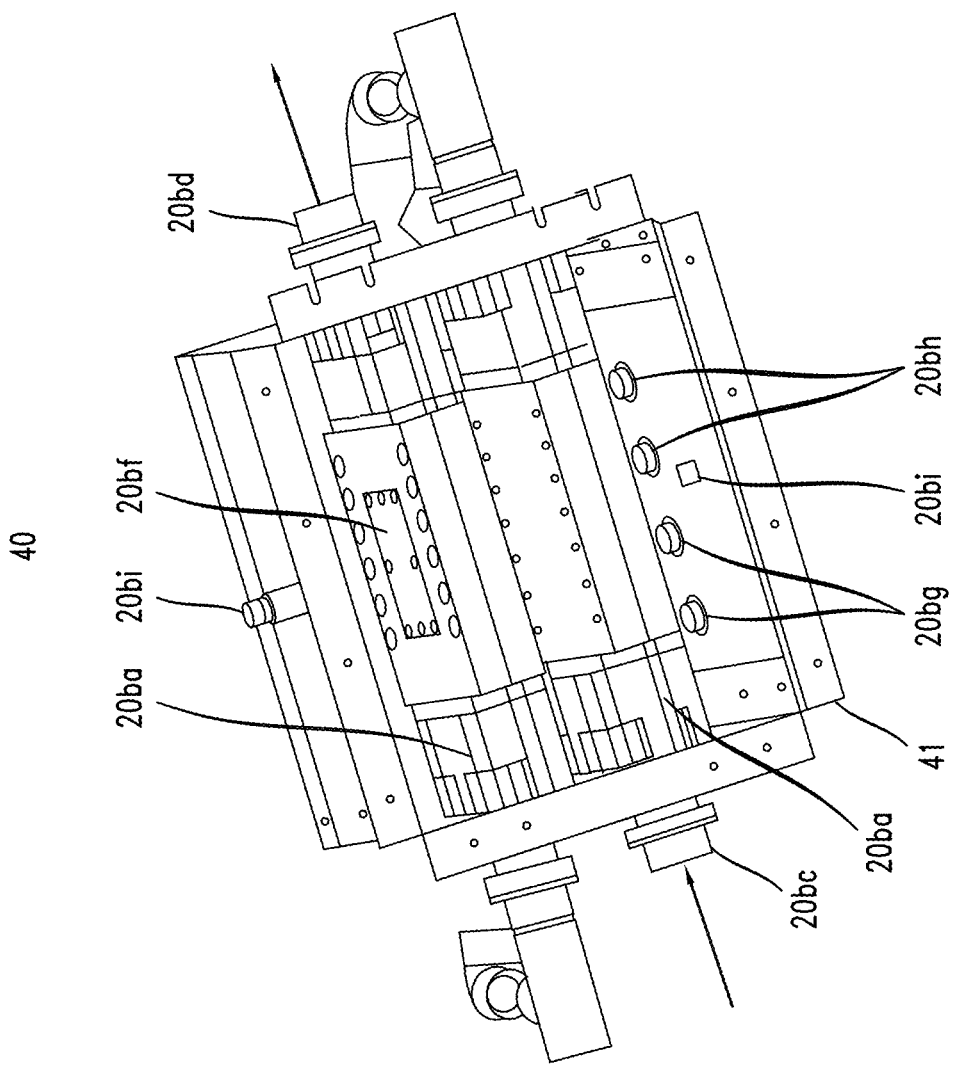
FIG. 4 depicts an enlarged view of an exemplary plasma cell assembly that may contain one or more plasma cells according to an embodiment.

Referring now to FIG. 4 there is depicted an enlarged view of an exemplary plasma cell assembly 40 that may contain one or more plasma cells 20ba (one, two or more cells). In an embodiment, cooling tower water may flow into fluid inlet 20bc where it may then be treated by cells 20ba within assembly 40. The so-treated water may then flow out of the assembly 40 via fluid outlet 20*bd*. In an embodiment, the assembly 40 may comprise an electromagnetic interference (EMI) shielded enclosure 41 configured to surround the cells 20*ba* and to prevent electromagnetic signals that are generated by the plasma cells 20*ba* within the enclosure 41 from emanating outside the enclosure. In one embodiment, the enclosure 41 may function to attenuate such signals at a level of 80 to 90 dB, for example. Further, each cell (or a group of cells) 20*ba* may be surrounded by a protective splashguard (not shown in FIG. 4). In an embodiment, the splashguard(s) function to protect the electronics within the enclosure 41 from being exposed to the water should one of the cells 20*ba* leak the water.

Electrical power may be provided to each of the cells 20*ba* via electrical conductors 20*bh* (only conductors connected to one cell 20*ba* are shown in FIG. 4, though similar conductors are connected to each cell 20*ba*). To prevent dangerous electromagnetic arching from occurring between the enclosure 41 and the conductors 20*bh* each of the conductors 20*bh* may be surrounded by one or more dielectric spacers 20*bg* (only spacers surrounding one conductors 20*bh* are shown in FIG. 4, though similar spacers may be used with each conductor).

Also shown in FIG. 4 are temperature sensors 20*bi*. In an embodiment, one sensor 20*bi* may be configured to detect the temperature of one cell 20*ba*, for example. In an embodiment, the sensor 20*bi* may comprise infrared (IR) sensors that function to detect a wide range of temperatures, e.g., 0 to °1000 F. In an embodiment, if the sensor 20*bi* detects a temperature that approaches 60° C. (140° F.) then the system 1 (e.g., controller 15 and/or test set 21) may be operable to remove the power being supplied to the cell(s) 20*ba*, in effect shutting it (them) off.

In the embodiments depicted in FIGS. 3 and 4 the cells 20*ba* are configured in series where water flows through an inlet (e.g., inlet 20*bc*) into a first cell 20*ba* and is treated, and then is fed by piping (not shown in figures) into additional cells 20*ba* for additional treatment before exiting via outlet 20*bd*. It should be understood, however, that inventive cells may be configured in series or in parallel the details and configurations of which are set forth in detail in the '503 Application and incorporated by reference herein or in a parallel-series configuration.

In an embodiment, each of the cells 20*ba* may comprise a plurality of cascaded, single slot double dielectric barrier discharge (DDBD) electrodes, or alternatively, a number of cascaded, single planar dielectric barrier discharge (DBD) electrodes. The number of each type of electrode that can be cascaded and contained within a cell 20*ba* may depend on the mass flow rate of the particular industrial application, for example. In an embodiment, between each DDBD electrode may be configured a glass filled polyoxymethylene (commonly referred to as Delrin®) spacer, for example where the plurality of DDBD electrodes and spacers may be fastened or otherwise connected together using compression fittings.

Figure 5B:
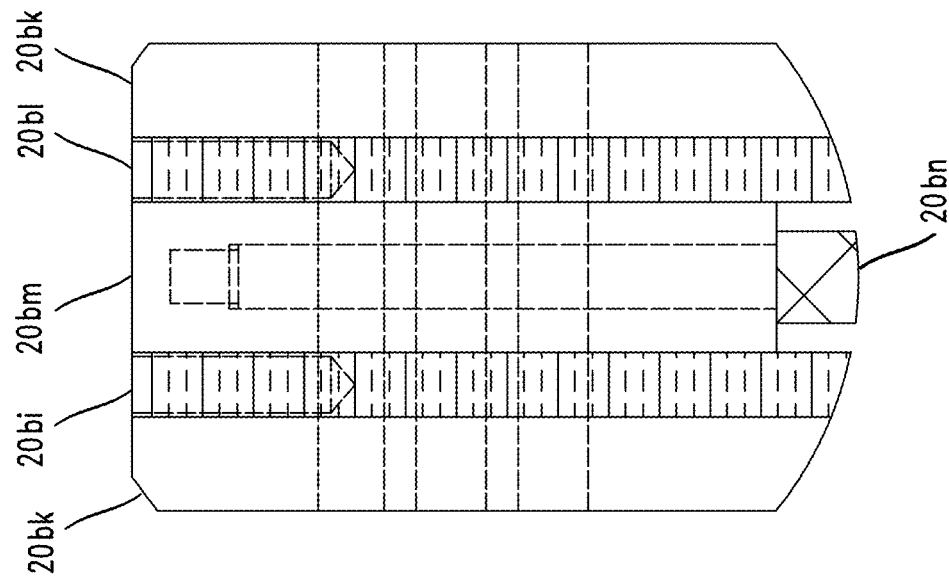
FIGS. 5A and 5B depict exemplary sections of an exemplary double dielectric barrier discharge (DDBD) plasma cell according to an embodiment.
Figure 5A:
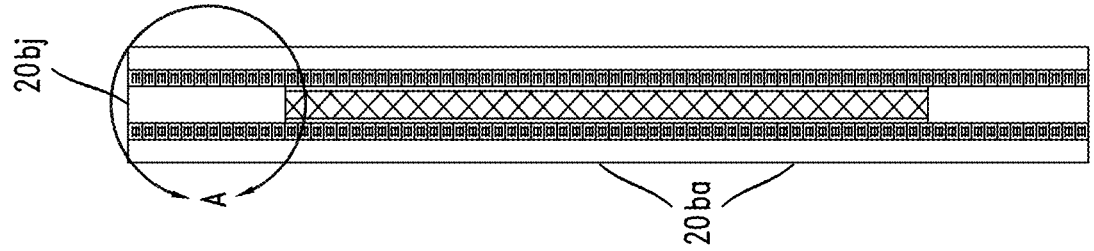

Referring now to FIGS. 5A and 5B there are depicted exemplary sections of an exemplary DDBD plasma cell 20*ba*. As depicted each cell 20*ba* may comprise a slot structure 20*bj* (see enlarged section "A" in FIG. 5B) that in turn may comprise at least two negative cathode electrodes 20*bk*, Mica isolation section (e.g., sheet, plate) 20*bl*, slotted Mica laminate fitting 20*bm* and a positive anode electrode 20*bn*.

As water flows between the channel (e.g., 2- to 4-millimeter channel) between the anode electrode 20*bn* and each cathode electrode 20*bk*, the water may be subjected to plasma energy applied by the electrode configuration. As a result, high electric fields, shock, ultraviolet light, and heat from plasma streamers denatures unwanted material (e.g., biological contaminants). Furthermore, the plasma streamers produce reactive oxygen species, hydrogen ions that react with water molecules to form hydrogen peroxide, ozone, and dissolved oxygen to treat (eliminate or substantially reduce) harmful and unwanted material (e.g., biological contaminants such as biofilm, *Legionella*, etc.) and reduce biologically induced corrosion. In embodiments, the plasma energy may comprise partial and full discharges.

As understood by those skilled in the art, a type of discharge known as a streamer or filamentary discharge is a type of transient electrical discharge. Streamer discharges ("streamers" for short) can form when an insulating medium (for example air molecules in the water) is exposed to a large potential difference. For example, when the electric field created by an applied voltage from a cell 20*ba* is sufficiently large, accelerated electrons strike air molecules in the mixture with enough energy to knock other electrons off them, ionizing them. The freed electrons go on to strike more molecules in a chain reaction. These electron avalanches (i.e., Townsend discharges) create ionized, electrically conductive regions in air gaps or bubbles near an electrode creating the electric field. The space charge created by the electron avalanches gives rise to an additional electric field. This field can enhance the growth of new avalanches in a particular direction, allowing the ionized region to grow quickly in that direction, forming a finger-like discharge—i.e., a streamer.

Streamers are transient (exist only for a short time) and filamentary, which makes them different from corona discharges. As used herein the phrase "streamer" may be used synonymously with the phrase "partial discharge" to distinguish such discharges from full discharges.

The application of plasma energy to the water in the channel between an anode electrode 20*bn* and each cathode electrode 20*bk* may first cause a streamer and then an arc to form in the water. That is to say, an ionized path created by streamers may be heated by a large current, thus forming an arc. To prevent such arcs (i.e., arcing across slots), a Mica fitting 20*bm* may be included that functions to separate each slot from one another. Further, spacers may be included in a cell 20*ba* that function to electrically isolate the cascaded slots from an outer housing that encloses one or more cells 20*ba* (not shown in FIGS. 5A and 5B).

In an embodiment, a gas distribution system (not shown in FIGS. 5A and 5B) may inject air into the top and bottom of each slot through the Mica fitting 20*bm*. The introduction of compressed air functions to increase ozone generation in the water between electrodes.

Figure 6:
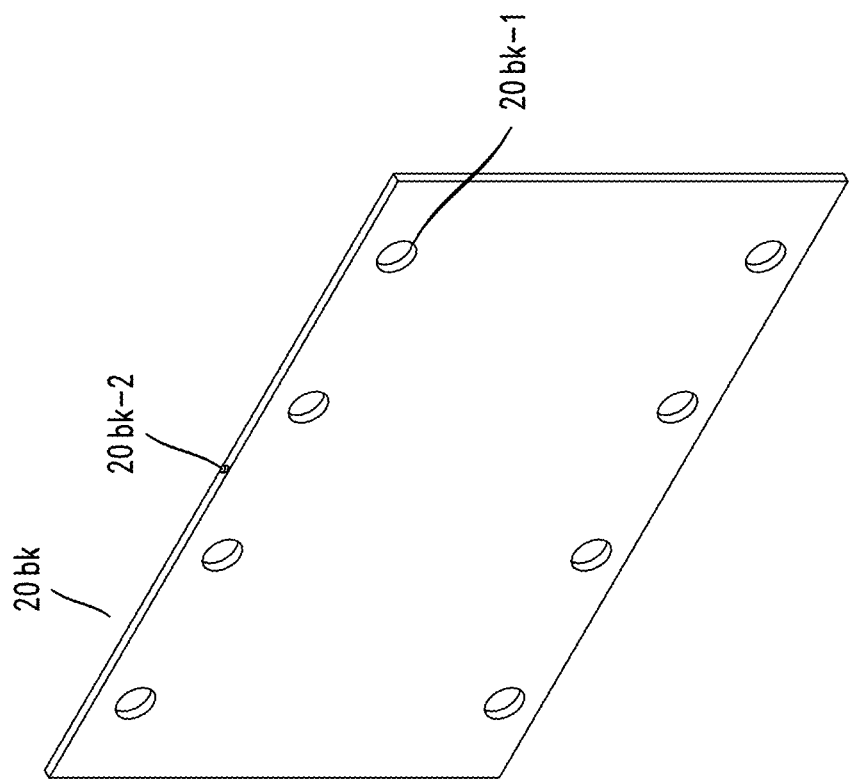
FIGS. 6 and 7 depict exemplary configurations of cathode and anode electrodes.
Figure 7:
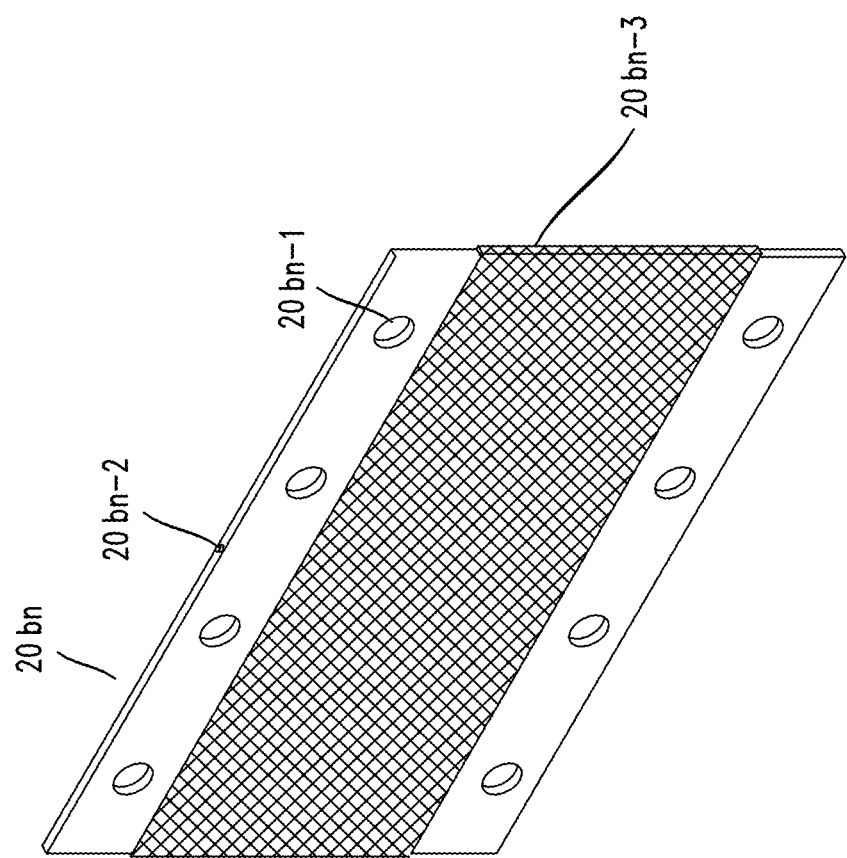

Referring now to FIGS. 6 and 7, there are depicted exemplary configurations of an exemplary, inventive cathode and anode electrodes 20*bk*, 20*bn*. In embodiments, the electrodes may either be non-porous or comprise porous, aluminum oxide plasma sprayed stainless steel 316L plates. When plain electrodes are used, the electrodes may be coated to increase their conductivity, and to decrease the voltage necessary to generate streamers in the water.

In one embodiment the electrodes (anode 20*bn* and cathode 20*bk*) may comprise planar electrodes made from a 316L stainless steel. An exemplary anode electrode may have the dimensions of 280 mm by 180 mm by 1 mm thickness and may be coated with a 5-micron Aluminum Oxide AL2O3 layer that has a 5% porosity, a permittivity ($\varepsilon r$) of 8-10, and conductivity ($\sigma$) of 2 µS/cm. Exemplary cathode electrodes may have dimensions of 280 mm by 180 mm and may be laminated with 280 mm by 180 mm by 1 mm thickness (length versus width versus thickness) Mica sheets, such as sheets 20*bl*. The Mica sheets 20*bl* may be configured to function as dielectric barriers and may have a permittivity (εr) of 8-10.

Referring now to FIG. 8 there is depicted alternative electrode configurations according to embodiments. As shown, one configuration (labelled "VAR I") may comprise a DDBD electrode with Mica sheets 20*bl* between the anode 20*bn* (e.g., a porous plasma sprayed anode plate) and cathode electrodes 20*bk*. Another configuration (labelled "VAR II") may comprise a DBD electrode with porous plasma sprayed cathode electrodes 20*bn*, and a non-porous stainless steel 316L anode electrode 20*bk*, while yet a third configuration ("VAR III") comprises a DBD electrode with Mica sheets 20*bl* adjacent a non-porous anode electrode 20*bk* and a non-porous stainless steel 316L cathode 20*bn*.a pair of electrodes 20*bk*, 20*bn* may be used by the electrodes 20*bk*, 20*bn* to generate extremely high electric field strengths (E) in the order of 150 kV/cm at atmospheric pressure with electron densities between 1014/cm3 and 1015/cm3, and a current density, J, between 75 A/cm2 and 225 A/cm2, where the current density is based on the product of the electric field strength and the complex conductivity (σ) of the mixture between electrodes and Mica fittings 20*bm*, namely:

$$J = \sigma E$$

In embodiments, the generation of electric fields with such high electric field strengths creates the before-mentioned streamers in the water in the channel between an anode and its adjacent or corresponding cathode electrode.

As noted previously, exemplary electrodes may be coated or otherwise include either a layer (i.e., sheet) of aluminum oxide or Mica laminate on their surface. In embodiments, either type of layer may function to redistribute an electric field during a plasma energy pre-discharge phase. In addition, in embodiments where the relative permittivity and conductivity of the water in the channel between two dielectrics is decreased, the electric field strength on the surfaces of the electrodes may increase. Increasing the electric field strength produces larger amounts of streamers which results in improved rotational and vibrational excitation, electron avalanche, dissociation, and ionization processes.

Referring now to FIGS. 9A to 9E there are depicted views of another exemplary plasma cell 200 which may be used as cell 20*ba* as well for example.

Figure 9A:
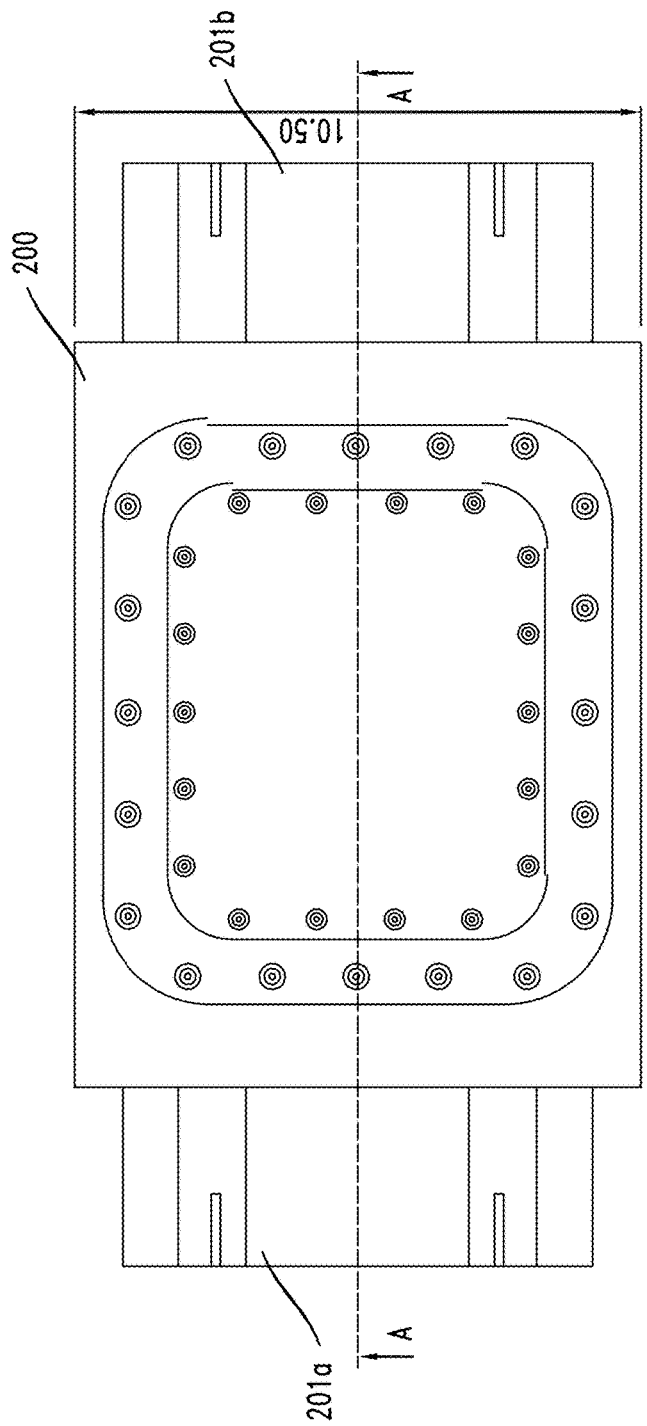
Figure 9B:
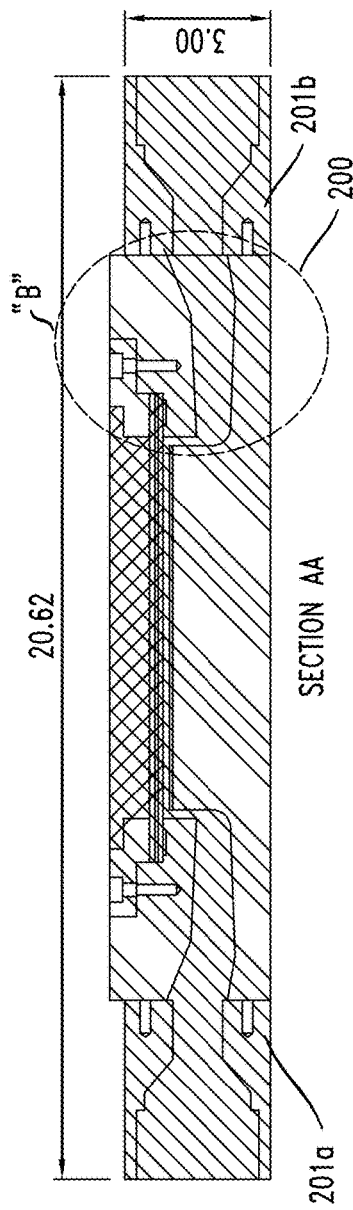
Figure 9D:
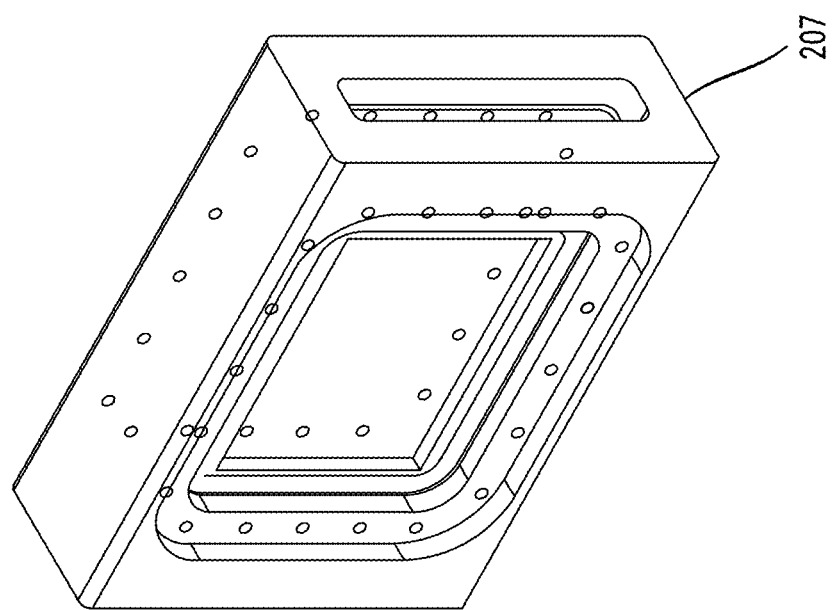

In FIG. 9A the cell 200 is shown connected to first and second manifolds 201*a*, 201*b*. FIG. 9B is a cross-sectional view taken at section A-A in FIG. 9A while FIG. 9C is an enlarged view of a section of cell 200 (view "B") that depicts exemplary layers of cell 200.

Referring to FIG. 9C, the exemplary cell 200 may include a main body layer 200*a*, negative electrode layer 200*b*, fluid channel layer 200*c* where cooling tower water, for example, may flow, a first dielectric insulating layer 200*d*, first and second sealant layers 200*e*, 200*f*, positive electrode layer 200*g*, protective spacer layer 200*h*, a second dielectric insulating layer 200*i*, a transparent window layer 200*j* and a cover layer 200*k*.

In an embodiment the transparent window layer 200*j* may allow a user or imaging device to view plasma streamers, for example, generated by the plasma cell 200.

In embodiments, the main body layer 200*a* may be composed of a plastic (e.g., Ultem 1000), the protective spacer layer 200*h* may be composed of a plastic (e.g., Ultem 1000), the transparent window layer 200*j* may be composed of an acrylic, the negative electrode layer 200*b* may be composed of stainless steel, the positive electrode layer 200*g* may be configured as a mesh layer and may be composed of a stainless steel, the first and second dielectric insulating layers 200*d*, 200*i* may be composed of a quartz, and the sealant layers 200*e*, 200*f* may be configured as gasket(s) and may be composed of a rubber (e.g., a synthetic rubber and fluoropolymer elastomer, such as Viton®).

The inventors discovered that during assembly of an exemplary plasma cell, forces (pressures) applied to join the layers together may result in cracks in the insulating layers 200*d*, 200*i*. To reduce the chances of such cracking the inventors include the spacer layer 200*h* which is configured between the insulating layers 200*d*, 200*i* to absorb the forces applied during assembly in order reduce the chances that the insulating layers 200*d*, 200*i* will crack.

Further, in embodiments the first gasket layer 200*e* may be configured around the edges of adjacent layers to prevent or reduce leakage of a liquid (e.g., cooling tower water between electrodes) into other layers of the cell 200 while the second gasket layer 200*f* may also be configured around the edges of adjacent layers to prevent or reduce leakage of a liquid (e.g., cooling tower water) into the other layers of the cell 200 (e.g., into the electrode layer 200*b*).

Figure 9E:
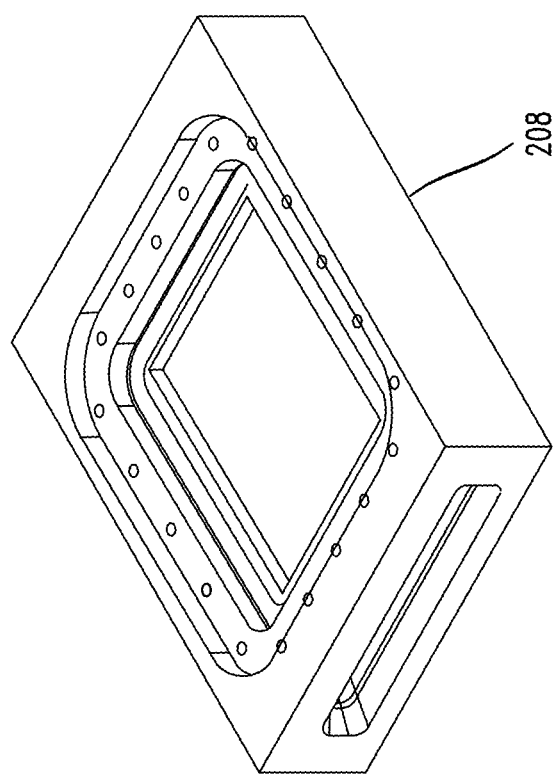

The structure described above may be incorporated into a DDBD electrode 207 (FIG. 9D) or DBD electrode 208 (FIG. 9E).

Figure 10A:
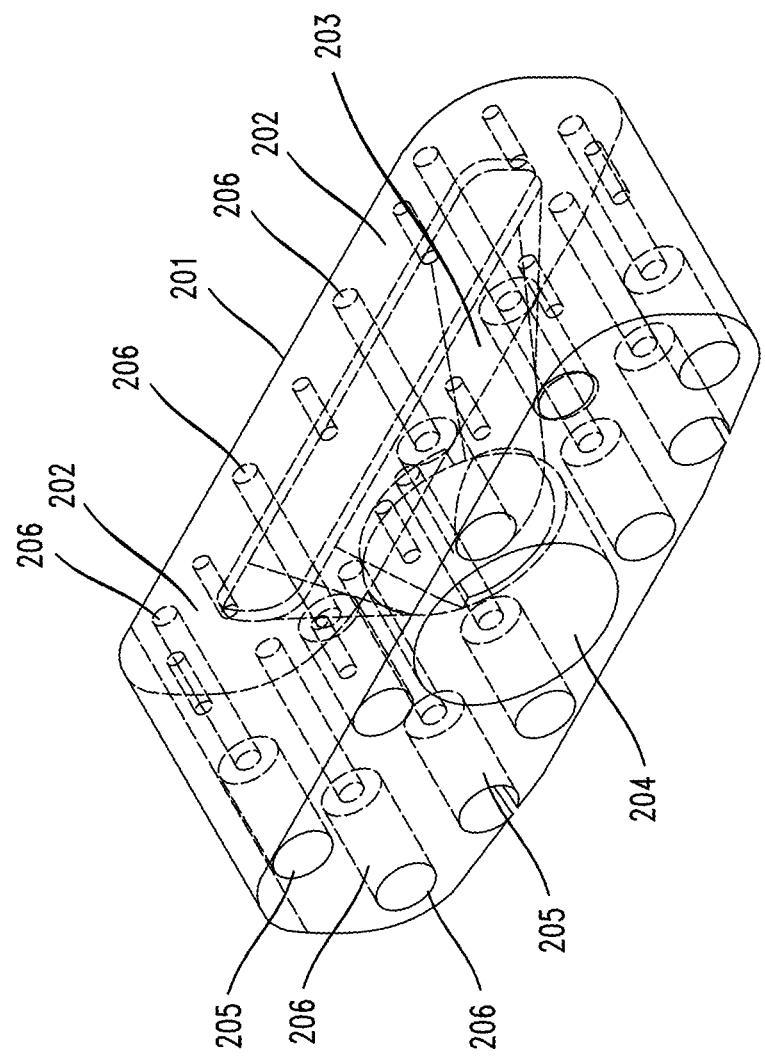
FIG. 10A depicts an enlarged view of an exemplary manifold.

Referring now to FIG. 10A there is depicted an enlarged view of an exemplary manifold 201 (e.g., 201*a* or 201*b* in FIG. 9A or 9B) that may be configured (i.e., connected) to each of the one or more plasma cells to allow water to pass through into the fluid channel layer of respective plasma cell.

In an embodiment, the manifold 201 may comprise a main body 202 that may be composed of an acetal-based plastic (e.g., Delrin® plastic). In an embodiment, the main body 202 may comprise a passageway 203 configured to allow a liquid (e.g., cooling tower water) to pass through into the fluid channel layer of a plasma cell 20*ba*, 200, for example. The passageway 203 comprises an opening 204 on either end (only one opening 204 is shown in FIG. 10A), where one opening receives the water and directs the water to the passageway 203 and the other opening may discharge the water from the passageway 203 to the fluid channel layer of a plasma cell.

The main body 202 may additionally comprise one or more (typically more) connection passageways 205 and corresponding openings 206 configured to receive a fastener (e.g., bolt, screw) to name just one of the many ways that manifold 201 may be connected to a cell. In an embodiment, to connect a manifold 201 to a plasma cell, a respective fastener may be inserted into and received by an opening 206 of the manifold, pass through a corresponding passageway 205 and make contact with a plasma cell.

Figure 11C:
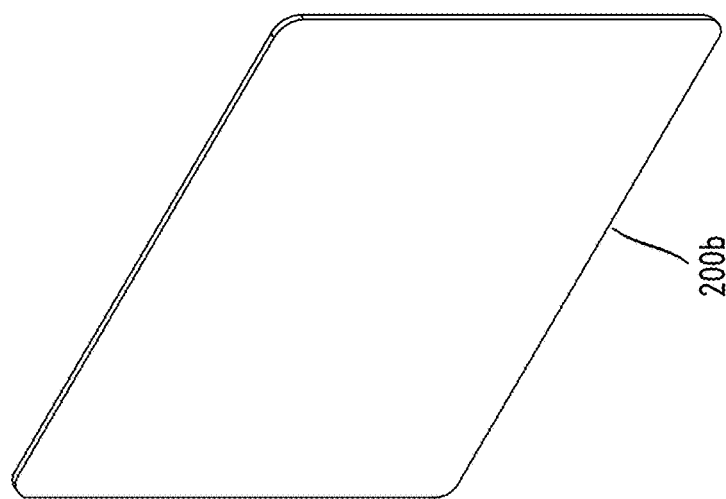
FIGS. 11A to 11C depict exemplary dimensions and a configuration of an exemplary negative electrode layer of an exemplary plasma cell.
Figure 11B:
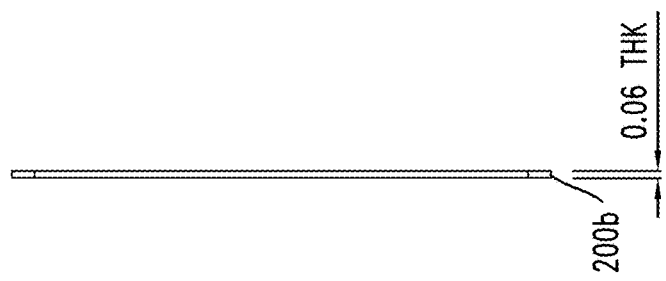
Figure 11A:
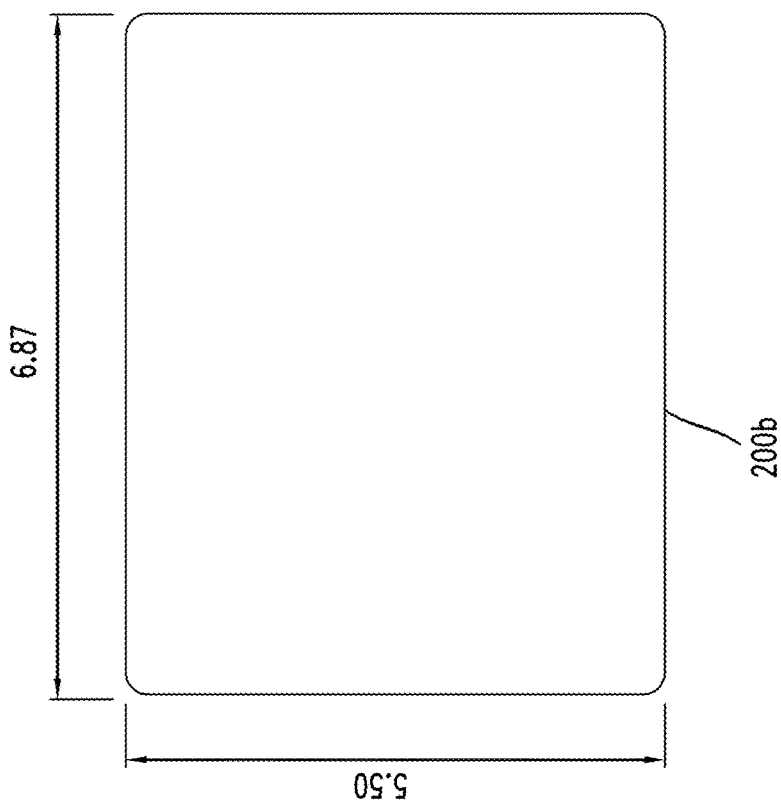
Figure 12C:
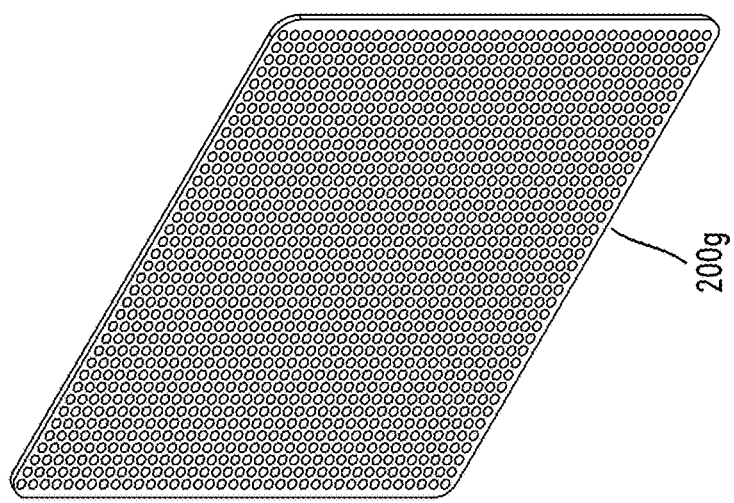
FIGS. 12A to 12C depict exemplary dimensions and a configuration of an exemplary positive electrode layer of an exemplary plasma cell.
Figure 12B:
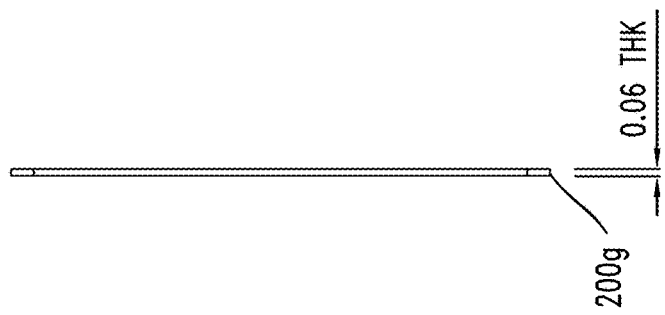
Figure 12A:
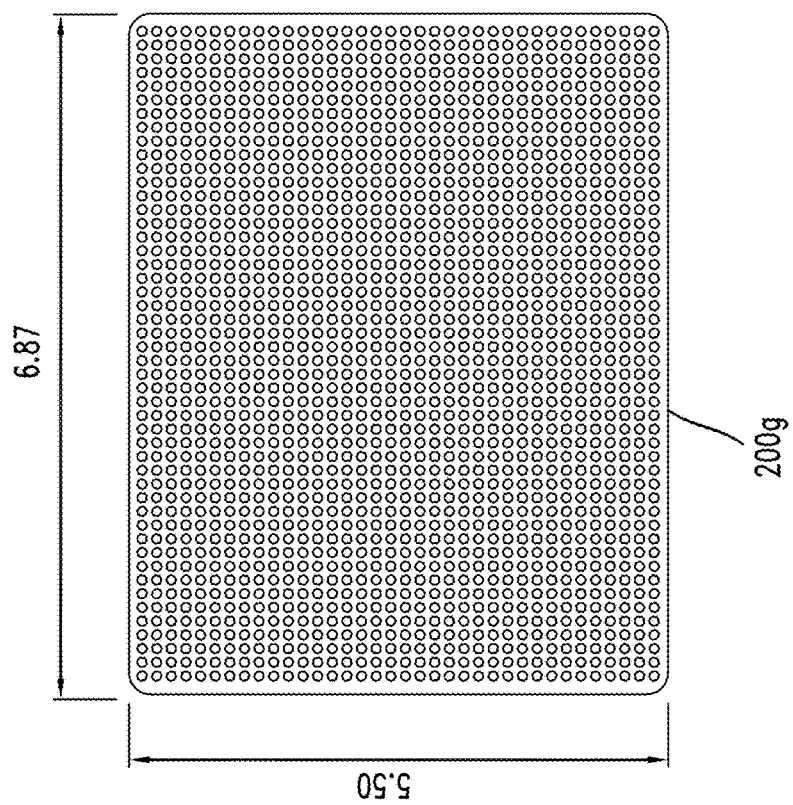
Figure 13D:
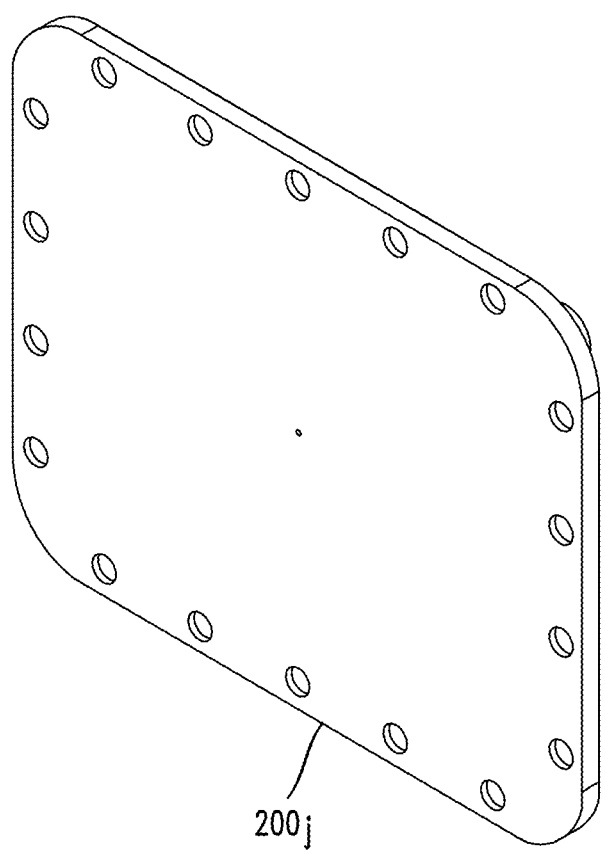
Figure 14C:
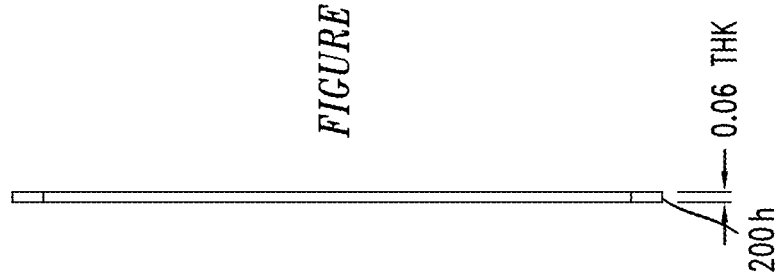
FIGS. 14A to 14D depict exemplary dimensions and a configuration of an exemplary protective spacer layer of an exemplary plasma cell.
Figure 14A:
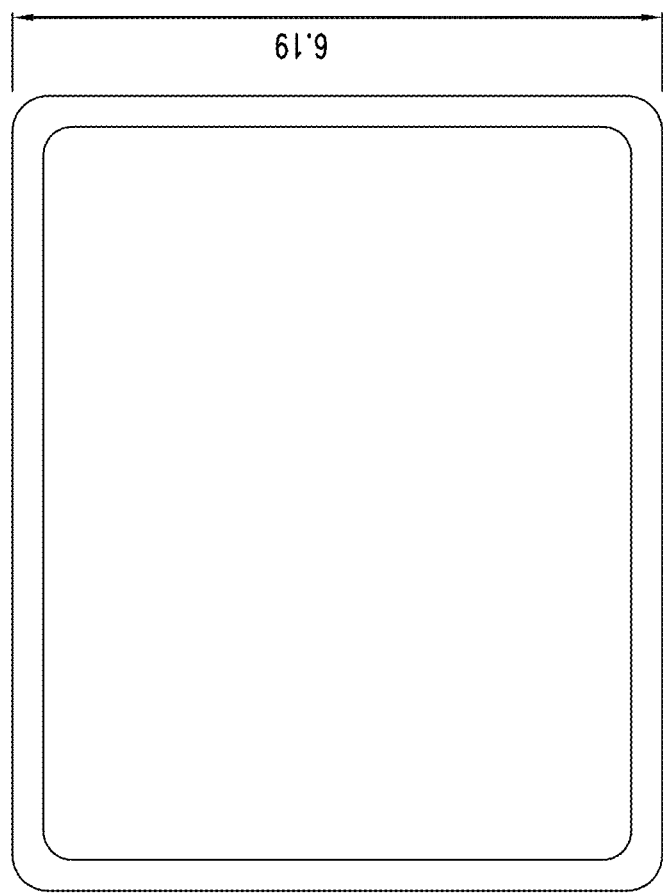
Figure 14B:
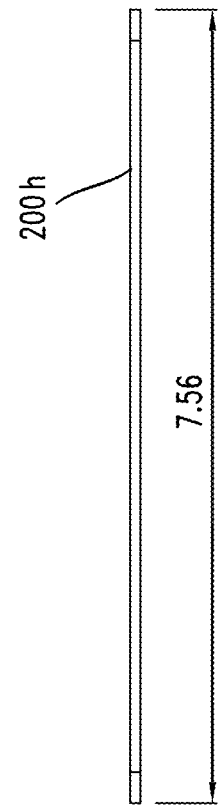
Figure 14D:
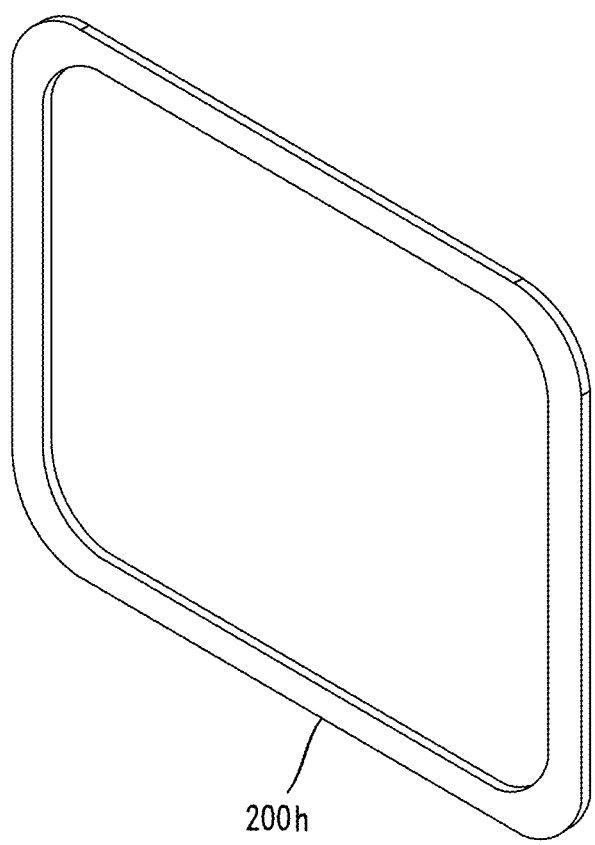
Figure 15D:
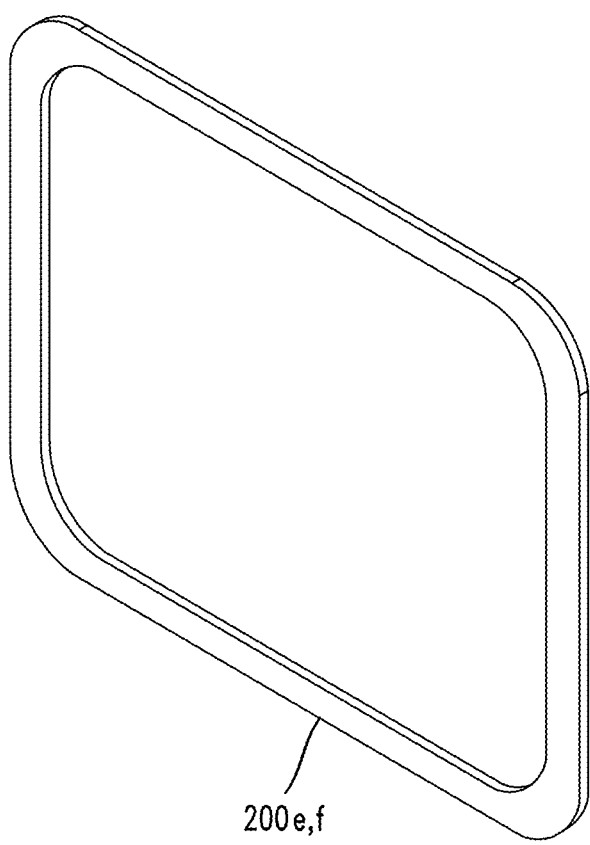
Figure 16D:
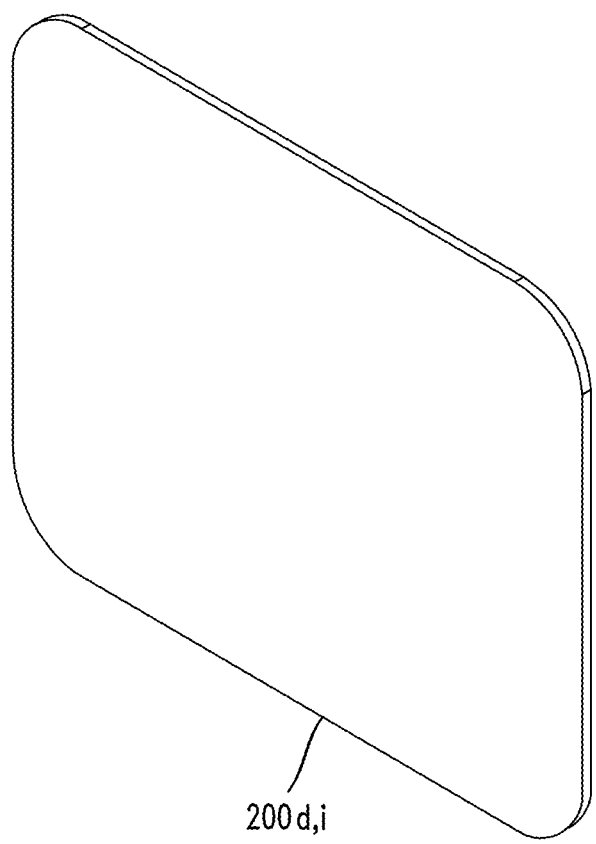
Figure 17C:
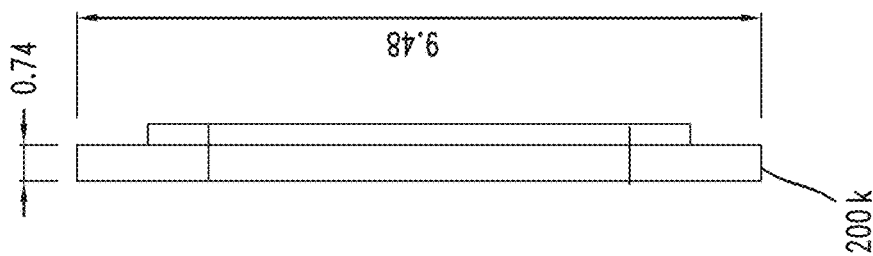
FIGS. 17A to 17D depict exemplary dimensions of an exemplary cover layer of an exemplary plasma cell.
Figure 17A:
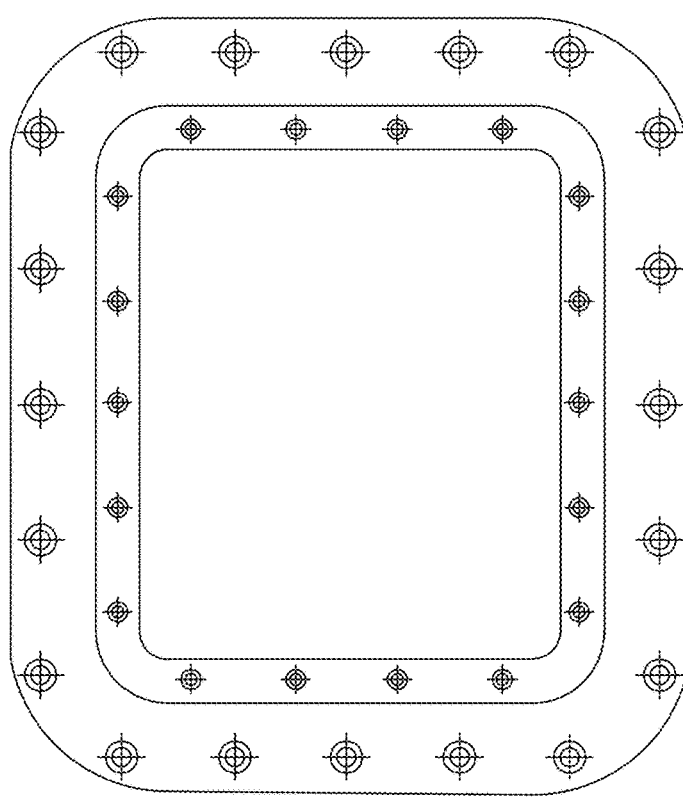
Figure 17B:
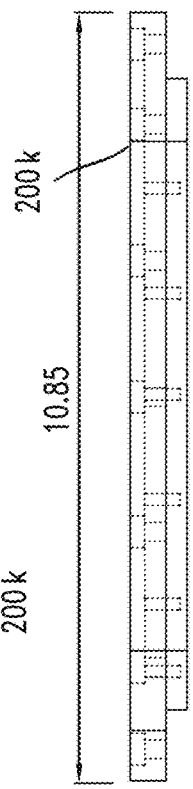
Figure 17D:
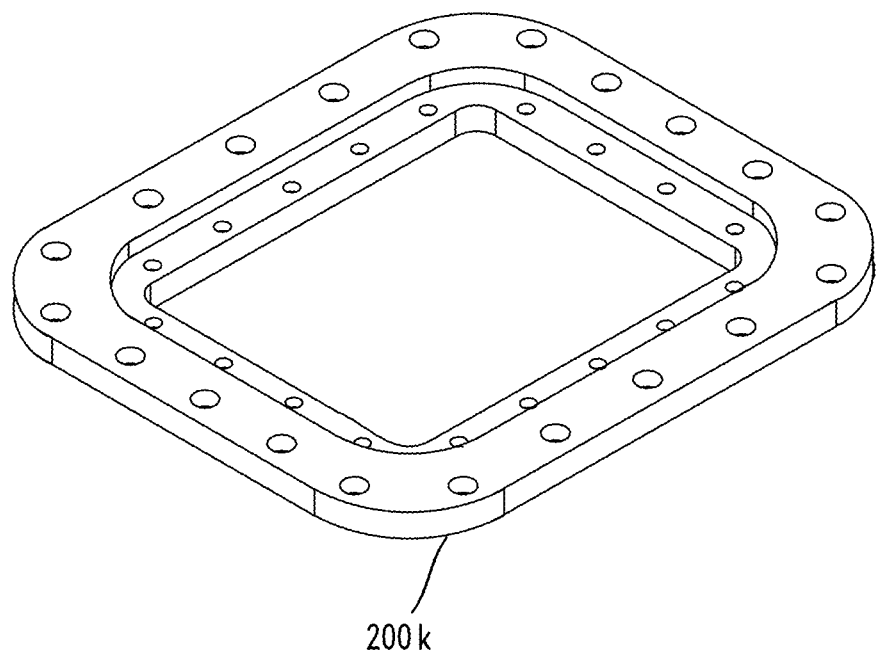

FIGS. 10B to 10E depict exemplary dimensions and a configuration of the exemplary manifold 201, while FIGS. 11A to 11C depict exemplary dimensions and a configuration of an exemplary negative electrode layer 200*b* and FIGS. 12A to 12C depict exemplary dimensions and a configuration of an exemplary positive electrode layer 200*g*, though it should be understood that such configurations and dimensions are merely exemplary and non-limiting.

Similarly, FIGS. 13A to 13D depict exemplary dimensions and a configuration of an exemplary transparent window layer 200*j*, FIGS. 14A to 14D depict exemplary dimensions and a configuration of an exemplary protective spacer layer 200*h*, FIGS. 15A to 15D depict exemplary dimensions and a configuration of an exemplary sealant layer(s) 200e, 200f; FIGS. 16A to 16D depict exemplary dimensions of exemplary dielectric layer(s) 200d, 200i and FIGS. 17A to 17D depict exemplary dimensions of exemplary cover layer 200k though it should be understood that such dimensions are merely exemplary and non-limiting.

Referring back to FIG. 3, to provide energy to the plasma cells 20ba, (or 200) the plasma transformers 20aa and inverters 20ab (sometimes collectively referred to as "generator") may comprise structure as described in the '965 Application (see FIG. 6 of that application) assigned to the same assignee as the present application which is incorporated by reference herein as if set forth in full herein. One exemplary structure may comprise a 10 KW a unipolar/bipolar device with an automatic operating pulse density modulation (PDM) frequency range from 1 kHz to 30 kHz. Further, the plasma generator may be operable to tune an output frequency to maximize the peak voltage and maintain the breakdown voltage in the plasma discharges it generates in the water. The plasma generator may be connected to a 208 VAC 3-phase electrical utility source via a 3-phase electrical power cable and operable to produce signals having a 30 kV output voltage and a 0.167A current, for example, in order to supply each of the a plasma cells 20ba (or 200) with the energy required to allow a cell to produce high-energy electric fields (electrohydraulic discharges) in water. The plasma generator may be configured such that it is installed in an electronic housing unit along with plasma cells 20ba (or 200), for example, or may be installed in separate housing with the necessary connections to cells. It should be understood that by configuring the generator in the housing, the generator may be connected to plasma cells using short (dimension-wise) connections. This configuration aids in insuring that those users of the system 1 are not exposed to the high voltages produced by the plasma generator and makes the supply of energy to the cell more efficient (i.e., the shorter the physical connection, the less energy is lost through the connecting cables, wires, etc.).

In an embodiment, the voltage and frequency being applied to the plasma cells 20ba (or 200) may be controlled by the controller 15 or the PLCs 20cc as described in more detail in the '503 application (see FIG. 5) to, among other things, insure that the thermal stresses (e.g., temperatures) generated as the cells 20ba (or 200) operate do not result in a degradation of the structure of the cells 20ba. For example, if temperatures within a cell 20ba exceed a maximum, threshold temperature (e.g., approaching 1000° F.) for too long a period of time or sudden spikes in temperature occur the internal components and the material composition of such components of a cell 20ba (e.g., glues holding elements of a cell 20ba together) may degrade. Such a degradation may result in a cell becoming less efficient or completely failing, for example.

Yet further, because the conductivity of the water flowing between electrodes of cells 20ba (or 200) may change over time the controller 15 and components of pulse width modulator/pulse density (PWM/PDM) circuitry described in more detail in the '503 application may be operable to adjust the "on" and "off" times (duty cycle) to make sure a resonant frequency is maintained. Further, the voltage and frequency of the signals generated by a plasma generator to each of the cells 20ba (or 200) may be controlled (e.g., adjusted if necessary) such that each of the cells operates at a frequency that provides a maximum peak-to-peak voltage at the lowest amount of power (i.e., a resonance frequency).

In an embodiment, the plasma generator may include the following sub-circuitries, circuitry, and/or modules: AC to DC bus-bar voltage/current circuitry, IGBT (Insulated Gate Bipolar Transistor) module, microcontroller (which may be separate from, or the same as controller 15), status LEDs, pulse width modulator/pulse density modulation section, gate driver opto-couplers, fault detection and protection circuitry, AC-to-DC low voltage converters, a high voltage output pulse transformer and tesla load tuning coil, and thermal management circuitry, the details of which are described in the '503 Application that has been incorporated by reference herein in its entirety.

In an embodiment, flow meters (not shown in figures) may be configured to measure the level of the water flowing into the cell(s) 20ba (or 200) to insure that a sufficient amount of the water is indeed flowing so that when the cells generate plasma streamers the streamers are discharged in the water, and not into air. A more detailed description of the function and features of the flow meters is set forth in the '503 Application which has been incorporated by reference herein in its entirety.

In embodiments, sensors 20e may be configured to adaptively control the temperatures and pressures being exerted on electrodes that make up plasma cells 20ba (or 200) due to the changes in backpressures, for example, that build up due to changes in the flow of water fully explained in the '503 Application as well.

As noted previously, subsection 20b may also comprise an electrolytic, biocidal treatment chamber 20c that comprises one or more biocidal electrodes 20ca, one or more internal pumps 20cb, and one or more PLCs 20cc. In embodiments, the functions completed by the PLCs 20cc may alternatively, or additionally, be completed by controller 15 or by a specialized computer 15b located at a remote location (i.e., not co-located) or may be partially completed by PLCs 20cc, or by test set 21 or partially by controller 15. partially by the specialized computer 15b located at a remote location that is connected to the PLCs 20cc and/or controller 15 or components/elements of system 1 via a wired, wireless or some combination of the two via communications channel 15d, for example.

Further, the inventors believe that while deleterious bacteria, such as *Legionella*, may flow through the piping of a heat transfer system, some bacteria may be retained on the surfaces of such a system (e.g., on the surface of a cooling tower heat exchanger). Thus, such bacteria may not be carried in the cooling tower water that flows into the plasma disinfectant system 20 to be treated by the plasma cells. However, such bacteria may be effectively treated by biocidal ions generated by the biocidal electrodes. For example, in an embodiment, biocidal ions generated by electrodes 20ca may be output by PDS 20 and then flow to the surfaces of cooling tower heat exchanger 5 to treat such bacteria.

In more detail, the inventors believe that biocidal copper and silver ions may effectively treat both planktonic and sessile bacteria. In more detail, positively charged copper ions are believed to react with negatively charged ions on the cell wall of such bacteria, thereby damaging the integrity of the cell membrane and allowing the silver ions bind to the cellular protein (DNA and RNA) and the respiratory enzymes to destroy the bacteria, for example.

Backtracking somewhat, to generate the biocidal ions cooling tower water may flow between each biocidal electrode 20ca. An electrode 20ca may include one or more positively charged anodes and negatively charged cathodes (collectively "electrodes"). In embodiments, each of the electrodes 20ca may be composed of one or more of the following, non-limiting exemplary materials: arsenic, antimony, cadmium, chromium, copper, mercury, nickel, lead, silver, and zinc, for example. In embodiments, reactions (described in more detail herein) may cause the composition of the elements (e.g., copper, silver) to be "sacrificed" (i.e., released into the water) to control sessile bacteria, for example.

In an embodiment, a DC power supply (not shown in FIG. 3) may be operable to supply the electrodes 20ca with a variable amount of DC power. Upon receiving such power, the biocidal electrodes 20ca may be operable to form an amount of ionized, dissolved metal ions (e.g., biocidal ions, copper and silver) in the water depending on the magnitude of the DC current supplied to the electrodes 20ca and upon the flow rate of the water through the electrodes 20ca.

Controller 15 may be operable to control the DC power supply by exchanging control signals with the supply, for example, such that the voltage and corresponding current generated by the supply may vary (i.e., a variable voltage and/or current).

Switches (not shown; e.g., electrical, electronic, microelectronic) may be included that may be operable to (i.e., function to) reverse the polarity of the biocidal electrodes 20ca, and can be controlled by controller 15 (or PLCs 20cc) via an RS485 bus, or Internet of Things (IoT) bus 15d, for example. In embodiments, biocidal ions released into the water function to inactive bacterial contaminants (e.g., Legionella) in the water.

In more detail, the controller 15 (or PLCs 20cc) may be operable to send control signals to switches or relays known in the art (not shown in the figures) to reverse or change the polarity of electrodes 20ca from positive to negative, and negative to positive. For example, upon receiving such control signals the switches/relays may be operable to connect a negative or positive voltage to a respective biocidal electrode 20ca. In accordance with principles of the invention, by alternating the polarity of the electrodes 20ca the leaching of ions from the electrodes may be controlled.

The polarity of each biocidal electrode 20ca determines whether ions will leach from, or to, an electrode. For example, when the polarity is positive at a first electrode and negative at a second electrode then ions may leach from the first electrode. Conversely, when the polarity of the first electrode is negative and the polarity of the second electrode is positive, ions will leach from the second electrode. The ability to control the polarity of the biocidal electrodes 20ca, therefore, also allows the controller 15 to effectively control the leaching of ions (e.g., metal ions) from one electrode to another via, and to, the water there between. Relatedly, the ability to control the leaching of ions from the biocidal electrodes 20ca further allows the controller 15 to minimize the build-up of ionic material on the cathodic electrode (i.e., the electrode that ions flow to after having leached from an opposite electrode). Said another way, to avoid too much build-up of ionic material on one electrode, the controller 15 may be operable to change the polarity of the biocidal electrodes 20ca to reverse their polarity, and therefore reverse the flow of ionic material (and related build-up) from one electrode to another.

The transfer of material may be controlled by controlling the voltage applied to the electrodes 20ca. For example, for a given amount of energy within a given voltage (i.e., a DC electric charge), the mass (amount) of the material leached from an electrode is directly proportional to the equivalent weight of the electrode's material and can be computed using Faraday's second law of electrolysis:

$$m = \left(\frac{Q}{F}\right)\left(\frac{M}{Z}\right)$$

where (m) is the mass of the material liberated at an electrode, (Q) is the total electric charge passed through the material, (F) is Faraday's constant, (M) is the molar mass of the material, and (z) is the valency number of ions of the material. The following exemplary chemical reactions represent the release of biocidal ions from an electrode composed of an alloy of both silver and copper for example, through electrolytic ionization:

$$Cu \rightarrow Cu^{2+} + 2e^-$$

$$2Ag \rightarrow 2Ag^+ + 2e^-$$

In an embodiment, exemplary silver and copper alloy-based biocidal electrodes 20ca may be composed of a variable amount of silver and copper. For example, the range of silver-to-copper may be a minimum of 60:40 silver to copper while a maximum may be 80:20. As material (cupric and silver ions) are released from an electrode (i.e., leached), their release causes the electrode to be gradually consumed. Further, it is believed that once the cation ions (cations for short) have been released into the water, the cations react with negatively charged portions of bacteria in the water (e.g., cell walls of the bacteria) to form electrostatic bonds. The energy (force) associated with the formation of the bonds is believed to lead to the distortion of the cell wall of the bacteria (i.e., the walls become more permeable and eventually breakdown, causing cell lysis and cell death). For example, a positively charged cation will attract a negatively charged ion that comprises an integral portion of the cell wall. As a result of the attractive force, the negatively charged ion will feel a force that is pulling it away from the surrounding cell wall, leading to a weakness and even breakdown of the cell wall. In an embodiment, this process may be simultaneously felt by a plurality of negatively charged ions making up the cell wall, leading to an overall weakness and breakdown of the cell wall. Once the cell wall is effectively weakened or broken down, the bacteria becomes substantially weakened or even destroyed.

The plasma disinfectant system 20 may further include flowmeters 20d (e.g., magnetic flow meters). In an embodiment, the flowmeters 20d may be configured or positioned to determine the rate that the water flows into the chamber 20c surrounding the electrodes 20ca. In an embodiment, the determined flow rate may be sent to the controller 15 via a wired or wireless connection in the form of one or more electronic signals. Thereafter, the controller 15 may be operable to compute both an instantaneous and averaged concentration of dissolved ions based on the received signals, and, thereafter, may be operable to control the power up or down (voltage) that a DC power supply (not shown in figures) is supplying to the biocidal electrodes 20ca. In an embodiment, a higher power may result in a greater leaching of metal ions into the water which, in turn, has the effect of increasing the "bombardment" of metal ions onto the chemical bonds that hold compounds in the water together. Such bombardment weakens and may even destroy the chemical bonds making it difficult for the scale forming minerals to form hard, needle-like crystalline (calcite) scale. The reduction and/or prevention of scale formation is believed to also reduce the opportunity for bacteria (e.g., *Legionella*) to grow on such scale.

As noted previously, section 20 may also include one or more sensors 20e (e.g., pH and conductivity sensors, temperature and pressure sensors) and valves 20f (air release valves, motorized actuating valves). In embodiments, air release valves may be configured to remove air pockets in piping and aid the flow of a mixture, for example, while motorized actuating valves may aid in the control of the dosing of biocidal ions, for example.

Section 4 may include a booster pump 13c. In one embodiment, the booster pump 13c functions to increase the flow rate of the mixture at point 10h flowing through it so that the mixture at point 10i output from the pump 13c may effectively combine or mix with water flowing in piping 6 at a higher pressure (e.g., 20 PSI). Absent the booster pump 13c, the treated mixture would not be able to sufficiently mix with water that is directed towards the cooling tower 5 (e.g., chiller). In some instances this increase in flow rate may inadvertently damage components of system 1. For example, during the start-up and/or shutdown of cells 20ba (or 200), pulsating water (or another liquid) from the booster pump 13c impeller may cause a change in the flow rate, which in turn may result in pressure spikes that travel back through piping 6 towards the plasma cells. To avoid damage to the cells due to such differences in flow rate (e.g., spikes) the inventors provide an isolation means for isolating the cells from such changes in flow rates.

In an embodiment the isolation means may comprise a buffer tank 21, connective piping and valves for controlling the flow rate (see FIGS. 8A and 8B in the '503 Application for example). The combination of the tank, piping and valves functions to absorb the differences in flow rate (e.g., increases in water pressure due to pressure spikes). Without such an isolation means (or its equivalent) to isolate the plasma cells 20ba (or 200) (as well as other components of system 1) from flow rate differences (e.g., pressure spikes caused by pulsating water from the booster pump 13c or high constant pressures), the flow rate may ultimately cause the quartz plate(s) making up elements of each plasma cell to fail (e.g., crack) and leak.

In one embodiment, the flow rate of water flowing into and out of the tank 21 may be controlled between 18 to 22 GPM, for example. Control of the flow rate may be accomplished by the receipt of control signals at the pump 13c from a controller 15, for example. Controller 15 may send signals to the pump via communication lines (e.g., databus 15a, which may be an IoT databus) to control the speed of the pump 13c, control the on/off cycle of the pump, control (vary) the opening of a solenoid-actuated ball valves and control the start-up/shut-down flow rates (again, see FIGS. 8A and 8b and the description in the '503 Application, for example).

Further, the inventors discovered that inclusion of the buffer tank 21, connective piping, and controls discussed herein minimized the number of booster pump 13c on/off cycles, thereby allowing the plasma cells 20ba (or 200) to receive mixture 10e that is flowing at a constant positive pressure. Yet further, the controller 15 may control the flow of mixture to the tank 21 in order to reduce the risk that the buffer tank 21 may overflow or become empty.

In one embodiment the isolation means may further comprise additional elements, such as a level monitoring sensor and water level switches which may be controlled by controller 15 for detecting water levels of the buffer tank 21 (e.g., low and high levels), wherein the controller 15 may be operable to control a rate at which water should be supplied to, or restricted from flowing to, the buffer tank 21. The details of how the controller and level monitoring sensor work is set forth in full in the '503 Application incorporated by reference herein.

Having presented the structure and function of some embodiments of the invention, we now turn to a discussion of some exemplary operations of such embodiments. In particular we now discuss how embodiments of the invention form plasma energy discharges in water that may be used to treat, minimize and destroy bacteria, such as *Legionella*, among other functions.

During discharge, water in between two electrodes of the plasma disinfectant system 20 instantly evaporates and undergoes thermal breakdown upon application of plasma energy from the electrodes. The application of the plasma energy causes a discharge to form between the electrodes due to the large amount of (heat) energy from the electrical current of the applied fields. It should be understood that if the amount of heat energy delivered to the water is lower than a threshold, for the most part, only electrolysis will occur. Accordingly, in embodiments of the invention a plasma cell may be operable to generate fields that exceed such a threshold of the water in order to form streamers. In embodiments, the application of the plasma energy to the water functions to produce a plurality of streamers in the water. The streamers in turn function to initiate the energizing of electrons and the creation of, or buildup of, an electrical charge (i.e., space charge accumulation) in the water. In embodiments, this produces reactive (ionic and excited atomic) and molecular species in the water. These reactive and molecular species are characterized and created by electron avalanche, rotational and gravitational excitation, dissociation, and ionization processes with energies up to 20 electron Volt (eV).

Specifically, rotational and vibrational excitation of reactive and molecular species in the water may typically occur below a 1 eV energy threshold while electron avalanche occurs between a 5 eV to 20 eV energy threshold and produces various charged particles (electrons, positive ions, negative ions, complex ions, etc.). Disassociation of reactive and molecular species in the water may occur in the energy band between 8 eV and 9 eV, while ionization of the water may occur around a threshold of approximately 13-14 eV.

In embodiments, determining the required applied voltage needed to produce streamers in water involves an understanding of the thermal breakdown instability, $\Omega$, of the due to joule heating. The thermal breakdown instability can be expressed as:

$$\Omega = \left(\frac{\sigma_0 E^2}{\rho C_p T_0}\right)\frac{E_a}{RT_0} - D\frac{k}{R_0^2}$$

where ($R_0$) is the radius of the breakdown channel, (D) is the thermal diffusivity of water (1.5e-7) m²/s, ($C_p$) is the specific heat constant of water (4179 K/kg*K), and (k) is the thermal conductivity of water (0.6 W/mK). The first term represents the heating element, where the numerator represents heat energy, and the denominator represents heat stored in water. In this first term, the value, $E_a/RT_0$, represents the ratio of the activation energy, $E_a$, to the temperature. The second term, $$D\frac{k}{R_0^2},$$

represents the ratio of thermal diffusivity to the square characteristic length of the radius of the breakdown channel for radial heat conduction. Typically, when the thermal breakdown instability is greater than 0, thermal explosion in water may occur, which in turn creates discharges in the water in the water. Using that phenomenon, the equation above can be reconstructed as:

$$\left(\frac{\sigma_0 E^2}{\rho C_p T_0}\right)\frac{E_a}{RT_0} \geq D\frac{k}{R_0^2}$$

In the generation of different reactive and molecular species, there are instances where full discharges will occur. When that is the case, the equations below may be used to calculate the breakdown voltage of the channel. In more detail, the breakdown voltage of water can be determined from the product of the electric field strength (E) of an applied electrical field, and the distance (L) between two electrodes, we introduce a geometric factor, $G=L/R_0$, into equation above. Thus, equation can be rewritten as:

$$\left(\frac{\sigma V^2}{\rho C_p T_0}\right)\frac{E_a}{RT_0} \geq DkG^2$$

From this equation the breakdown voltage, V, can be determined using $$V \geq \sqrt{\frac{kRT_0^2}{\sigma_0 E_a}}\,G$$

In an embodiment, if the total distance (i.e., channel spacing) between electrodes 20*bk*, 20*bn* (or 200*b*, 200*g*) in each slot may be 4 mm, and the radius of a streamer is typically on the order of 4 μm, an exemplary breakdown voltage in the water there between required to form a full discharge may be estimated to be:

$$V \geq \sqrt{\frac{kRT_0^2}{\sigma_0 E_a}}\,G = \sqrt{\frac{0.613*461.5*(300)^2}{0.1*700{,}000}}\,G \cong 28.4*\left(\frac{4000}{4}\right) \cong 28{,}400\,V$$

$$V \geq 28{,}400\,V$$

In sum, an exemplary voltage of at least 28,400 V between electrodes would be needed to breakdown the water there between at 300 K with a gap of 4 mm to create a full plasma discharge. In embodiments, as the conductivity of the water increases, it is expected that the minimum breakdown voltage would decrease. In yet another embodiment, an exemplary voltage of at least 18,000 V between electrodes would be needed to breakdown the water at 300 K with a channel or gap of 3 mm to create a full plasma discharge.

Having presented a discussion of some exemplary, novel systems and related methods that function to generate novel plasma energy in water, we turn to a discussion of some exemplary applications of the so-generated plasma energy in the water. In particular, we present some exemplary electrochemical mechanisms which may be triggered, initiated and completed in water upon application of the novel plasma energy discharges by the novel systems and methods of the present disclosure to treat unwanted material, such as scale, biological contaminants, (Biofilm, *Legionella*, etc.), and biologically induced corrosion.

Rotational and vibrational excitation, electron avalanche, dissociation, and ionization processes that occur in water (e.g., cooling tower water) due to the generation of streamers may further initiate chemical reactions that result in the formation, or creation, of hydroxyl radicals (OH·), hydrogen ($H^+$), hydrogen gas ($H_2$), atomic oxygen radicals (O·), hydrogen peroxide ($H_2O_2$), hydronium ($H_3O^+$), super oxide anion (·$O2^-$), singlet oxygen ($^1O_2$) ions, ozone ($O_3$), hypochlorous acid (HClO), chlorate ($ClO_3^-$), and ultra-violet light. Scale formation may occur when highly soluble and naturally occurring ions in water precipitates into an insoluble form due to temperature, pressure and/or pH changes in water. For example, calcium ions ($Ca^{2+}$) and bicarbonate ($HCO_3^-$) ions precipitate into calcium carbonate ($CaCO_3$) and carbon dioxide ($CO_2$) gas. Other examples of scale forming ions are magnesium and strontium ions. Thus, we first discuss mechanisms that may mitigate scale.

Mechanism 1, the Treatment of Scale Through Hydrogen Ion Generation

In an embodiment, the exemplary plasma treatment cell structures 20*ba* (or 200) ("cells" for short) may be operable, and function, to apply the plasma energy (e.g., streamers) to cooling tower water and to produce hydrogen ions in the water to treat scale (i.e., to effect the morphology of scale forming ions in the water) by initiating the ionization of oxygen in the water that produces the hydrogen ions. The presence of hydrogen ions reduces bicarbonate ions which are required for scale formation. From the equations below it can be seen that excited molecular species in water may react with the hydrogen and oxygen to form Oxoniumyl ($H_2O^+$). Oxoniumyl ($H_2O^+$) further reacts with the minerals to produce Hydronium ($H_3O^+$) and the Hydroxyl radical (OH·) (as illustrated by in the equations below).

In more detail, hydrogen ($H^+$) ions may be produced by direct ionization of water as a result of the generation and formation of streamers in the water. The $H^+$ ions may react with bicarbonate ions ($HCO_3^-$) present in the water to produce additional water molecules ($H_2O$) and carbon dioxide gas ($CO_2$) shown in the third equation below.

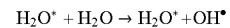
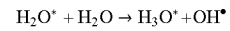
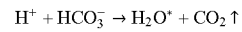

$$H_2O^+ + H_2O \rightarrow H_2O^+ + OH^\bullet$$

$$H_2O^+ + H_2O \rightarrow H_3O^+ + OH^\bullet$$

$$H^+ + HCO_3^- \rightarrow H_2O^+ + CO_2 \uparrow$$

Thus, in embodiments of the invention, exemplary plasma cells provided by the present disclosure may reduce the propensity for scale to form on heat exchanger elements and the inside of pipe walls by removing bicarbonate ions from cooling tower water.

Mechanism 2, the Treatment of Scale Through Nitric Oxide Generation

Relatedly, in an embodiment the plasma cells disclosed herein may be operable to apply the plasma energy (e.g., streamers) to cooling tower water and to produce hydrogen in the water to treat scale (i.e., to effect the morphology of scale forming ions in the water) by the ionization of water which results in the formation of hydrogen through the disassociation of nitric acid ($HNO_3$) into hydrogen ($H^+$) ions and nitrate ($NO_3^-$) ions. For example, as a carrier gas (e.g., atmospheric gases, compressed air or oxygen, $O_2$) enters through a gas distribution system (not shown) the gas comes in contact with cooling tower water which causes molecules in the water to ionize and disassociate into molecular nitrogen gas ($N_2$) gas and molecular oxygen gas ($O_2$) gas. Both the molecular nitrogen gas and molecular oxygen gas may further react with nitrogen and oxygen atoms to produce nitric oxide gas ($NO_X$) (see the first equation below). The oxygen atoms from the carrier gas oxidizes nitrate ($NO_X$) to form nitrogen dioxide ($NO_2$). The nitrogen dioxide ($NO_2$) in the water results in nitric acid ($HNO_3$) production. Upon generation of the streamers in the water, hydrogen ions are produced from the nitric acid (see equations below).

$$N_2 + O_2 \xrightarrow{Plasma} NO_x$$

$$NO_x + H_2O \rightarrow HNO_3 \rightarrow H^+ + NO_3^-$$

As discussed throughout the text herein, exemplary, novel systems and methods are discussed that treat (reduce, mitigate or destroy) biological contaminants, (biofilm, *Legionella*, etc.), and biologically induced corrosion through the generation and application of plasma energy discharges (e.g., streamers) to mixture 10e (among other types of water). We now present some exemplary electrochemical mechanisms which may be triggered, initiated and completed in cooling tower water upon the application of such novel plasma energy discharges that leads to the treatment (reduction, mitigation or destruction) of biological contaminants, (Biofilm, *Legionella* bacteria, etc.), and biologically induced corrosion.

Mechanism 3, the Treatment of Biological Contaminants and Biologically Induced Corrosion Through Ozone Generation In an embodiment, the exemplary plasma cells disclosed herein may be operable to apply plasma energy discharges (e.g., streamers) to cooling tower water, and to produce ozone in the water in order to treat biological contaminants (biofilm, *Legionella* bacteria, etc.) and biologically induced corrosion in the water. For example, streamers in the water generated by an exemplary plasma cell produce ozone gas ($O_3$) through the process of electron impact dissociation of molecular oxygen ($O_2$) and molecular nitrogen ($N_2$) of a supplied carrier gas supplied by the gas distribution system. The carrier gas may be either dry air or ambient air, for example. In an embodiment, upon generation of a streamer the molecular oxygen ($O_2$) gas may react with a dissociated oxygen atom from the carrier gas to form ozone gas. The ozone gas causes reactions that lead to the reduction of biological contaminants in the cooling tower water and further leads to the dissolution of biologically induced corrosion in the water.

$$O_2 + e^- \rightarrow O^\bullet + e^-$$

$$O_2 + 2O^\bullet \rightarrow O_3$$

Mechanism 4, the Treatment of Biological Contaminants and Biologically Induced Corrosion Through the Generation of Hydrogen Peroxide In an embodiment, the exemplary plasma cells disclosed herein may be operable to apply the plasma energy discharges (e.g., streamers) to cooling tower water, and to produce hydrogen peroxide in the water to treat biological contaminants (biofilm, *Legionella* bacteria, etc.) and biologically induced corrosion in the water. For example, the plasma cells may be operable to generate streamers in the water. The streamers produce hydrogen peroxide through electron impacts initiated by the disassociation of vibrational excited molecules, where excited water molecules ($H_2O^*$) decompose (see equations below). The excited water molecules ($H_2O^*$) react with the (non-exited) water molecules ($H_2O$) to produce hydrogen ions ($H^+$), hydroxyl radicals ($OH\cdot$), and additional water molecules ($H_2O$).

$$H_2O + e^- \rightarrow H_2O^* + e^-$$

$$H_2O^* + H_2O \rightarrow H^+ + H_2O + OH^\bullet$$

$$OH^\bullet + H_2O^* \rightarrow H^+ + H_2O_2$$

The reactions represented in the equations above result in the further propagation of reactions of vibrationally excited molecules (represented by the last equation above) to produce hydrogen peroxide $H_2O_2$.

Mechanism 5, the Treatment of Biological Contaminants and Biologically Induced Corrosion Through Mixed Oxidants Generation In an embodiment, the exemplary plasma cells disclosed herein may be operable to apply the plasma energy discharges (e.g., streamers) to cooling tower water, and to produce chlorine reactive oxidative species in the water to treat (reduce) biological contaminants (biofilm, *Legionella* bacteria, etc.) and biologically induced corrosion in the water. Upon formation of the streamers in the water, chlorine based reactive oxidative species are created through electron impacts initiated by the disassociation of vibrational excited molecules.

In more detail, excited chloride ions ($Cl^-$) present in the water combine to form chlorine (see equations below). Thereafter, excited chloride atoms ($Cl^-$) react with the water molecules ($H_2O$) to produce hypochlorous acid ($HClO$) and hydrogen ions ($H^+$).

Hypochlorous acid and the hypochlorite anion ($ClO^-$) exist in pH dependent equilibrium (represented by the third equation below). Chloride is freed as a result of atomic oxygen radical ($O\cdot$) releases (see the fourth and fifth equations below). Continued charge flow results in a two-step chlorate ($ClO_3^-$) formation (as represented in the last two equations immediately below).

$$2Cl^- \rightarrow Cl_2 + 2e^-$$

$$Cl^- + H_2O \rightarrow HClO + H^+ + e^-$$

$$HClO \leftrightarrow ClO^- + H^+$$

$$HClO \rightarrow O^\bullet + Cl^- + H^+$$

$$ClO^- \rightarrow O^\bullet + Cl^-$$

$$2OCl^- \rightarrow ClO_2^- + Cl^-$$

$$OCl^- + ClO_2^- \rightarrow ClO_3^- + Cl^-$$

Byproducts of the Reduction of Biological Contaminants and Biologically Induced Corrosion As indicated previously, the plasma cells disclosed herein may be operable to treat biological contaminants (biofilm, *Legionella* bacteria, etc.) and biologically induced corrosion in cooling tower water. In so doing, hydrogen gas may be created as a byproduct. In more detail, streamers in the water may produce hydrogen gas ($H_2$) through electron impacts initiated by the disassociation of vibrational excited molecules, where excited water molecules (H₂O*) decompose (see equation below). Accordingly, the exemplary system 1 may include ventilation equipment to dispose of the generated hydrogen gas.

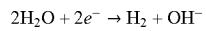

$$2H_2O + 2e^- \rightarrow H_2 + OH^-$$

FIG. 18 presents experimental results based on use of an experimental system, such as system 1, to reduce *Legionella* and heterotrophic bacteria in a cooling tower. As shown in the graph in FIG. 18, in an industrial cooling tower system an experimental system, such as exemplary system 1, reduced the level of *Legionella* from 7900 CFU/ml (i.e., a measure of the number of colonies times a dilution factor per volume of culture, reference plate) to a non-detectable level using a culture test method to test bacteria in the mixture and from 1300 CFU/ml to 2 CFU/ml using a quantitative polymerase chain reaction test method.

Referring now to FIGS. 19A to 19H there are depicted illustrative displays generated by a graphical user interface (GUI) that may be part of controller 15, controller 15*b* or a test set 21 to monitor and control components of section 4 and system 1 in accordance with embodiments of the invention. In embodiments, controller 15, controller 15*b* or a test set 21 may comprise one or more APPs that are operable to generate and display the parameters shown in FIGS. 19A to 19H.

Figure 19A:
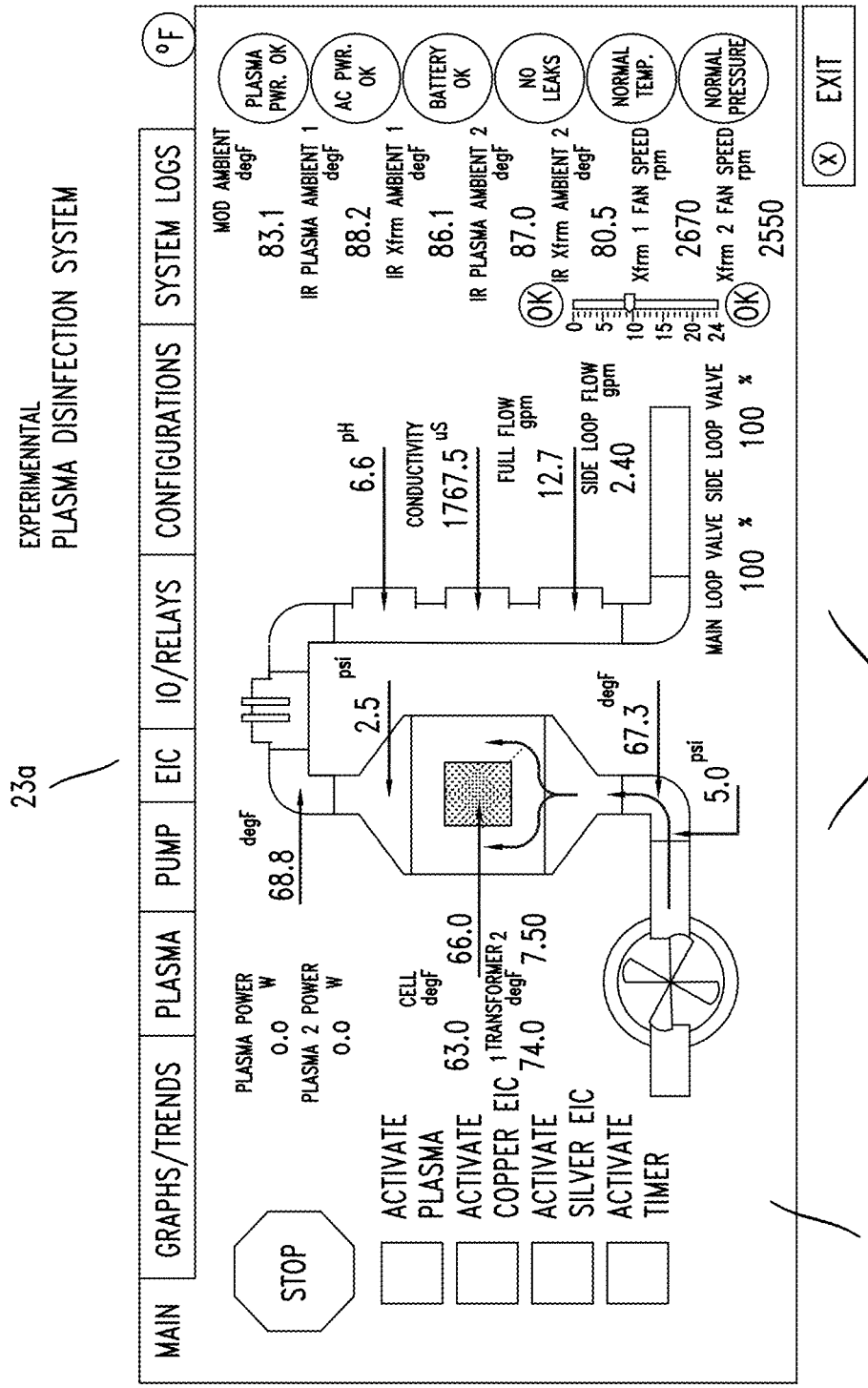
Figure 19B:
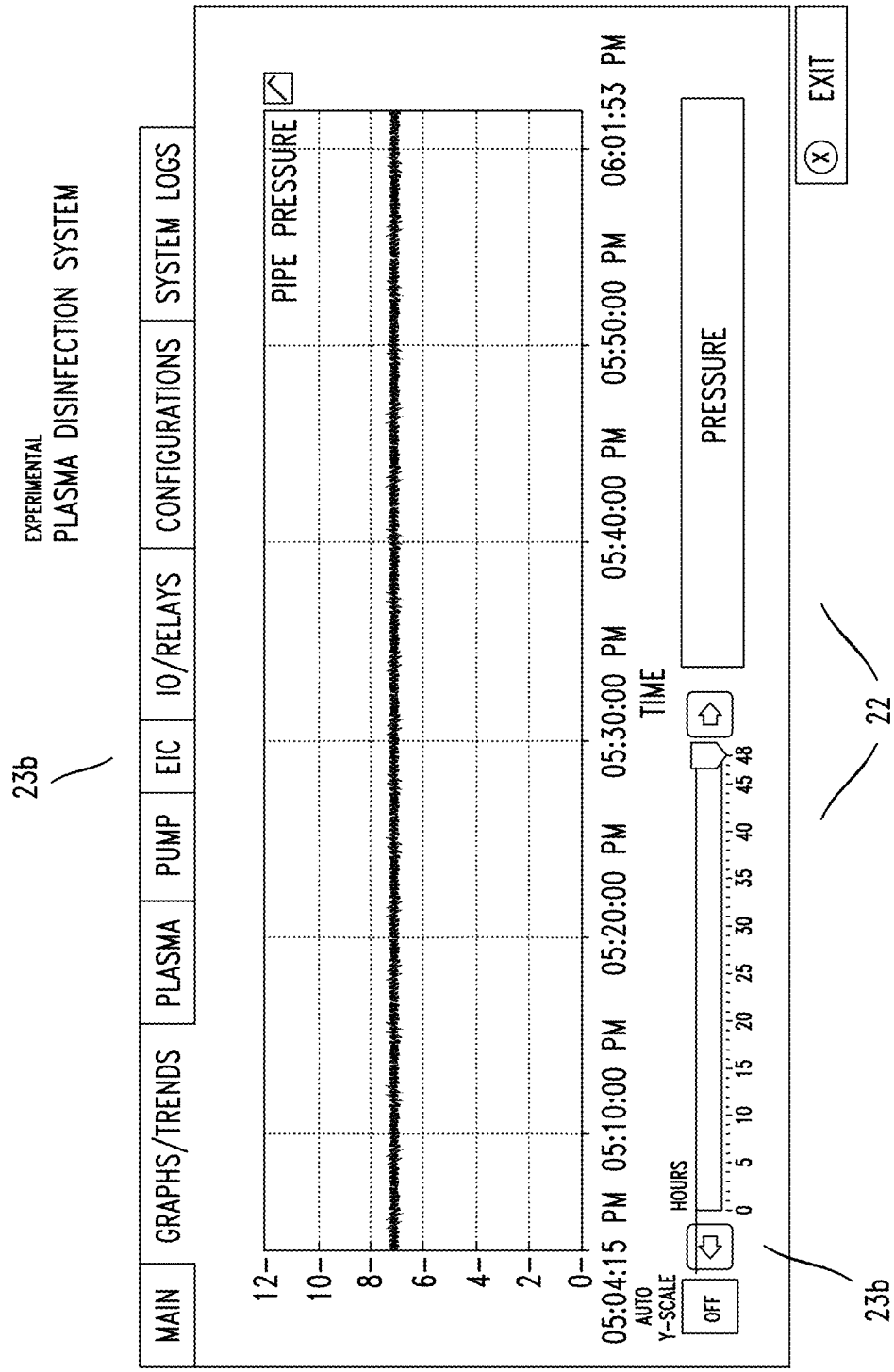

Referring first to FIG. 19A, there is depicted an exemplary display 23*a* that may be generated by the GUI 22 or one or more similar components capable of displaying data that are a part of controller 15, controller 15*b* or a test set 21.

It should be understood that test set 21, controller 15 and/or remote controller 15*b* may receive and send (i.e., communicate with) signals and data from, and to, one or more components of section 4 and other section within system 1 via a communication channel (e.g., databus 15*a*, which may be an IoT databus).

As illustrated by the data depicted in FIGS. 19A to 19H, controller 15, controller 15*b* or a test set 21 may be operable to receive signals from components of the PDS section 4 in order to collect data and monitor a plurality of parameters associated with characteristics of the mixtures flowing through and/or associated with the operation of the PDS 20, for example. The GUI 22 may be operable to display data and parameters associated with characteristics of the mixtures being treated by system 1. For example, in an embodiment the controller 15, controller 15*b* or a test set 21 may be operable to compute, and the GUI 22 may be operable to generate a display of the one or more instantaneous system variables, such as pH of the mixture being treated, temperatures of plasma cells, conductivity of the mixture being treated, flow rate, pressure levels, power levels of each cell, fan speeds and various alarm statuses as shown in FIG. 19A. The data associated with the displayed pH, temperatures and conductivities as well as other parameters may be detected or otherwise collected by components described elsewhere herein, such as the valves, sensors, and flow meters to name just a few of the many types of components that may be used to collect the data associated with parameters desired to be displayed. In an embodiment, the GUI 22 may be operable to receive user inputs and generate signals that are sent to various elements of the system 1 in order to control such elements, including, for example, starting and stopping of pumps, and plasma cells, etc.

In addition, the controller 15, controller 15*b* or a test set 21 may be operable to compute, and GUI 22 may be operable to display, a combination of data parameters as charts or graphs representative of a number of additional measurements (see display 23*b* in FIG. 19B), such as historical data and trends of all data stored by controller 15, controller 15*b* or a test set 21. This historical data may include, but is not limited to, temperatures, pressures levels, flows rates, plasma probe power/currents/voltages, and pump frequency/voltage/current.

Figure 19C:
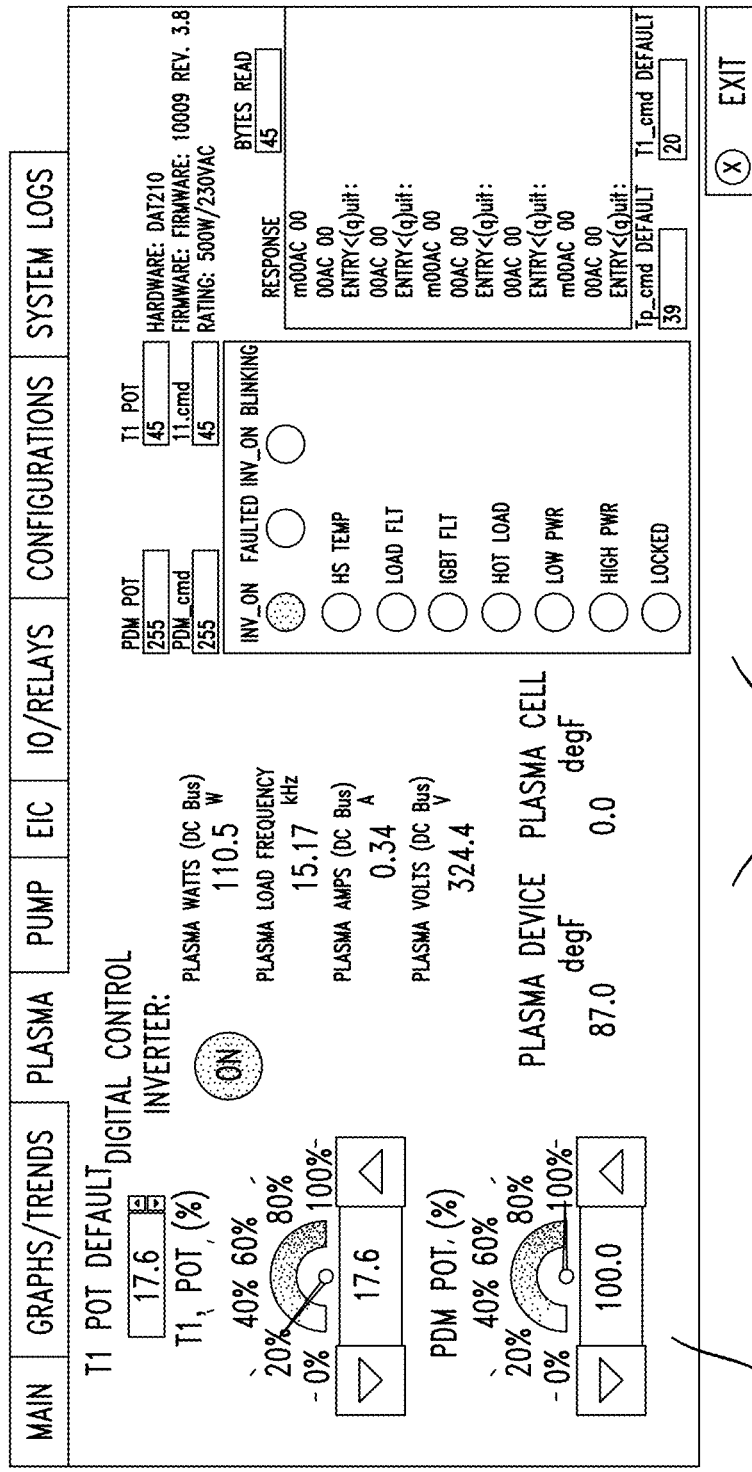

Referring now to FIG. 19C there is depicted a display 23*c* of information associated with the control and monitoring of an exemplary plasma inverter (e.g., 20*ab*) that may be computed by controller 15, controller 15*b* or a test set and then displayed by GUI 22. In addition, other information associated with the inverter may be displayed, such as inverter version, various alarms, settings and operational statuses.

Referring now to FIG. 19D there is depicted a display 23*d* for assisting the user in controlling and monitoring internal and pumps in section 4, for example. Data and parameters that may be computed by controller 15, controller 15*b* or a test set 21 and then displayed by GUI 22 include, for example, the speed (RPMs) of pumps along with additional parameters related to the operation of the pumps. In addition, GUI 22 may be operable to display a combination of additional data and parameters such as flow rates input into/output from input pipes or output pipes and differential pressures across piping 6 of system 1.

Figure 19E:
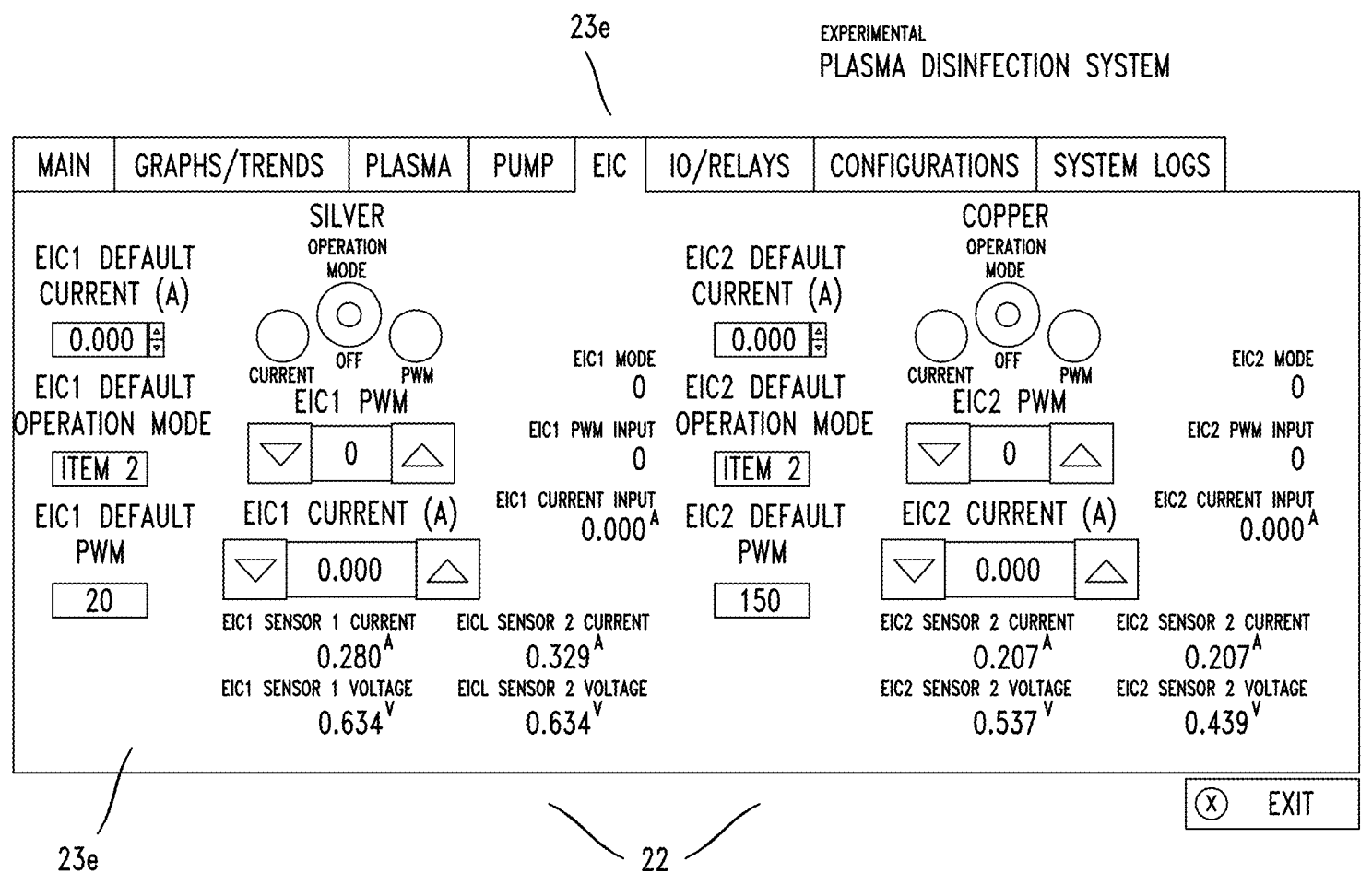

FIG. 19E depicts a display 23*e* for assisting the user in controlling and monitoring electrodes 20*ca* that are a part of the biocidal treatment chamber 20*c*. Information or parameters that may be computed by controller 15, controller 15*b* or a test set and then displayed by GUI 22 include, but are not limited to, the current and voltages associated with each electrode 20*ca*. In FIG. 19F there is depicted a display 23*f* for assisting the user in controlling and monitoring input/output relays that provide power to different elements of the section 4 and/or system 1. FIG. 19F may also display raw data associated with analog and digital inputs received by a controller, such as controller 15, 15*b*.

Figure 19G:
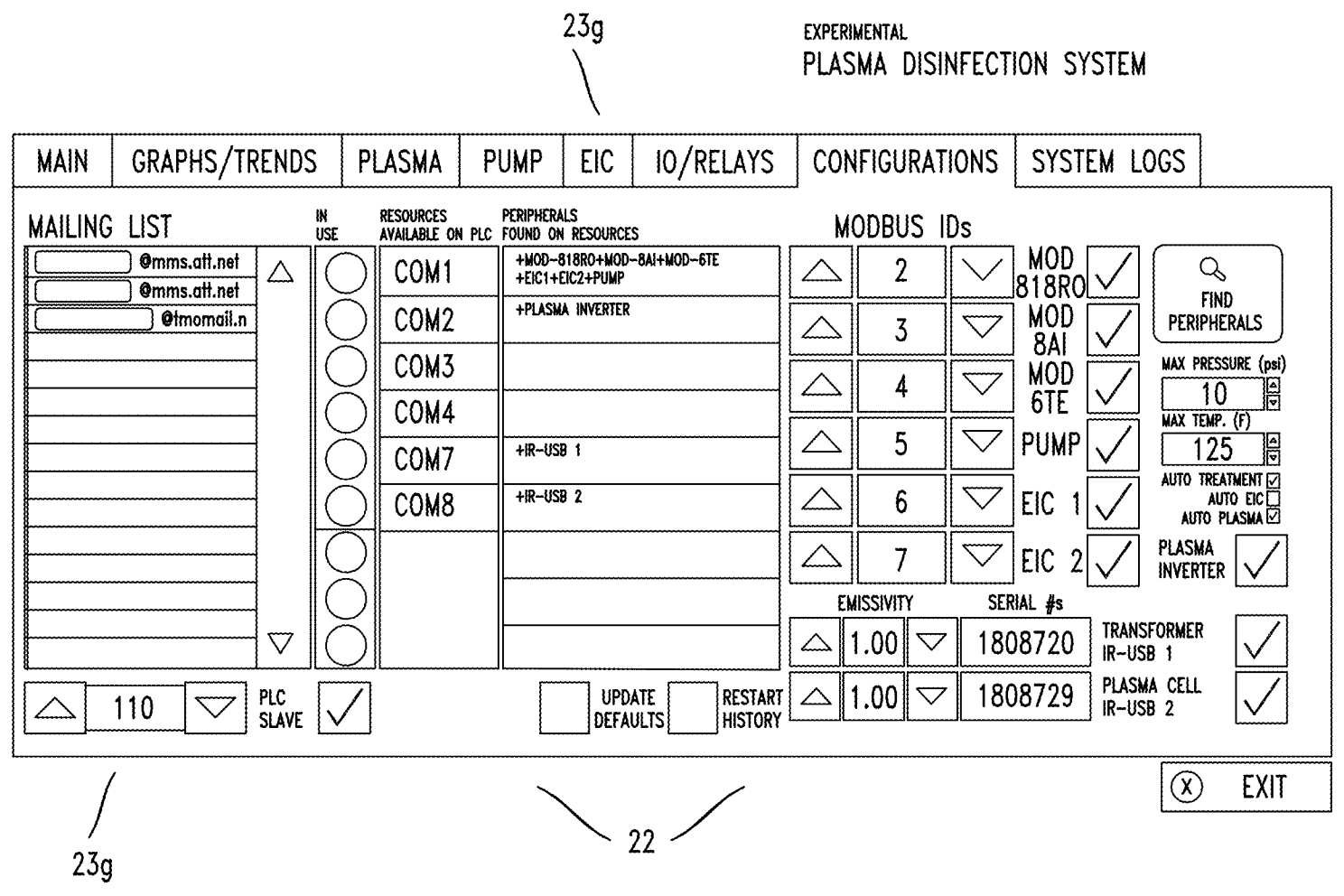

FIG. 19G depicts a display 23*g* of system configuration information such as the settings and discovery of peripherals that are a part of the system 1. Communication identifiers (e.g., addresses of PLCs 20*cc*) and port assignments for elements of the system 1 may also be displayed.

Figure 19H:
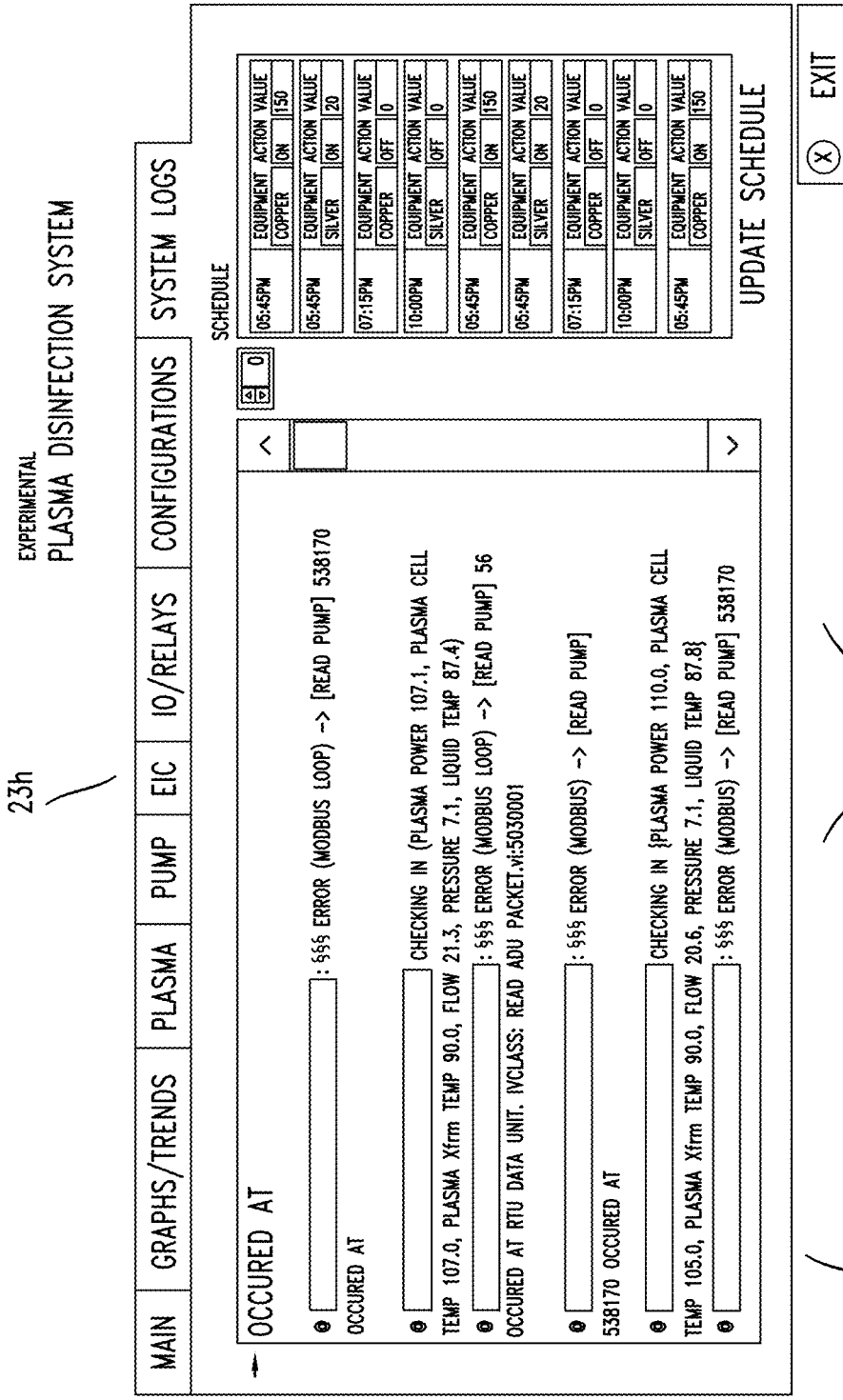

Finally, FIG. 19H depicts a display 23*h* of system log information that may be computed by 20*ca* and then displayed by GUI 22. Such information may include, but is not limited to, a list of actions, errors, alarms and statuses with an accompanying timestamp. A list of scheduled actions related to automatic settings and operation of the system 1 may also be displayed.

Figure 20:
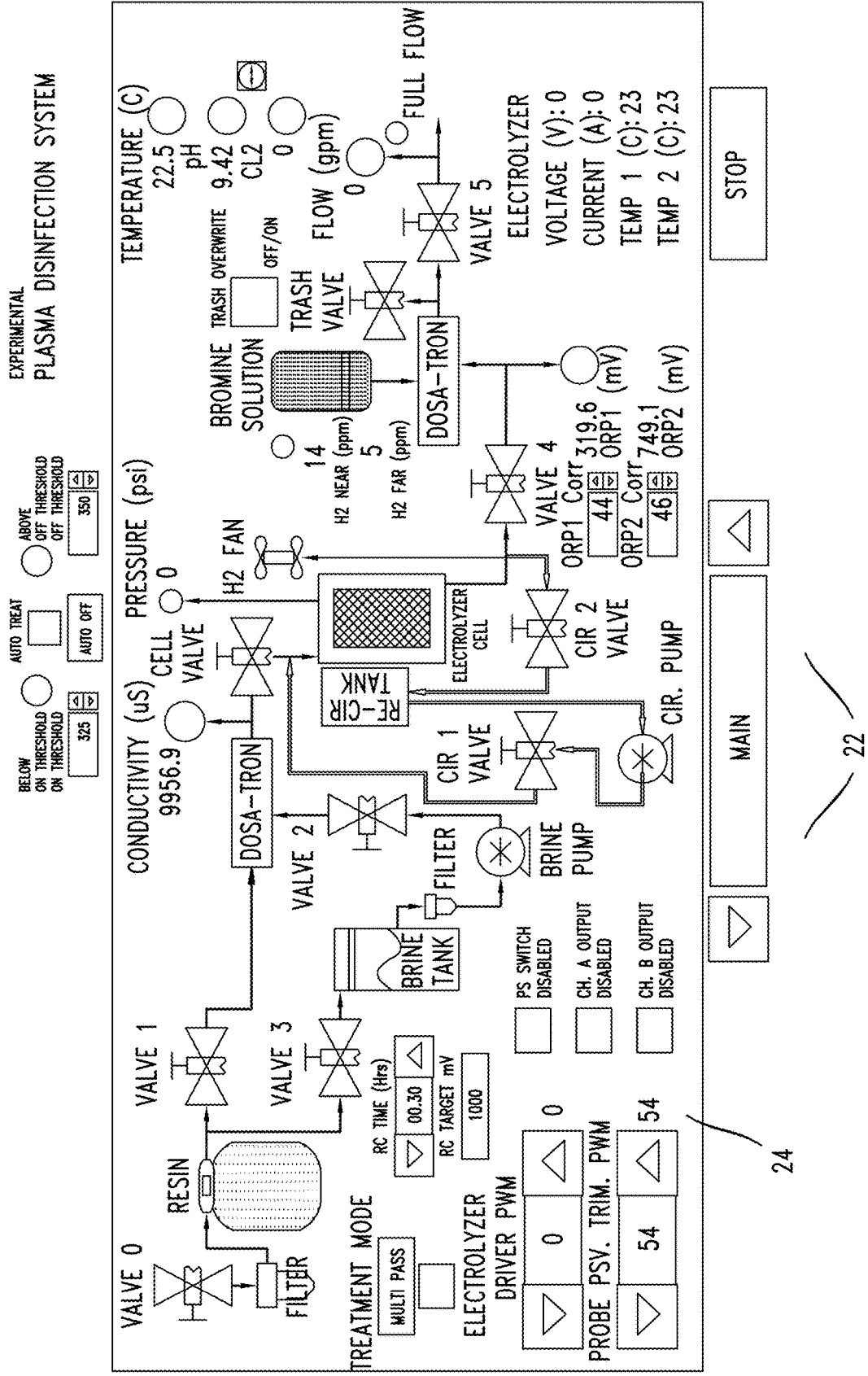
FIG. 20 depicts illustrative displays generated by GUI to monitor and control components of an exemplary electrolysis disinfectant section, among other things To the extent that any of the figures or text included herein depicts or describes dimensional information (e.g., inches), percentages or operating parameters (e.g., voltages, currents), it should be understood that such information is merely exemplary to aid the reader in understanding the embodiments described herein. It should be understood, therefore, that other dimensions, percentages and/or parameters may be used to construct the inventive devices, systems and components described herein and their equivalents without departing from the scope of the disclosure.

Similarly GUI 22 of a controller 15, controller 15*b* or a test set 21 may display parameters to monitor and control components of the electrolysis disinfectant section 3 and system 1 in accordance with embodiments of the invention. For example, FIG. 20 depicts an exemplary display 24 on GUI 22 that may be generated by controller 15, controller 15*b* and/or test set 21. In embodiments, controller 15, controller 15*b* or a test set 21 may comprise one or more APPs 0hat are operable to generate and display the parameters shown in FIG. 20.

It should be understood that test set 21, controller 15 and/or remote controller 15*b* may receive and send (i.e., communicate with) signals and data from, and to, one or more components of section 3 of the system 1 via a communication channel (e.g., databus 15a, which may be an IoT databus).

As illustrated by the data depicted in FIGS. 19A to 19H, controller 15, controller 15b or a test set 21 may be operable to receive signals from components of the section 3 in order to collect data and monitor a plurality of parameters associated with characteristics of the mixtures flowing through and/or associated with the operation of electrodes 3c, 3d, for example. The GUI 22 may be operable to display data and parameters associated with characteristics of the mixtures. For example, in an embodiment the controller 15, controller 15b or a test set 21 may be operable to compute, and the GUI 22 may be operable to generate a display of the one or more instantaneous system variables, such as, temperatures, conductivity of the mixture being treated, flow rate, pressure levels, power levels of each cell, valve and pump positions, metering levels and various alarm statuses as shown in FIG. 20. The data associated with the displayed parameters may be detected or otherwise collected by components described elsewhere herein, such as the valves, sensors, and flow meters to name just a few of the many types of components that may be used to collect the data associated with parameters desired to be displayed. In an embodiment, the GUI 22 may be operable to receive user inputs and generate signals that are sent to various elements of section 3 in order to control such elements, including, for example, starting and stopping of pumps, and electrodes 3c, 3d, etc.

Because controller 15, controller 15b or a test set 21 and GUI 22 are capable of computing and displaying a wide array of parameters related to system 1 it can also be used to improve the overall efficiency of components of such a system.

In additional embodiments of the invention, the data received, and computations generated, by controller 15, controller 15b or a test set 21 may be stored in an associated memory and used as real-time or historical information to further: (a) compute and generate maintenance schedules for components of system 1, (b) compute and estimate times when failures may occur in the future in such components, and to (c) identify and isolate failures of components in system 1 in real-time to name just a few of the many ways in which such collected data and computations may be used. Upon making such computations, a user of system 1 may be able to more efficiently schedule preventive and/or regularly scheduled maintenance visits by maintenance or service personnel to such a system. That is, instead of scheduling too many or too few maintenance or service visits that result in unnecessary costs or worse, component failures, systems and devices provided by the present invention allow a user to schedule visits in a smarter, more effective manner that may reduce the cost of operating a system and reduce the number of unexpected failures of components making up such a system.

It should be understood that in addition to receiving data related to the characteristics of a liquid being treated and/or the operation of the elements of system 1 the present inventors provide for means and ways to control such characteristics and system 1. In embodiments of the invention, upon receiving data, computing parameters and displaying such data and parameters, such as those depicted in FIGS. 19A to 20, controller 15, controller 15b or a test set 21 may be operable to transmit or otherwise send signals to components of system 1 via communication channels in order to control the operation of such elements, which, in turn, may control the characteristics of the mixture being treated. In one embodiment, controller 15, controller 15b or a test set 21 may be operable to generate electrical signals based on the data collected and parameters computed and then send such signals to elements within the system 1 or to PLCs 20cc, other controllers, such as addressable controllers, motor controllers or temperature controllers via communication channels (e.g., databus 15a, which may be an IoT databus) in order to control the operation of such components and control the characteristics of the mixture being treated in the system 1. For example, in one embodiment controller 15, controller 15b or a test set 21 may be operable to execute stored instructions in its memory (e.g., an APP, or firmware) to generate signals associated with data it has received concerning the operation of a pump, valve or fan. Such signals may be sent to a pump, valve or fan directly, or to a motor controller connected to the pump, valve or fan. In either case, such signals, once received by the motor controller, pump, valve or fan may cause a motor that is a part of such a pump, valve or fan to change its status (e.g., open or close, either increase or decrease its speed (RPMs)). By changing the speed of a pump or fan or opening or closing a valve the characteristics of a mixture may also be affected. For example, the flow rate of mixture in system 1 may be effected, which in turn, may affect other characteristics.

In a similar fashion, controller 15, controller 15b or a test set 21 may be operable to send signals to other components of the system 1 via communication channels (e.g., databus 15a, which may be an IoT databus) in order to effect changes to other characteristics of water and/or to affect the efficiency and overall operation of the system 1.

It should be apparent that the foregoing describes only selected embodiments of the invention. Numerous changes and modifications may be made to the embodiments disclosed herein without departing from the general spirit and scope of the invention. For example, though water has been the liquid utilized in the description herein, other suitable liquids may be used. That is, the inventive devices, systems and methods described herein may be used to partially or substantially treat these other liquids as well.

What is claimed is:

1. A system for treating unwanted material, the system comprising:
    a first chamber comprising one or more electrodes ("first" electrodes), wherein each pair of the of the one or more first electrodes comprises a positively charged first anode and a negatively charged first cathode operable to form an amount of ionized, dissolved metal ions in a cooling liquid depending on the magnitude of a first electrical current supplied to each pair of first electrodes and upon the flow rate of the cooling liquid through the first electrodes to reduce the unwanted material, wherein the unwanted material comprises at least biofilm; and
    a second chamber, the second chamber comprising one or more electrodes ("second" electrodes), wherein each pair of the of the one or more second electrodes comprises a second positively charged anode and a second negatively charged cathode operable to form hypochlorite ions in the cooling liquid depending upon the magnitude of a second electrical current supplied to the second electrodes and upon the flow rate of the cooling liquid through the second electrodes, wherein each pair of second electrodes comprises an electrolysis "cell" enclosed in a steel baffle.

2. The system as in claim 1 wherein the cooling liquid comprises water.

3. The system as in claim 1 wherein one or more of the one or more first electrodes is composed of a variable amount of silver and copper.

4. The system as in claim 3 wherein the variable amount of silver-to-copper is 60:40 silver to copper.

5. The system as in claim 3 wherein the variable amount of silver-to-copper is 80:20 silver to copper.

6. The system as in claim 1 wherein one or more of the one or more first electrodes is composed of a zinc or a lead.

7. The system as in claim 1 wherein the unwanted material is composed of at least biological contaminants.

8. The system as in claim 7 wherein the biological contaminants is composed of at least *Legionella pneumophila* or scale.

9. The system as in claim 1 further comprising a control system for controlling the magnitude of the electrical current supplied to each pair of the first electrodes.

10. The system as in claim 1 wherein the second positively charged anode and the second negatively charged cathode comprises multiple, material layers.

11. The system as in claim 10 wherein the multiple, material layers of the second negatively charged cathode comprises a titanium mesh and the second positively charged anode comprises a titanium mesh with a mixed metal oxide layer covering the titanium mesh.

12. The system as in claim 1 further comprising an epoxy resin applied to electrical connections of each of the one or more second electrodes to protect the connections from the cooling liquid and to limit oxidation which degrades the ability of the one or more second electrodes to generate a sufficient voltage or current required for the formation of the hypochlorite ions.

\* \* \* \* \*